(12) United States Patent
Mueck et al.

(10) Patent No.: US 11,792,616 B2
(45) Date of Patent: Oct. 17, 2023

(54) DISTRIBUTED NETWORK ALLOCATION VECTOR MANAGEMENT FOR ENABLING VEHICLE-TO-EVERYTHING RADIO ACCESS TECHNOLOGY COEXISTENCE

(71) Applicant: Intel Corporation, Santa Clara, CA (US)

(72) Inventors: Markus Dominik Mueck, Unterhaching (DE); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 17/033,432

(22) Filed: Sep. 25, 2020

(65) Prior Publication Data

US 2021/0014656 A1 Jan. 14, 2021

Related U.S. Application Data

(60) Provisional application No. 62/989,363, filed on Mar. 13, 2020, provisional application No. 62/907,370, filed on Sep. 27, 2019.

(51) Int. Cl.
*H04W 4/40* (2018.01)
*H04W 74/08* (2009.01)
(Continued)

(52) U.S. Cl.
CPC ............ *H04W 4/40* (2018.02); *H04L 5/0048* (2013.01); *H04W 72/04* (2013.01); *H04W 74/0816* (2013.01)

(58) Field of Classification Search
CPC ... H04W 4/40; H04W 72/04; H04W 74/0816; H04W 72/0446; H04W 72/08;
(Continued)

(56) References Cited

U.S. PATENT DOCUMENTS 11,272,345 B2 * 3/2022 Buckley ............... H04W 12/10
11,463,531 B2 * 10/2022 Zanier .................... H04W 4/06
(Continued)

FOREIGN PATENT DOCUMENTS

WO 2019/236714 A1 12/2019
WO 2021/003059 A1 1/2021
WO WO-2022186930 A1 * 9/2022 ........ H04W 74/0816

OTHER PUBLICATIONS

ITU-T, "Error-correction procedures for DCEs using asynchronous-to-snychronous conversion," Telecommunication Standardization Sector of ITU, ITU-T Recommendation V.42 (Mar. 2002), Series V: Data Communication Over The Telephone Network, Error Control, ITU-T V-Series Recommendations, 70 pages.
(Continued)

*Primary Examiner* — Ayaz R Sheikh
*Assistant Examiner* — Louis Samara
(74) *Attorney, Agent, or Firm* — Schwabe, Williamson & Wyatt, P.C.

(57) ABSTRACT

Disclosed embodiments include technologies for managing co-existence among multiple Vehicle-to-Everything (V2X) Radio Access Technologies (RATs) through the setting of a Network Allocation Vector (NAV). MAC layer frame headers contain a duration field that specifies a transmission interval during which a shared channel will be occupied by a particular V2X RAT. The NAV indicates the time period intended to be held for the particular V2X RAT, and acts as an indication for how long stations implementing different V2X RATs must abstain from accessing the shared medium. Stations listen on the shared medium to obtain the MAC layer frame, read the duration field, and set their NAV indicators accordingly. Other embodiments are described and/or claimed.

20 Claims, 22 Drawing Sheets

(51) Int. Cl.
*H04L 5/00* (2006.01)
*H04W 72/04* (2023.01)
(58) Field of Classification Search
CPC ......... H04W 4/08; H04W 48/18; H04W 4/06; H04W 16/14; H04L 5/0048; H04L 5/0046; H04L 5/0055
See application file for complete search history.

(56) References Cited

U.S. PATENT DOCUMENTS

| | | | | |
|---|---|---|---|---|
| 2007/0206534 | A1* | 9/2007 | Kwun | H04L 1/0009 370/329 |
| 2016/0128130 | A1* | 5/2016 | Sadek | H04W 16/14 370/328 |
| 2017/0325222 | A1* | 11/2017 | Cariou | H04W 72/0446 |
| 2018/0295628 | A1* | 10/2018 | Lu | H04W 72/12 |
| 2018/0352576 | A1* | 12/2018 | Sugaya | H04W 74/04 |
| 2019/0229882 | A1* | 7/2019 | Trainin | H04L 5/0055 |
| 2020/0120458 | A1* | 4/2020 | Aldana | H04W 4/08 |
| 2022/0078062 | A1* | 3/2022 | Baldemair | H04W 72/0446 |

OTHER PUBLICATIONS

IEEE Computer Society, "Part 11: Wireless LAN Medium Access Control (MAC) and Physical Layer (PHY) Specifications," IEEE Standard for Information technology—Telecommunications and information exchange between systems Local and metropolitan area networks—Specific requirements, IEEE Std 802.11 ™-2016, (Revision of IEEE Std 802.11-2012), New York, NY, 3534 pages.
ETSI, "Intelligent Transport Systems (ITS); Users and applications requirements; Part 1: Facility layer structure, functional requirements and specifications," ETSI TS 102 894-1 V1.1.1 (Aug. 2013), 56 pages.
ETSI, "Intelligent Transport Systems (ITS); Vehicular Communications; Basic Set of Applications; Definitions," ETSI TR 102 638 V1.1.1 (Jun. 2009), 81 pages.
ETSI, "Intelligent Transport Systems (ITS); LTE-V2X Access layer specification for Intelligent Transport Systems operating in the 5 GHz frequency band," ETSI EN 303 613 V1.1.1 (Jan. 2020) Intelligent Transport, 20 pages.
ETSI, "Intelligent Transport Systems (ITS); ITS-G5 Access layer specification for Intelligent Transport Systems operating in the 5 GHz frequency band," ETSI EN 302 663 V1.3.1 (Jan. 2020), 25 pages.
3GPP, "Technical Specification Group Services and System Aspects; Study on architecture enhancements for the Evolved Packet System (EPS) and the 5G System (5GS) to support advanced V2X services (Release 16)," 3GPP TR 23.786 V16.1.0 (Jun. 2019), 5G, 119 pages.
3GPP, "Technical Specification Group Services and System Aspects; Architecture enhancements for 5G System (5GS) to support Vehicle-to-Everything (V2X) services (Release 16)," 3GPP TS 23.287 V16.2.0 (Mar. 2020), 5G, 53 pages.
3GPP, "Technical Specification Group Services and System Aspects; Architecture enhancements for V2X services (Release 16)," 3GPP TS 23.285 V16.2.0 (Dec. 2019), 5G, 38 pages.

* cited by examiner

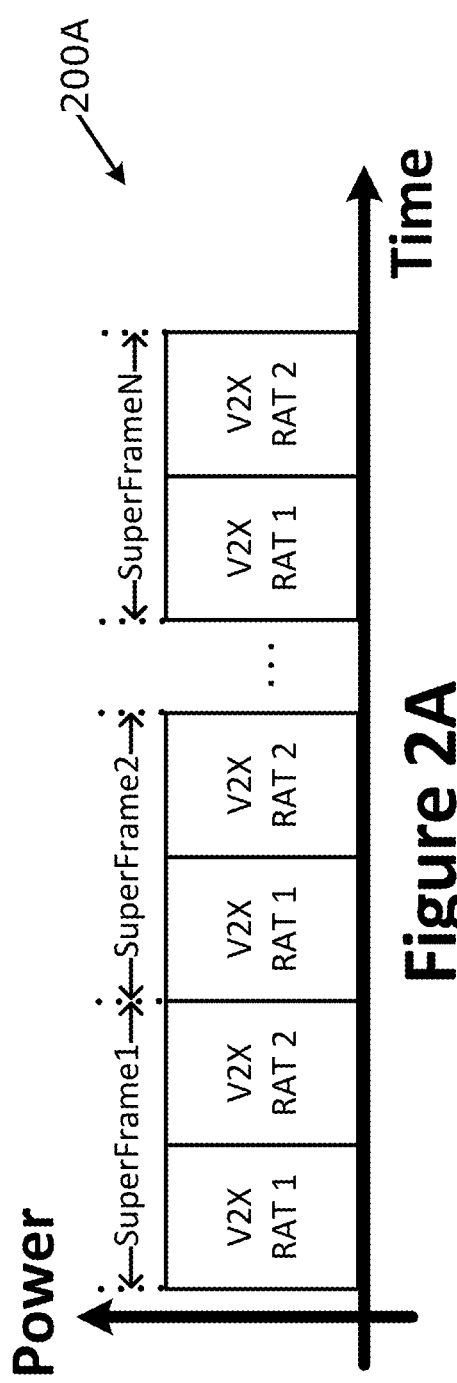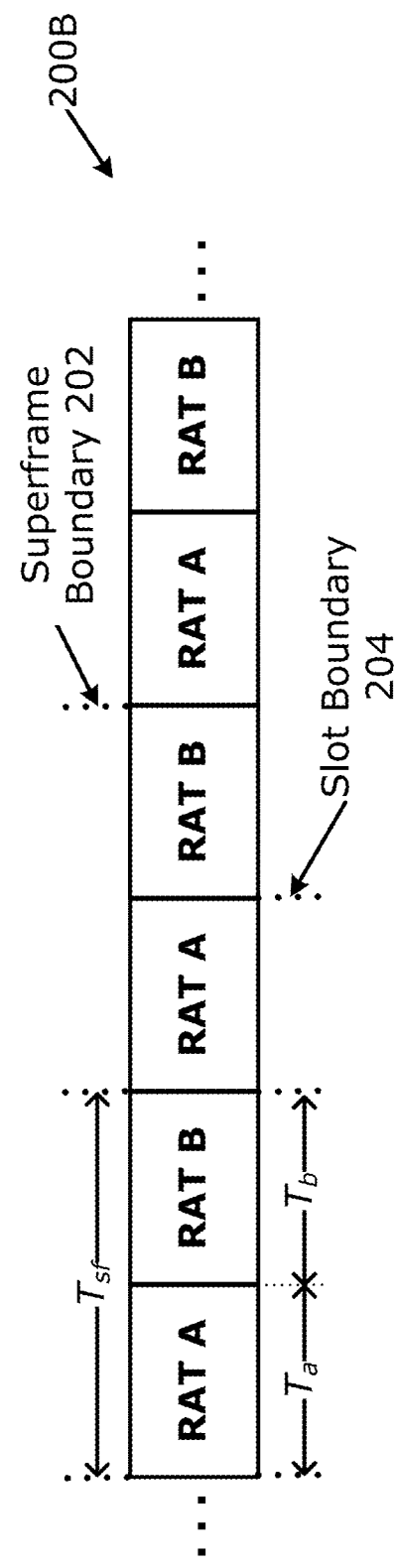
Figure 2A
Figure 2B

DISTRIBUTED NETWORK ALLOCATION VECTOR MANAGEMENT FOR ENABLING VEHICLE-TO-EVERYTHING RADIO ACCESS TECHNOLOGY COEXISTENCE

RELATED APPLICATIONS

The present application claims priority to U.S. Provisional App. No. 62/907,370 filed Sep. 27, 2019 and U.S. Provisional App. No. 62/989,363 filed Mar. 13, 2020, the contents of each of which are hereby incorporated by reference in their entireties.

TECHNICAL FIELD

Embodiments described herein generally relate to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band. Existing RATs do not have mechanisms to coexist with one another and are usually not interoperable with one another.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2A illustrates an example TDM approach to co-channel coexistence. FIG. 2B depicts an example superframe according to various embodiments.

DETAILED DESCRIPTION

Figure 1:
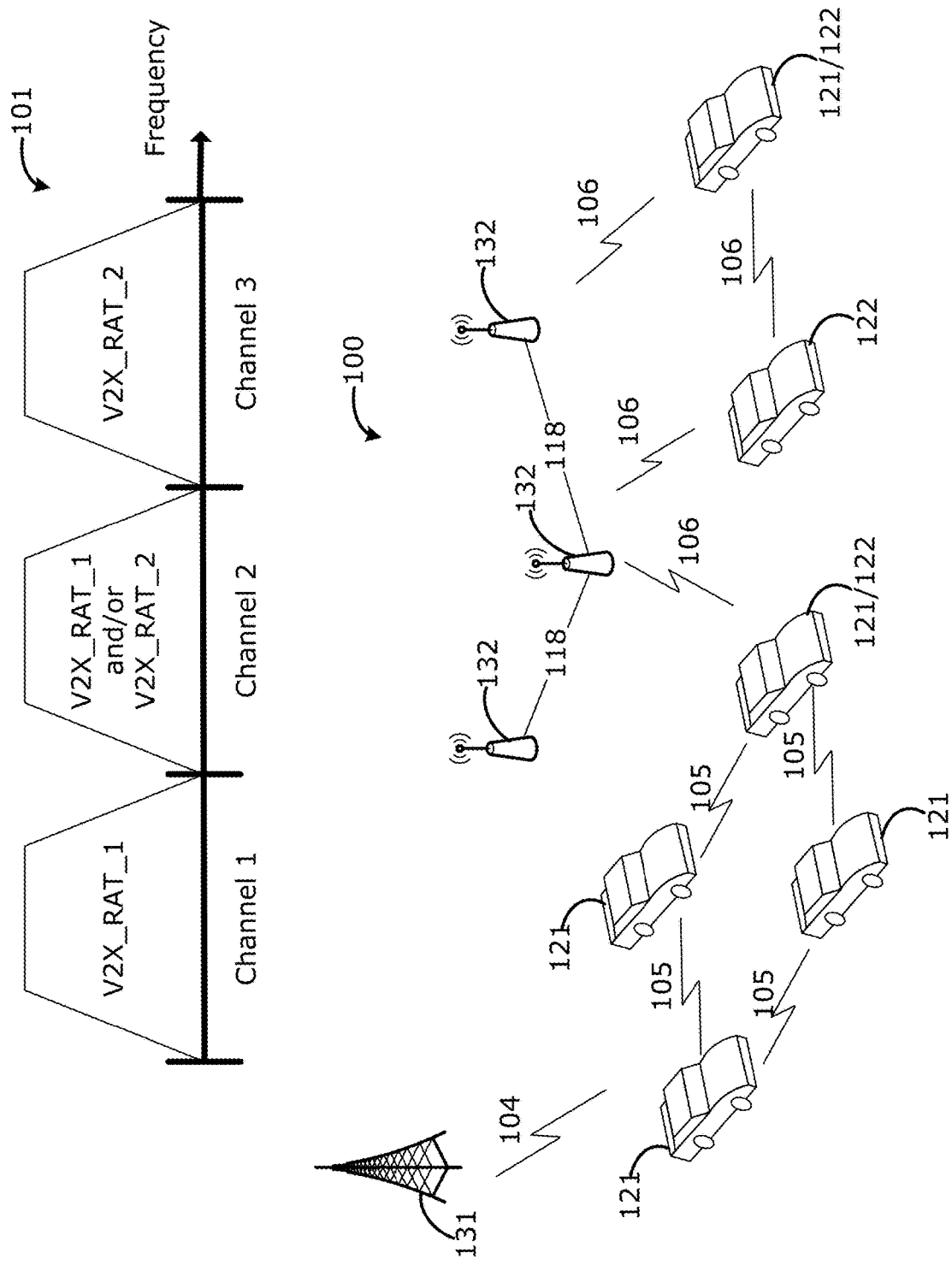
FIG. 1 illustrates an example Vehicle-to-Everything (V2X) arrangement, according to various embodiments.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

The Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X applications can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, etc.). Elements of ITS are standardized in various standardization organizations, both on an international level and on regional levels.

Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since the present embodiments are applicable to any number of different RATs (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies. These systems do not have mechanisms to coexist with one another and are usually not interoperable with one another.

"Interoperability" refers to the ability of vehicle ITS-Ss (V-ITS-Ss) (also referred to as vehicle UEs (vUEs)) and roadside ITS-Ss (R-ITS-Ss) (also referred to as roadside equipment or Road Side Units (RSUs)) utilizing one vehicular communication system to communicate with vUEs and roadside equipment utilizing the other vehicular communication system. "Coexistence" refers to sharing or allocating radiofrequency resources among vUEs and roadside equipment using either vehicular communication system. One coexistence approach is the "preferred channel" approach, which involves dynamically allocating channels to be used exclusively by one system or exclusively by the other system. Another coexistence approach is the "co-channel existence" approach, which involves allocating both systems to a channel during different time slots. Examples are shown and described with respect to FIGS. 1 and 2.

FIG. 1 illustrates an example arrangement 100 having multiple channels 101 available for V2X communications according to various embodiments. This arrangement 100 involves V-ITS-Ss 121 and 122, which may be the same or similar as the in-vehicle system (IVS) 1301 of FIG. 13 and/or the ITS architecture 1200 of FIG. 12 (discussed infra) that may communicate with one another over direct links 105, 106 and/or with RAN nodes 131 and/or R-ITS-Ss 132 via links 104, 106, 118. The RAN nodes 131 and/or R-ITS-Ss 132 may be the same or similar as the NAN 1630 of FIG. 16 (discussed infra).

As discussed herein, the present techniques address coexistence issues related to multiple V2X RATs operating in a same service area or region. In the example of FIG. 1, at least two distinct V2X RATs may need to coexist in the available channels 101. Although FIG. 1 shows three V2X channels 101, any applicable number of channels may be used for any number of V2X RATs. In an example, the at least two distinct V2X RATs include IEEE based V2X technologies (e.g., DSRC for the U.S. and ITS-G5 for Europe) and 3GPP C-V2X (e.g., LTE or 5G/NR). In the example of FIG. 1, the V-ITS-Ss 121 may operate according to C-V2X and the V-ITS-Ss 122 may operate according to ITS-G5. These V2X technologies are not designed for interacting and coexisting with each other.

In this example, the RAN node 131 (e.g., an evolved node B (eNB), next generation eNB (ng-eNB), or next generation nodeB (gNB)) is configured to provide 3GPP communication services, and may provide (or assist in providing) C-V2X services, while the R-ITS-Ss 132 are equipped to provide network connectivity for the vUEs 122 employing the ITS-G5 RAT.

ITS-G5 usually involves peer-to-peer (P2P) technology with direct links 106 between the V-ITS-Ss 122, and Wireless Local Area Network (WLAN) links 106 for communications with a wider network (e.g., the Internet). In the example of FIG. 1, the direct links 106 utilize the same protocol/network as the WLAN links 106. However, in other implementations, the WLAN links 106 may utilize a different protocol than the direct links 106.

The access layer for the ITS-G5 interface is outlined in ETSI EN 302 663 V1.3.1 (2020-01) (hereinafter "[EN302663]") and describes the access layer of the ITS-S reference architecture 100. The ITS-G5 access layer comprises the IEEE Standards Association, "IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE 802.11-2016, pp. 1-3534 (14 Dec. 2016) (hereinafter "[IEEE80211]") and IEEE 802.2 Logical Link Control (LLC) (hereinafter "[IEEE8022]") protocols. Additionally or alternatively, the ITS-G5 access layer may be based on the IEEE 802.11bd protocol (forthcoming). In general, ITS-G5 uses 52 orthogonal subcarriers in a channel bandwidth of 10 MHz, where 48 subcarriers are used for data and 4 are pilot carriers. The OFDM physical (PHY) layer of ITS-G5 can support eight different transfer rates by using different modulation schemes and coding rates. The support of 3 Mbit/s, 6 Mbit/s, and 12 Mbit/s is mandatory. The duration of an OFDM symbol is fixed to 8 µs, and consequently for different transfer rates the number of data bits per OFDM symbol varies.

Additionally, the ITS-G5 Medium Access Control (MAC) layer decides when in time a station is allowed to transmit based on the current channel status. The MAC schedules transmission to minimize the interference in the system to increase the packet reception probability. The MAC deployed by [IEEE80211] is called enhanced distributed coordination access (EDCA) and is based on the basic distributed coordination function (DCF) but adds QoS attributes. DCF is a carrier sense multiple access with collision avoidance (CSMA/CA) algorithm. In CSMA/CA, a node starts to listen to the channel before transmission and if the channel is perceived as idle for a predetermined listening period the node can start to transmit directly. If the channel becomes occupied during the listening period the node will perform a backoff procedure, wherein the node defers its access according to a randomized time period. In [IEEE80211], the predetermined listening period is called either arbitration interframe space (AIFS) or distributed interframe space (DIFS) depending upon the mode of operation (e.g., EDCA or DCF). The former listening period is used when there is support for QoS.

The access layer for 3GPP C-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03). 3GPP C-V2X includes several communication modes. One mode involves communications taking place over a cellular link ("Uu interface") 104 between an individual vUE 121 and the Radio Access Network (RAN) node 131, where a transmitting (Tx) vUE 121 sends data to the RAN node 131 over the Uu interface 104, and the RAN node 131 sends that data to a receiving (Rx) vUE 121 over another Uu interface 104. Another mode involves vUEs 121 communicating data with one another using a direct link ("PC5 interface") 105 between the vUEs 121 independently from the control of cellular network and/or without assistance from the RAN node 131. Another mode is a combination of the first and second modes, where control signaling takes place over the Uu interface 104 and data exchange takes place over the PC5 interface 105. In this example, the PC5 interface 105 and the ITS-G5 interface 106, 118 may utilize license-exempt V2X communication channels 101 in the 5.9 GHz band, for example, three 10 MHz channels for safety related applications and the like. When the vUEs 121 are in cellular network coverage, the network decides how to configure the V2X channel and informs the vUEs 121 about V2X configurable parameters through the Uu interface 104. The message includes the carrier frequency of the V2X channel, the V2X resource pool, synchronization references, the sub-channelization scheme, the number of subchannels per subframe, and the number of resource blocks (RBs) per subchannel, among other information.

C-V2X uses single-carrier frequency-division multiple access (SC-FDMA), and supports 10- and 20-MHz channels. Each channel is divided into sub-frames (also referred to as transmission time intervals (TTIs)), RBs, and sub-channels. Sub-frames are 1 ms long. An RB is the smallest unit of frequency resource that can be allocated to a user; it is 180 kHz wide in the frequency domain and contains 12 subcarriers, which are 15 kHz each. C-V2X defines subchannels as a group of RBs in the same sub-frame, where the number of RBs per sub-channel can vary. Sub-channels are used to transmit data and control information. For the direct links 105, each full data packet (e.g., a beacon or cooperative awareness message) is transmitted in a transport block (TB) over Physical Sidelink Shared Channels (PSSCH), and the Sidelink Control Information (SCI) messages are transmitted over Physical Sidelink Control Channels (PSCCH). The PSSCH and PSCCH are transmitted on the same sub-frame, but the PSSCH and PSCCH may or may not be adjacent in the occupied RBs. A node intending to transmit a TB also transmits an associated SCI (also referred to as a scheduling assignment). The SCI includes information used by a receiving (Rx) node to decode the received data packet, such as the modulation and coding scheme (MCS) used for transmitting the TB, the RBs it uses, and the resource reservation interval for semi-persistent scheduling (SPS).

When configured to communicate over direct links 105 without network oversight, the vUEs 121 select their sub-channels by using a sensing-based SPS scheme where a vUE 121 measures received energy that meet predefined or configured latency requirements, ranks resources based on the measured received energy, and selects one of the lowest energy resources for transmission. A vUE 121 reserves the selected subchannel(s) for a few consecutive reselection packet-counter transmissions, which is randomly set between 5 and 15. The vUE 121 includes its reselection packet-counter value in the SCI. After each transmission, the reselection counter is decremented by one. When the counter reaches (or is equal to) 0, additional resources are selected and reserved with probability (1-P), where P can be set between 0 and 0.8. Additional resources also need to be reserved if the packet to be transmitted does not fit in the subchannel(s) previously reserved. The reselection counter is randomly chosen every time additional resources are to be reserved. Packets can be transmitted every 100 subframes (e.g., 10 packets per second (pps)) or in multiples of 100 subframes (e.g., up to a minimum of 1 pps). Each vUE 121 includes its packet transmission interval in the resource reservation field of its SCI. The semipersistent reservation of resources and the inclusion of the reselection counter and packet transmission interval in the SCI allows other vUE 121 to estimate which sub-channels are free when making their own reservation, which reduces packet collisions.

As shown by FIG. 1, some vUEs 121 are equipped to communicate according to a first V2X RAT (e.g., C-V2X), and some vUEs 122 are equipped to communicate according to a second V2X RAT (e.g., ITS-G5), While some vUEs 121/122 are equipped to communicate according to both the first and second V2X RATs (labeled as "vUEs 121/122" in FIG. 1), this is not the usual case, as most vehicle vendors do not want to implement both technologies because of the added costs. Therefore, coexistence techniques may be needed to allow the multiple, different V2X RATs to operate in a same area or region.

One coexistence approach is the "preferred channel" approach, which involves dynamically allocating a first channel (e.g., Channel 1 in FIG. 1) to be used exclusively by a first V2X RAT (e.g., C-V2X) and allocating a second channel (e.g., Channel 3 in FIG. 1) to be used exclusively by another V2X RAT (e.g., ITS-G5). This approach is also referred to as "frequency separation" where each RAT operates in its own frequency domain. However, the preferred channel approach does not take locally observed RAT penetration levels into account and may lead to an inefficient sharing of the radio resource between the competing V2X RATs. This means that radio resources may go unused at certain times of the day and/or in certain locations.

Another coexistence approach is the "co-channel existence" approach, which involves allocating both systems to a shared channel (e.g., Channel 2 in FIG. 1) during different time slots, for example, allocating the shared channel to be used by the first V2X RAT (e.g., C-V2X) during a first time period and allocating the shared channel to be used by the second V2X RAT (e.g., ITS-G5) during a second time period. However, operation of the at least two V2X RATs in the same channel (co-channel coexistence) has been shown to be highly inefficient. Furthermore, the need of spectral resources for any of the V2X RATs may vary considerably over a geographic area and time. For instance, some countries may introduce a particular V2X RAT earlier than others, or in some areas vehicles are equipped with one V2X RAT and other vehicles are equipped with a different V2X RAT.

As context for the applicable regulation and standardization, three safety channels of 10 megahertz (MHz) each are allocated in the 5.9 GHz ITS band. The 5G Automotive Association (5GAA) has suggested a so-called safe-harbor approach in which one channel is allocated to ITS-G5 and one channel to C-V2X in a fixed way (upper/lower channels). The middle channel should remain unused in the short-term. This proposal has been rejected by the Conference of Postal and Telecommunications Administrations (CEPT) Electronic Communication Committee (ECC), "SRDMG(17)136 ITS Background-Short Prel Action Plan and Background as well as reporting from ECC #46" ("SRDMG"), since regulation needs to be technology neutral. SRDMG has instead stated that the preferred channels approach may be viable. Instead of a fixed allocation of channels to individual RATs, such an allocation may be negotiated dynamically between the concerned systems. Further, although it is possible to have V2X RAT coexisting in the same channel (e.g., Listen Before Talk (LBT) based channel access) due to the different nature of the channel access protocols of ITS-G5 and C-V2X, this approach is considered to be highly inefficient.

FIG. 2A illustrates a Time Division Multiplexing (TDM) co-existence approach 200A for ensuring coexistence between different V2X RATs. The TDM approach 200A to co-channel coexistence includes allocation of resources for a first V2X RAT ("V2X RAT 1" in FIG. 2A) and resources for a second V2X RAT ("V2X RAT 2" in FIG. 2A), where the resources are allocated to the shared channel at different times. FIG. 2A the classical TDM approach in which a time domain partition is used to assign resources to the two V2X RATs a priori. The approach 200A involves defining a superframe length (e.g., for superframes 1-N in FIG. 2A, where N is a number) with deterministic start and end times that is known (or configured) by both RATs, as shown in FIG. 2A. Each superframe is divided in two or more slots, where each slot is occupied by a respective RAT. Depending on if/how often the partitions of time between the RATs are updated, different implementations are possible.

A static implementation of approach 200A includes a fixed TDM pattern in which the two RATs equally share the medium in time domain. In this case, the slot boundary between the two technologies is fixed and the partition of the resources does not change over time. Within each slot, one or multiple users within the same technology group may access the medium for transmission according to the technology intrinsic access method. A Semi-static implementation of approach 200A involves the slot boundary between the two RATs being periodically updated based on some mechanism such as using configuration updates or energy detection mechanism. The update could be triggered based on different conditions (e.g., traffic conditions in a specific area) and with a different periodicity. In this implementation, the time scale of update is much longer compared to a dynamic scheme. In the dynamic approach, the RATs adapt the slot boundary based on the current equipment rate or some other parameters, or combinations thereof.

Static TDM implementations usually lead to channel underutilization when the traffic load distribution between RATs changes. The example of FIG. 2A assumes that 50% of the traffic belongs to V2X RAT 1 and 50% of the traffic belongs to V2X RAT 2 for a given geographic location and at a given time. In such a case, each of the two systems/RATs will have 50% of the time resources reserved for their respective transmissions. However, this 50% split between the two V2X RATs does not account for the actual capacity allocated to a given technology, which depends on the locally observed penetration.

A semi-static update of the TDM configuration may be used, where the TDM pattern is periodically updated to match the RATs traffic load over a certain geographical area. However, even using the semi-static and dynamic TDM approaches requires that (a) both RATs have a common time reference, which can be provided by Global Navigation Satellite System (GNSS) or the like; (b) an overall frame structure (e.g., superframe) is known to both RATs; (c) a contiguous portion of the superframe timing is allocated to each RAT ($T_i$) where each RAT is allowed to transmit only in its allocated partition; (d) the TDM configuration (pattern) is repeated in every superframe; and (e) the slots which are dedicated to one technology are contiguous. Additionally, guard intervals at the end of each partition can be introduced to account for synchronization inaccuracies.

FIG. 2B depicts an example superframe 200B according to various embodiments. The superframe 200B includes time slots for RAT A and RAT B, which may correspond to V2X RAT 1 and V2X RAT 2 discussed herein. In other embodiments, additional RATs may be included in the superframe 200. The superframe boundary 202 contains two slots, one for each RAT. Each slot has a length expressed in a unit of time, and the superframe is a combination of these two slots. For example, $T_a$ is the length of the period RAT A is allowed to use the channel for transmission, and RAT B is not allowed to access the channel during this time. Additionally, $T_b$ is the length of the period RAT B is allowed to use the channel for transmission, and RAT A is not allowed to access the channel during this time. $T_a$ and/or $T_b$ can vary depending on the method and/or RAT implementation. The length of the superframe is expressed as $T_{sf}$, where $T_a+T_b=T_{sf}$. The slot boundary 6.304 may vary depending on, for example, equipment rate or the like. A guard time might be included in the beginning of $T_a$ and/or a guard time might be included in the beginning of $T_b$. The guard time is not depicted in FIG. 2B. Alternatively, guard times of each RAT may be used or inherent to provide a sufficient guard (e.g., AIFS for ITS-G5 or "guard period" in C-V2X).

One question to be resolved is how all involved ITS stations (ITS-Ss) are to agree on a reasonable split of the respective capacity depending on the locally observed penetration of both V2X RATs. The present disclosure provides embodiments that determine the locally observed penetration level of multiple V2X RATs, and provide mechanisms to decide and implement a fair share of the resources between competing V2X RATs depending on the observed penetration levels.

The technical approach discussed in Int'l App. No. PCT/US2019/035597 (WO2019/236714), filed on 5 Jun. 2019 (hereinafter "[PCT01]") does not provide a fixed allocation for two or more distinct V2X accessing the same band. Rather, edge network infrastructure (e.g., an edge server and/or edge compute node co-located with a base station, RSU, or the like) determines the required amount of spectrum for each vehicular communication system based on the number of vUEs using each type of V2X RAT, dynamically (or semi-statically) assigns a preferred channel allocation (depending on the local requirements), and forwards the allocation (or an indication of the allocation decision) to neighboring infrastructure (e.g., one or more RSUs). Additionally, in [PCT01], vUEs may send requests for a specific V2X RAT, and the edge network infrastructure dynamically (or semi-statically) assigns resources based on the number of requests for each type of V2X RAT.

The technical approach discussed in Int'l App. No. PCT/US2020/039642, filed on 25 Jun. 2020 (hereinafter "[PCT02]") improves upon [PCT01] by providing the available time resources of a channel to be shared fairly between different V2X RATs depending on the relative traffic load which is observed in a given geographic location and at a given time using distributed management and centralized management mechanisms. A corresponding parameterization may vary over time and space depending on the locally observed share between each V2X RAT at a given point in time.

IEEE 802.11 based network protocols (WiFi) utilize Carrier Sense Multiple Access with Collision Avoidance (CSMA/CA), which allows stations to determine whose turn it is to transmit a frame, how to avoid collisions, how to detect collisions, and how to gracefully recover from failed transmissions due to collisions and/or other errors, such as interference. WiFi carrier sense mechanisms are used to detect incoming transmission and occupied channels. WiFi includes two separate and distinct carrier sense functions including Clear Channel Assessment (CCA) and Network Allocation Vector (NAV). CCA is a physical carrier sense mechanism, which involves stations listening to received energy on the radio interface. NAV is virtual carrier sense mechanism, which is used by stations to reserve the medium for transmission that are to follow a current frame.

The present disclosure provides embodiments for coordinating the timing of all V2X RATs (e.g., including C-V2X, ITS-G5/DSRC, etc.) in a distributed manner by exploiting the NAV mechanisms as defined in IEEE 802.11 for DSRC/ITS-G5 systems.

DSRC/ITS-G5 and C-V2X systems need to synchronize on a single timing source, such as a Global Navigation Satellite System (GNSS) source. The synchronous timing is used to implement TDM for operating C-V2X and ITS-G5 in the same communication channel, for example, each V2X RAT has deterministic time slots for operation. In various embodiments, non-IEEE 802.11 (e.g., C-V2X) RATs (hereinafter "nI8 RAT") coordinate the TDM split of the frame, and determine when nI8 RAT station and IEEE 802.11 (e.g., DSRC/ITS-G5) RAT (hereinafter "I8 RAT") station transmissions are scheduled. This leads to a highly efficient coexistence approach requiring minimum changes or adjustments to currently existing nI8 and I8 systems.

When implementing NAV for V2X communication, one issue is how to decide which nI8 RAT equipped station (e.g., a vehicle ITS station (V-ITS-S), roadside ITS station (R-ITS-S), etc.) should issue a suitable NAV setting signal in order to force a silence period for I8 RAT systems. Embodiments herein use deterministic TDM time slots for I8 and nI8 managed by the nI8 system. In various embodiments, an nI8 RAT issues a NAV setting signal (e.g., an IEEE 802.11 CTS-to-self or a RTS/CTS sequence) prior to an nI8 transmission time slot, which forces the I8 RAT systems to stay off the air during the duration of the nI8 RAT transmission.

Another issue related to using NAV for V2X communication is how to manage which station should issue the NAV setting signal to set the NAV in a distributed setup/deployment. Embodiments include specific rules based on the station access to the previous frame for resolving this issue.

Embodiments herein introduce a NAV setting signal by nI8 RATs at the start of an nI8 frame in order to force I8 RAT stations off the resource during the nI8 RAT transmission interval. Embodiments herein include a mechanism to select an nI8 RAT station among a multitude of nI8 RAT stations available in a distributed system, which will issue the NAV setting signal to force I8 RAT stations off the resource during the nI8 RAT transmission interval.

The embodiments herein also define the content of the CTS-to-SELF signal, including multiple RAT1 transmission interval durations to be pre-configured, and a specific MAC address choice. The embodiments herein provide highly efficient transmitter implementation scheme based on a look-up table storage of the CTS-to-SELF content for several alternatives on the possible RAT1 transmission interval durations and the selected MAC address. The embodiments include a frame structure, introducing guard intervals between the CTS-to-SELF transmission and the start of the RAT1 part. The embodiments herein provide a protocol for negotiating the maximum transmission interval period for multiple different RATs such as C-V2X and ITS-G5/DSRC.

The various embodiments discussed herein enable to practical implementation of ensuring coexistence through protection of the RAT1 period through a CTS-to-SELF transmission In the following description, methods, configurations, and related apparatuses are disclosed for the management of coexistence and interoperability between multiple V2X RATs (or standards), including preferred channel allocations between multiple radio communication technologies in connection with Edge Computing services and communication architectures. Although the embodiments herein are discussed in the context of automotive vehicles, the embodiments may also apply to other types of vehicles including, aircraft, watercraft, and/or the like.

The following discussion introduces an approach to use Edge Network entities in support of the preferred channels approach and the dynamic allocation of channels among multiple V2X RATs. The technical approach discussed herein is acceptable by regulation administrations (they allow for a dynamic allocation, called "preferred channels" approach) and leads to a highly efficient overall solution, that is much more efficient than both systems existing in the same channel. Further, offering a solution that considers the inclusion of these two alternative technologies (e.g., the so-called technology neutral approach), will provide better interoperability in the V2X ecosystem, and the possibility to offer V2X/ITS services across wider deployments.

The following description provides a detailed discussion of these techniques within MEC systems and services, applicable to the larger context of Internet of Things (IoT) and fog network deployments. It will be understood that the disclosed MEC system and service deployment examples provide one illustrative example of a fog device or fog system, but that many other combinations and layouts of devices located at the edge of a network may be provided. Further, the techniques disclosed herein may relate to other IoT standards and configurations, and other intermediate processing entities and architectures. The present techniques and configurations may provide significant benefits to MEC architectures and other IoT device network architectures involving any number of edge computing devices or fog computing platforms.

For illustrative purposes, the following description is provided for deployment scenarios including vehicles (including computer-assisted and/or autonomous vehicles) in a two dimensional (2D) freeway/highway/roadway environment wherein the vehicles are automobiles. However, the embodiments described herein are also applicable to other types of vehicles, such as trucks, busses, motorboats, motorcycles, electric personal transporters, and/or any other motorized devices capable of transporting people or goods. The embodiments described herein may also be applicable to three dimensional (3D) deployment scenarios where some or all of the vehicles are implemented as flying objects, such as aircraft, drones, unmanned aerial vehicles (UAVs), and/or to any other like motorized devices.

1. Nav Setting Signal Embodiments

NAV is a virtual carrier-sensing mechanism used with wireless network protocols such as IEEE 802.11 (also referred to as "WiFi") and IEEE 802.16 (also referred to as "WiMAX"). Virtual carrier-sensing is a logical abstraction, which limits the need for physical carrier-sensing at the air interface in order to save power. The NAV-based MAC layer frame headers contain a duration field that specifies the transmission time required for the frame during which the medium will be occupied. The stations (e.g., access points, UEs, etc.) listening on the wireless medium read the duration field and set their local NAV, which is used by each receiving station to determine how long they should defer from accessing the medium.

In the IEEE 802.11 and DSRC/ITS-G5 standards, the NAV indicator indicates the time period that a transmitting station intends to occupy the medium for transmitting data. The NAV may be considered to be a type of counter that counts down to zero at a uniform rate. When the counter is zero, the virtual carrier-sensing indication indicates that the medium is idle. When the counter has a non-zero value, the virtual carrier-sensing indication indicates that the medium is busy. The medium is also considered to be busy when the station is transmitting. In IEEE 802.11, the NAV represents the number of microseconds (µs) the transmitting station intends to hold the medium busy with a maximum of 32,767 µs. When the transmitting station sends an RTS, the receiving station waits one SIFS before sending a CTS. Then, the transmitting station waits for another SIFS before transmitting data, and the receiving station waits an SIFS before sending an ACK. In this case, the NAV is the duration from the first SIFS to the ending of ACK, and during this time the medium is considered busy.

According to various embodiments, an nI8 RAT system (e.g., LTE or NR C-V2X) will take over the overall timing management of all RATs including nI8 RATs and I8 RATs. This is achieved through the setting of the IEEE 802.11 Network Allocation Vector (NAV), which is a virtual carrier-sensing mechanism that limits the need for physical carrier-sensing at the air interface in order to improve power efficiency. The MAC layer frame headers contain a duration field that specifies the transmission time required for the frame (e.g., indicating the time for which the medium will be busy). In these embodiments, the nI8 RAT station sets the duration field in the MAC layer frame to specify the transmission time required for the data frame(s). The other ITS-Ss will listen on the wireless medium to obtain the MAC layer frame. When the other stations obtain the MAC layer frame, they read the duration field and set their NAV indicator/counter with the value included in the duration field (e.g., indicating an amount of time the other stations must abstain from accessing the medium). For example, in the IEEE 802.11 standard (and thus potentially also for ITS-G5), the NAV indicates the time period which is intended to be held by the ITS-S, and can be a maximum of 32.767 µs. In this way, the I8 RAT stations will behave as "hidden terminals" during the nI8 RAT station transmissions and will refrain at accessing the channel. The total time a I8 RAT station will defer access is the NAV time plus a configured AIFS time.

In conventional distributed CSMA/CA protocols, the process to resolve the hidden terminal problem is implemented as follows: The transmitter sends an RTS, and the receiver waits one SIFS before sending a CTS signal. Alternatively, a CTS-to-self signal may be sent including the duration field, which will be used to set the NAV. Then, the transmitter will wait for another SIFS before sending the payload data. Afterwards, the receiver will wait a SIFS before sending ACK. Following this reasoning, the NAV is the duration from the first SIFS to the ending of ACK. During this time the medium is considered busy. In various embodiments, a first V2X RAT (RAT1) terminal broadcasts an IEEE 802.11 sequence (e.g., a CTS-To-self, RTS, CTS, RTS/CTS, etc.), which will make the second V2X RAT (RAT2) stations to set their NAV, in order to get protection during the RAT1 transmission period.

Figure 3:
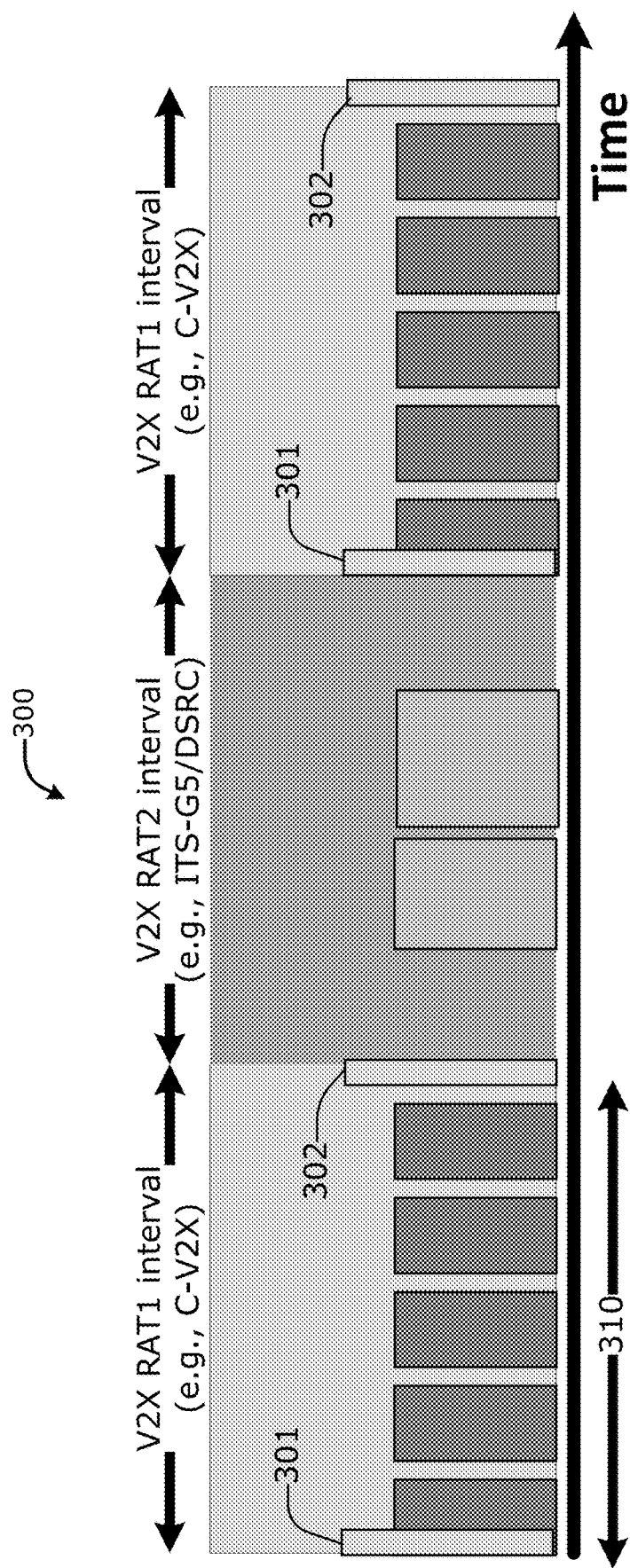
FIGS. 3 and 4 illustrate example NAV operations according to various embodiments.

FIG. 3 shows an example NAV operation 300 wherein a RAT1 (e.g., LTE/NR C-V2X) station broadcasts an IEEE 802.11 sequence (e.g., CTS-to-self, RTS, CTS, RTS/CTS, etc.), which cause the RAT2 (e.g., DSRC/ITS-G5) stations to set their NAV indicators (counters) in order to get protection during the V2X RAT1 transmission period. after setting the NAV, the RAT1 transmission is protected from RAT2 interference.

In FIG. 3, prior to a RAT1 transmission in interval 310, the RAT1 issues a NAV setting request 301 (or "Set NAV") applying the corresponding signaling as defined in IEEE 802.11 as a mandatory feature. Consequently, the RAT1 transmission interval will be protected from RAT2 transmissions occurring at the same time. At the end of the RAT1 transmission (or prior to the end of the interval 310), the NAV is automatically released 302, no additional signaling is required. Then, the RAT2 system will have no restrictions and is able to access the medium applying its standard protocol until the next NAV is issued by RAT1.

Figure 4:
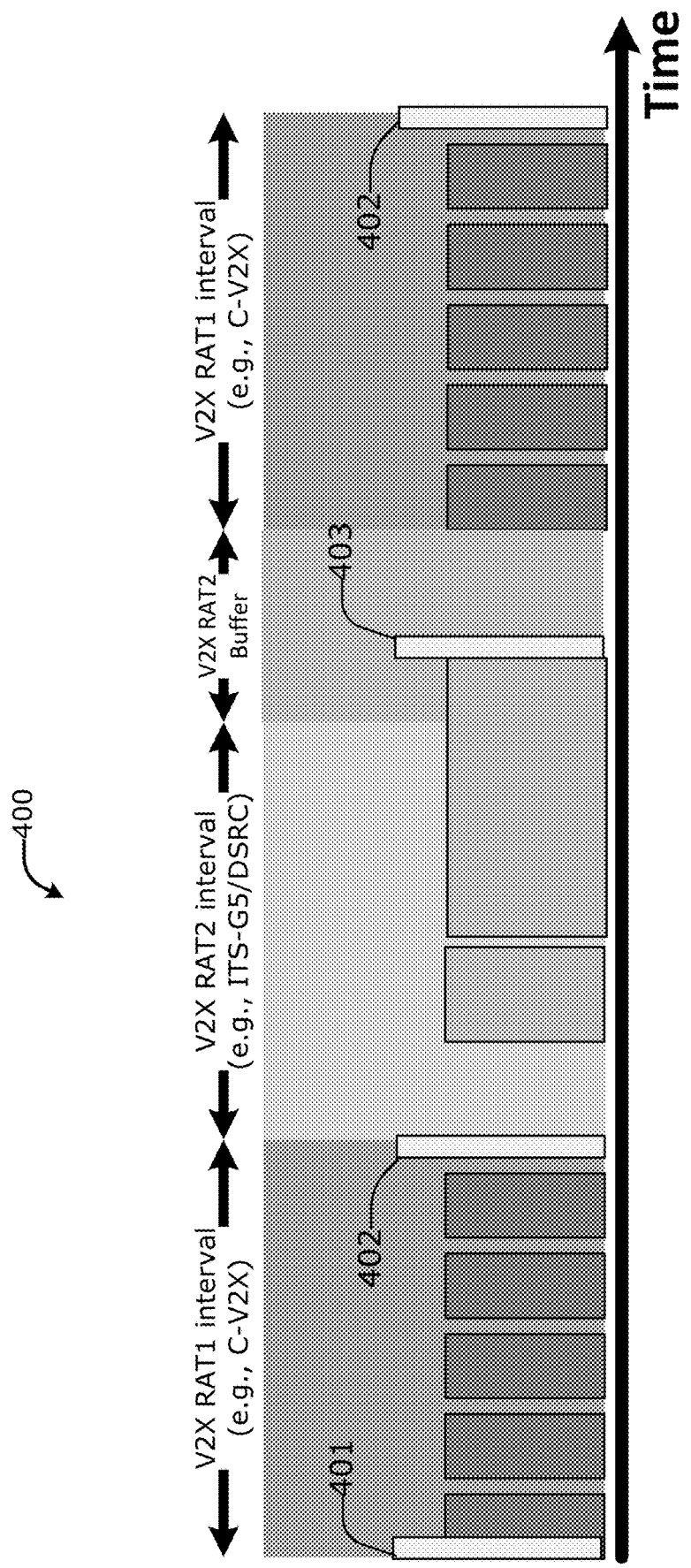

In some cases, it is possible that RAT2 transmission exceeds the boundaries of their respective slots. In this case, a NAV setting is to occur either early (within the RAT2 slot) or just after the final RAT2 transmission, which is practically introducing a buffer zone after the end of the RAT2 frame as illustrated by FIG. 4, which shows another example NAV operation 400. In FIG. 4, the NAV setting signal 401 is transmitted at the beginning of the first RAT1 interval, and the NAV is released 402 at the end of the first RAT1 interval. Additionally, another NAV setting signal 403 is set (or sent) after the last RAT2 transmission is finalized in the RAT2 interval (as part of a RAT1 buffer period). The buffer period may be a separate interval, part of the RAT2 interval or part of the RAT1 interval.

In embodiments, the signal "Set NAV" 301, 401, 403 is implemented through a RTS/CTS sequence or a CTS-to-self sequence. The Indication "Release NAV" is typically not a signal on the air but simply an illustration that the originally set NAV will "expire" at the end of the V2X RAT1 interval. Then, the resource is again available for the V2X RAT2 transmissions as shown by FIGS. 3 and 4.

Not all RAT1 stations need to issue the NAV setting signal and there are multiple possible rules to establish which station will issue the signal, preventing all RAT2 stations to transmit during the RAT1 interval. For example, during the semi-persistent scheduling (SPS) procedure, the RAT1 station which allocated a specific resource in the available resource pool, will be also the one eligible to issue the NAV setting signal.

1.1. Station Selection for Issuing NAV Setting Signal

In various embodiments, among all RAT1 stations within a given coverage area, only a single RAT1 station issues the NAV setting signal (e.g., through RTS/CTS or CTS-to-Self). In these embodiments a negotiation may take place to identify the RAT1 station that will be tasked with issuing the NAV setting signal among the multitude (e.g., possibly hundreds) of available RAT1 stations within a given coverage area.

Figure 5:
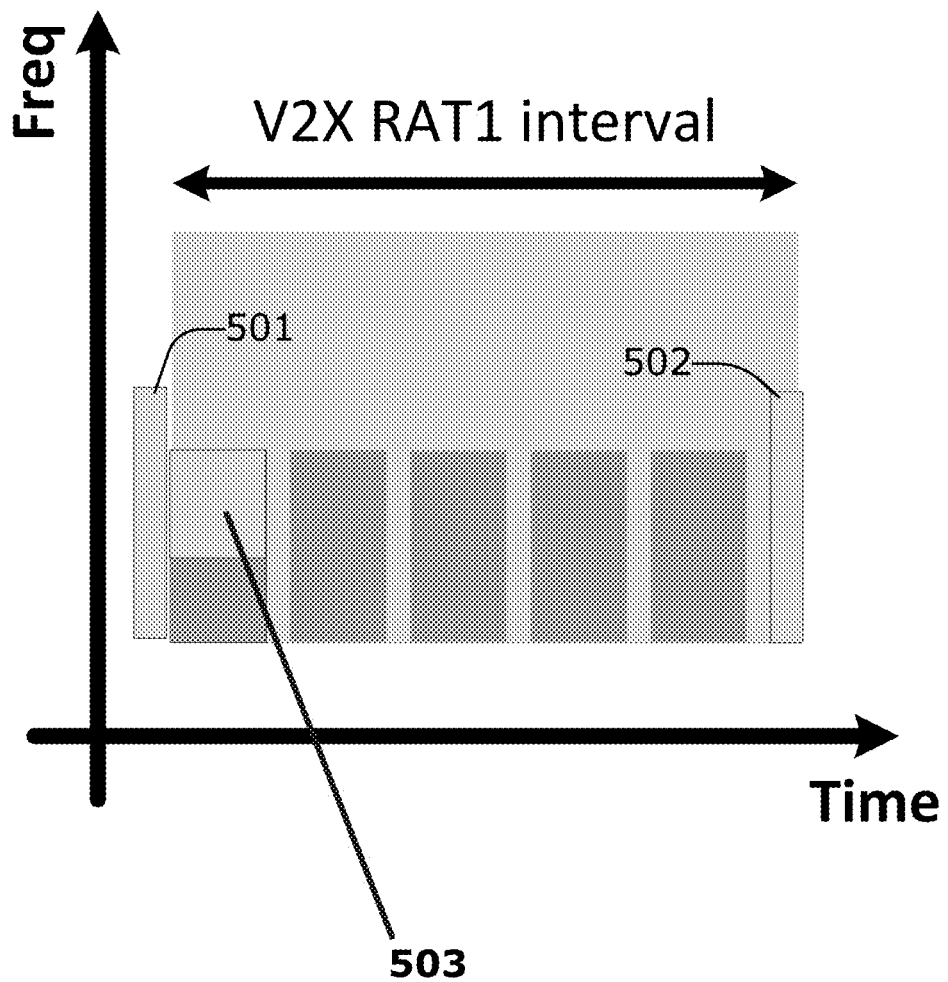
FIGS. 5 and 6 illustrate example of a V2X station resource allocation schemes according to various embodiments.

In various embodiments, RAT1 stations typically share the available resource by allocating to themselves specific sub-channels at specific times using semi-persistent scheduling (SPS) as shown by FIG. 5. In FIG. 5, a subchannel 503 is taken by a specific (single) V2X RAT1 station. In such embodiments, the RAT1 station to issue the NAV setting signal 501 (e.g., through an RTS/CTS, CTS-to-Self sequence, or the like) will be selected as function of its sub-channel allocation in the previous RAT1 frame (or some RAT1 frame(s) that took place before the current RAT1 frame). The NAV is released 502 in a same/similar manner as discussed previously.

The RAT1 station issuing the NAV setting signal will be selected as function of its sub-channel allocation in the previous RAT1 frame (or one of the previous RAT1 frames). In one example, the rule is that the RAT1 station is selected to issue the NAV setting signal at the beginning of the next RAT1 super frame, which has occupied the sub-channel in the "upmost left corner" (e.g., highest occupied frequency and earliest occupied time) of all occupied subchannels.

Other rules may be used in other embodiments, for example, using the "lowest left corner" (e.g., lowest occupied frequency and earliest occupied time) of all occupied subchannels, "upmost right corner" (e.g., highest occupied frequency and latest occupied time) of all occupied sub-channels, "lowest right corner" (e.g., lowest occupied frequency and latest occupied time) of all occupied subchannels, and/or some other resources. In embodiments, the first occupied subchannel is used for the selection rules. To give an example using the "lowest left corner" (e.g., lowest occupied frequency and earliest occupied time) rule, the corresponding subchannel may relate to a transmission any time within the RAT1 transmission interval if previous resources remain unused as illustrated in FIG. 5.

Figure 6:
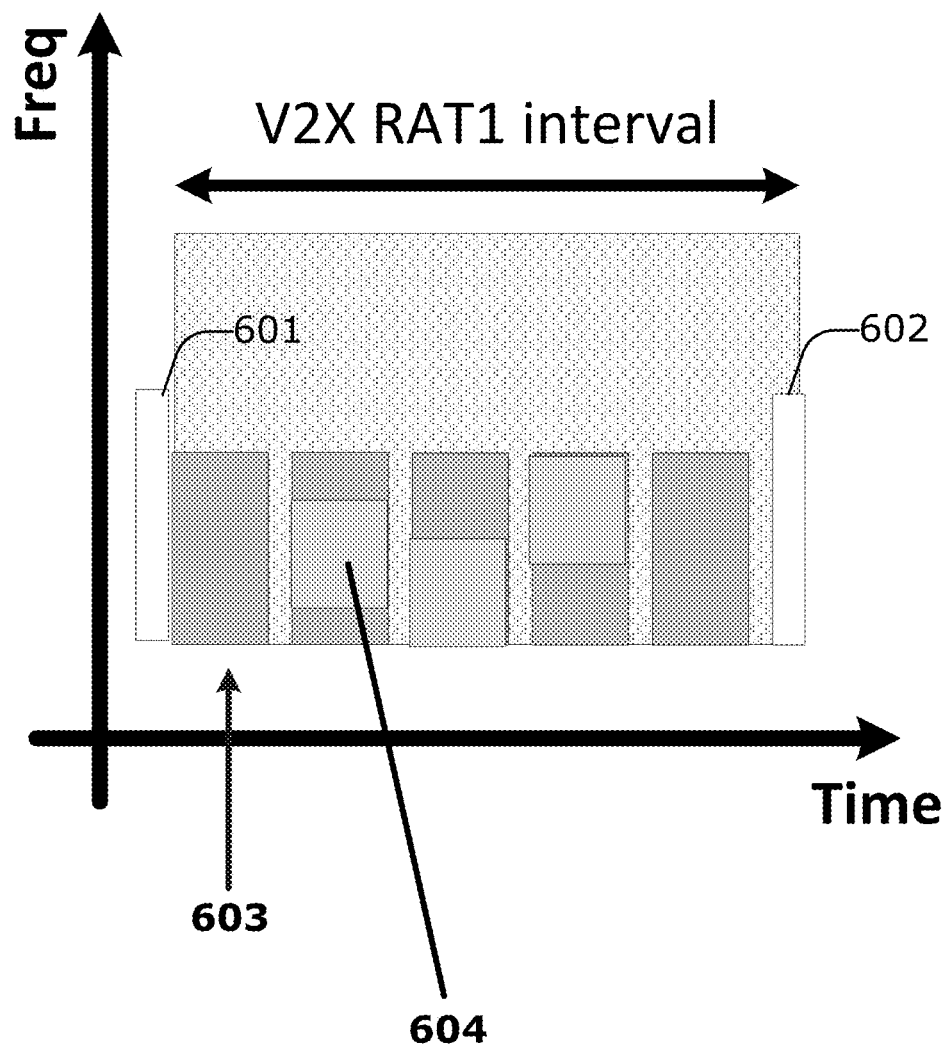

In any of the aforementioned embodiments, the first occupied subchannel is used for the above rules. To give an example using the "lowest left corner" (e.g., lowest occupied frequency and earliest occupied time) rule, the corresponding subchannel may relate to a transmission any time within the RAT1 transmission interval if previous resources remain unused as illustrated by FIG. 6. In FIG. 6, a NAV setting signal 601 is transmitted, and resource(s) 604 is the first used subchannel using the "uppermost left corner" rule. The RAT1 station performing the first transmission in the "upmost left corner" 604 of the available resources is tasked to issue the NAV setting signal 601 in the beginning of the next RAT1 interval (after the RAT1 interval shown by FIG. 6) to prevent RAT2 stations from accessing the channel. After the NAV release 602 and a RAT2 interval (not shown), the V-ITS-Ss 121 occupying the "upmost left corner" resources 604 will send the next NAV setting signal 601 at the beginning of the next RAT1. The embodiments for selecting which RAT1 station will transmit a specific IEEE 802.11 signal can be applied to any type of header that is valid for the transmission of several RAT1 stations.

1.2. New ITS-G5 Station Entering NAV Setting Range

Also, the case that new RAT2 stations may enter the coverage area of a specific transmission (of the NAV setting signal) needs to be addressed. In case that the new RAT2 stations arrive during the RAT1 transmission interval, it may not have received the NAV setting signal and may start transmitting during the RAT1 period as illustrated in FIG. 6 at 603. In case a RAT2 station enters the coverage area at 603, which is after the transmission of the NAV setting signal 601, then the protection for RAT1 is not activated for this specific RAT2 station. Thus, the newly arrived RAT2 station may start transmitting during the RAT1 interval.

To address these scenarios, in various embodiments, the RAT2 station waits for the reception of a NAV setting signal before accessing the medium. In the example of FIG. 6, the RAT2 station will wait until the start of a new full RAT1 transmission interval (taking place after the interval shown by FIG. 6). The RAT2 station may only start transmitting in the shared channel when the new RAT2 interval starts.

However, in some cases, the new RAT2 station may not receive a NAV setting signal. This situation may occur if, for example, there are no RAT1 stations nearby or due to other sources of channel/radio interference. To address this issued, in some embodiments, the RAT2 station may transmit in the shared channel after waiting for a predetermined or configured number of intervals (e.g., 2 or 3 intervals) without reception of a NAV setting signal.

1.3. CTS-to-Self as NAV Setting Signal and Frame Format Embodiments

A station (STA) is able to properly construct a subset of MAC frames for transmission and decode a (potentially different) subset of MAC frames upon validation following reception. The particular subset of these frames that the STA constructs and decodes is determined by the functions supported by that particular STA. The STA validates every received frame using the frame check sequence (FCS) and to interpret certain fields from the MAC headers of all frames.

Each frame includes the following basic components: a MAC header including frame control, duration, address, optional sequence control information, optional QoS Control information (QoS Data frames only), and optional HT Control fields (+HTC frames only); a variable-length frame body, which contains information specific to the frame type and subtype; and an FCS, which contains a 32-bit CRC based on ITU-T Recommendation V.42, Error-correcting procedures for DCEs using asynchronous-to-synchronous conversion ITU-T V.42 (hereinafter "[ITUTV42]").

When a STA needs to distribute NAV information, for instance, to reserve a medium for a transmission, the STA may first transmit a CTS frame with the RA field equal to its own MAC address (referred to as a "CTS-to-Self" frame or the like) if the node is a non-DMG STA.

Figure 7A:
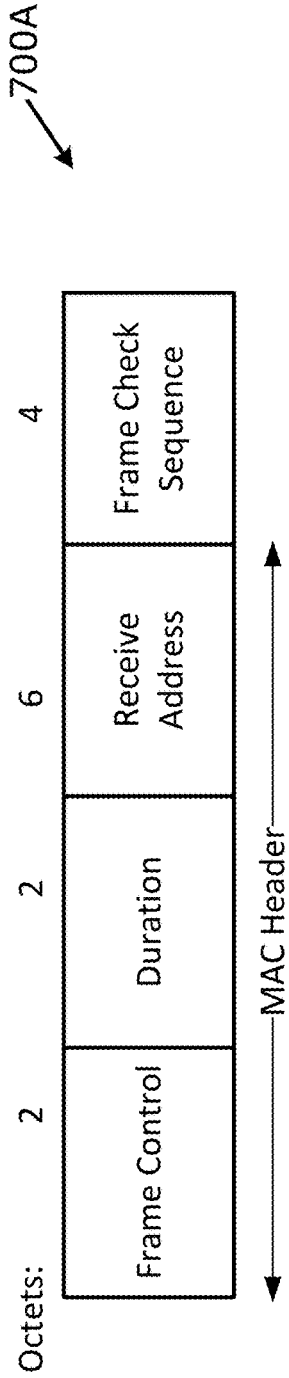
FIG. 7A illustrates an example Clear-to-Send (CTS) frame according to various embodiments.

FIG. 7A shows an example frame format for the CTS frame 700A on the MAC layer (see e.g., Section 9.3.1.3 of [IEEE80211]). The CTS frame 700A is a MAC layer frame or MAC protocol data unit (MPDU). An MPDU is a unit of data exchanged between two peer MAC entities using the services of the PHY.

In FIG. 7A, the CTS frame 700A includes a frame control field of 2 octets, a duration field of 2 octets, a Receive Address (RA) field of 6 octets, and an FCS field of 4 octets. The first three subfields of the Frame Control field are Protocol Version, Type, and Subtype, and the remaining subfields of the Frame Control field depend on the setting of the Type and Subtype subfields. This is discussed in more detail in section 9.2.4.1 of [IEEE80211].

The RA field contains an IEEE MAC individual or group address that identifies the intended immediate recipient STA(s), on the WM, for the information contained in the frame body field. As mentioned previously, a CTS-to-self frame is a CTS frame in which the RA field is equal to the transmitter's MAC address.

When the CTS frame 700A is a response to an RTS frame, the value of the RA field of the CTS frame 700A is set to the address from the TA field of the RTS frame with the Individual/Group bit forced to the value 0. When the CTS frame 700A is the first frame in a frame exchange, the RA field is set to the MAC address of the transmitter.

For all CTS frames 700A transmitted by a non-QoS STA in response to RTS frames, the duration value is the value obtained from the Duration field of the immediately previous RTS frame, minus the time, in microseconds (μs), required to transmit the CTS frame 700A and its short interframe space (SIFS). If the calculated duration includes a fractional μs, that value is rounded up to the next higher integer. For all RTS frames sent by non-QoS STAB, the duration value is the time, in μs, required to transmit the pending Data or Management frame, plus one CTS frame 700A, plus one ACK frame, plus three SIFSs. If the calculated duration includes a fractional μs, that value is rounded up to the next higher integer. The SIFS period (e.g., "aSIF- STime") may be the nominal time (e.g., in μs) that the MAC and PHY require in order to receive the last symbol of a frame on the WM, process the frame, and respond with the first symbol on the WM of the earliest possible response frame (see e.g., section 10.3.7 in [IEEE80211]). In some implementations, the SIFS is 10 μs (see e.g., section 18.4.5 in [IEEE80211]).

At a non-QoS STA, if the CTS frame 700A is the first frame in the exchange and the pending Data or Management frame requires ACK, the duration value is the time, in μs, required to transmit the pending Data or Management frame, plus two SIFSs plus one ACK frame. At a non-QoS STA, if the CTS frame 700A is the first frame in the exchange and the pending Data or Management frame does not require acknowledgment, the duration value is the time, in μs, required to transmit the pending Data or Management frame, plus one SIFS. If the calculated duration includes a fractional μs, that value is rounded up to the next higher integer. For other CTS frame 700A transmissions by a QoS STA, the duration value is set as defined in section 9.2.5 of [IEEE80211].

The total size of the CTS frame 700A is then 14 octets or 112 bits. A physical layer (PHY) frame or PHY Protocol Data Unit (PPDU) is a unit of data exchanged between PHY entities to provide the PHY data service.

Figure 7B:
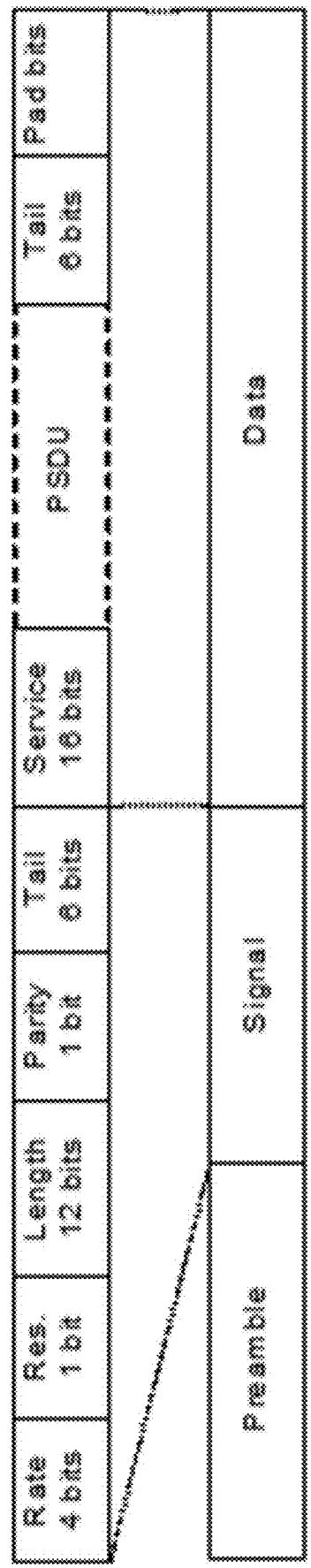
FIG. 7B illustrates an example Physical layer Protocol Data Unit (PPDU) format according to various embodiments.

FIG. 7B shows an example PPDU format 700B according to various embodiments. As shown by FIG. 7B, the PPDU 700B includes a single PHY service data unit (PSDU). The PSDU in the PPDU contains the MAC layer PDU, which in various embodiments, may be or carry the CTS-to-Self frame. By adding the service plus data bits to the CTS frame, the frame may include 134 bits.

The symbol interval in IEEE 802.11p is 8 μs (e.g., 6.4 μs symbol duration+1.6 μs guard interval) and the number of symbols necessary to transmit one CTC-to-self depends on the choice of the transfer rates (e.g., modulation scheme and coding rate employed (MCS)). Table 2 provides the supported transfer rates and MCS, as well as the corresponding total number of (uncoded and coded) bits per OFDM symbols and the corresponding necessary number of OFDM symbols $N_{NAV}$ to transmit the NAV setting signal (e.g., the CTS-to-Self frame in this case). The support of 3 Mbit/s, 6 Mbit/s, and 12 Mbit/s is mandatory for IEEE 802.11p and ITS-G5/DSRC.

Figure 8:
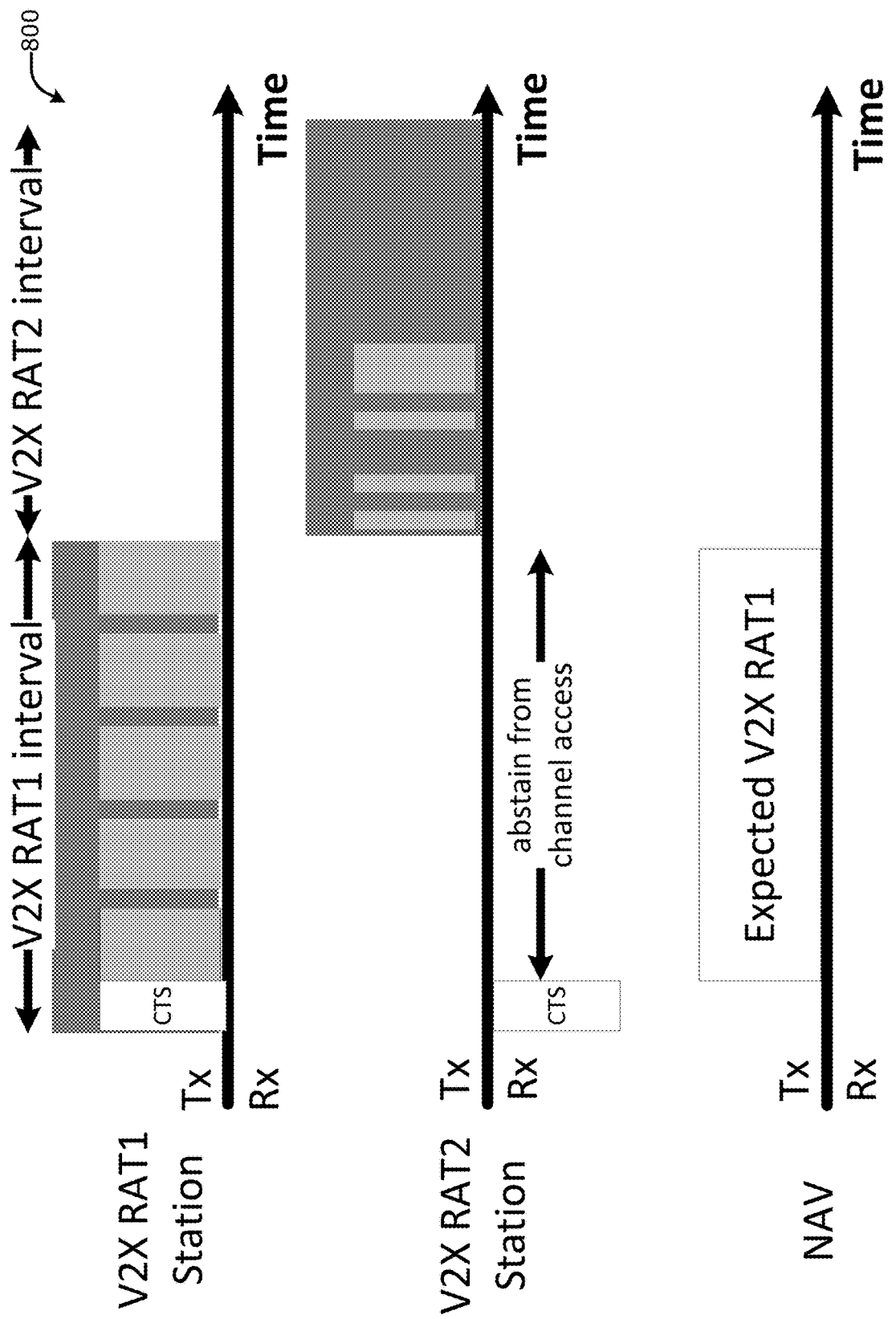
FIG. 8 shows an example of the basic operation of the protection mechanism using the CTS-To-Self signal.

FIG. 8 shows an example 800 of the operation of the protection mechanism using the CTS-To-Self signal, according to various embodiments. Although the RAT1 station sends the CTS-to-itself, all RAT2 stations in or around the vicinity of the RAT1 station or a particular coverage area listen to CTS frames and update the NAV accordingly. In some embodiments, the CTS frame is sent at the maximum speed at which it can be sent, using a modulation that can be received by all RAT2 stations.

The IEEE 802.11 specification defines the CTS content on the MAC layer (e.g., MAC layer protocol data unity (MPDU)), is discussed in Section "9.3.1.3 CTS frame format" of [IEEE80211], and is also depicted in Table 1.

TABLE 1

CTS frame format

| 2 octets | 2 octets | 6 octets | 4 octets |
|---|---|---|---|
| Frame Control | Duration | RA (Receive Address) | FCS (Frame Check Sequence) |

[IEEE80211], states that a "CTS-to-self frame is a CTS frame in which the RA field is equal to the transmitter's MAC address." More details on employing the transmitter's MAC address and a potential solution can be found at the end of this clause. The total CTS frame size is then 14 octets or 112 bits. In the PPDU, the overhead of service plus tail to the CTS frame (PSDU) are added and end up with 134 bits as "data" in the PPDU.

The symbol interval in IEEE 802.11p is 8 μs (e.g., 6.4 μs symbol duration+1.6 μs guard interval) and the number of symbols necessary to transmit one CTS-to-Self depends on the choice of the transfer rates (e.g., modulation scheme and coding rate employed (MCS)).

Table 2 provides the supported transfer rates and MCS, as well as the corresponding total number of (uncoded and coded) bits per OFDM symbols and the corresponding necessary number of OFDM symbols $N_{NAV}$ to transmit the NAV setting signal (e.g., the CTS-to-Self frame in this case). The support of 3 Mbit/s, 6 Mbit/s, and 12 Mbit/s is mandatory for IEEE 802.11p and ITS-G5/DSRC.

TABLE 2

Number of symbols necessary for transmitting the NAV setting

| Transfer rate (Mbit/s) | Modulation scheme | Coding rate | Data bits per OFDM symbol | Coded bits per OFDM symbol | Number of OFDM symbols for NAV ($N_{NAV}$) |
|---|---|---|---|---|---|
| 3 | BPSK | 1/2 | 24 | 48 | 6 |
| 4,5 | BPSK | 3/4 | 36 | 48 | 4 |
| 6 | QPSK | 1/2 | 48 | 96 | 3 |
| 9 | QPSK | 3/4 | 72 | 96 | 2 |
| 12 | 15-QAM | 1/2 | 96 | 192 | 2 |
| 18 | 16-QAM | 3/4 | 144 | 192 | 1 |
| 24 | 64-QAM | 2/3 | 192 | 288 | 1 |
| 27 | 64-QAM | 3/4 | 216 | 288 | 1 |

The duration of each component of the physical structure is outlined in Table 3.

TABLE 3

The duration of the physical structure components

| PHY Preamble | Signaling information | MAC content |
|---|---|---|
| 32 μs (4 OFDM symbols) | 8 μs (1 OFDM symbol) | $N_{NAV}$*8 μs |

The total duration of the CTS-to-Self signal will in that case be 88 μs (or 72 μs), 64 μs, and 56 μs for the mandatory IEEE 802.11p MCS BPSK ½, QPSK ½ and 16-QAM ½, respectively.

The NAV setting time is given in the "Duration" Field of 16 bits specified in Clause "9.2.4.2 Duration/ID field" in [IEEE80211], which indicates the duration of the RAT1 transmission interval plus suitable guard periods. For example, the intervals for RAT1 (e.g., C-V2X) and RAT2 (e.g., ITS-G5/DSRC) in FIG. 3 are protected by the NAV setting signal according to various embodiments. In FIG. 3, after setting the NAV 301 in interval 310, the RAT1 (e.g., LTE/NR C-V2X) transmission is protected from RAT2 interference.

In some embodiments, the minimum value is 0 and the maximum 32,767 microseconds (μs). One example of a set of values for the duration can be employed according to the level of penetration of RAT1 equipped stations or according to the number of RAT1 stations in a specific geographical area as provided by Table 4.

TABLE 4

Example of set values for the duration

| | Percentage of LTE-V2X Stations | Duration of LTE-V2X Transmission Interval ("Duration Field") | Duration of ITS-G5 Transmission Interval |
|---|---|---|---|
| option 0 (implicit) | 0% exactly (no LTE-V2X users and no CTS-to-Self) | 0 ms | 10 ms |
| option 1 | <15% | 1 ms | 9 ms |
| option 2 | [15-25[% | 2 ms | 8 ms |
| option 3 | [25-35[% | 3 ms | 7 ms |
| option 4 | [35-45[% | 4 ms | 6 ms |
| option 5 | [45-55[% | 5 ms | 5 ms |
| option 6 | [55-65[% | 6 ms | 4 ms |
| option 7 | [65-75[% | 7 ms | 3 ms |
| option 8 | [75-85%] | 8 ms | 2 ms |
| option 9 | >85% | 9 ms | 1 ms |
| Option 10 (implicit) | 100% exactly (no ITS-G5 users and no CTS-to-self) | 10 ms | 0 ms |

In embodiments, the receiving RAT2 station should refrain from transmitting during the corresponding RAT1 transmission interval. Additionally, RAT1 stations should refrain from transmitting during the corresponding RAT2 transmission interval. The MAC address of the issuing station is selected as follows.

In one embodiment, a unique MAC address is provided to each RAT1 station. In this embodiment, the unique MAC address is used for the corresponding field in the CTS-to-SELF frame.

In another embodiment, an identical MAC address may be used for all RAT1 stations. This may be used to protect the privacy of the CTS-to-Self transmitting station so that the MAC address field is not filled with its own MAC address. As examples, a general/generic address is used by all RAT1 stations, such as all zeros or all ones (1). In this embodiment, the general/generic MAC address is used for the corresponding field in the CTS-to-SELF frame.

In another embodiment, since the MAC address is irrelevant for this specific use of the CTS-to-Self as NAV setting signal, the RA field could be completely omitted (the main information conveyed is the duration of the NAV). In another embodiment, if the Tx RAT1 station also has a WiFi component/modem (e.g., not necessarily ITS-G5/DSRC, but commercial WiFi modem circuitry), the MAC address of the accompanying WiFi component/modem may be used. In either of these embodiments, this MAC address is used for the corresponding field in CTS-to-SELF.

Figure 9:
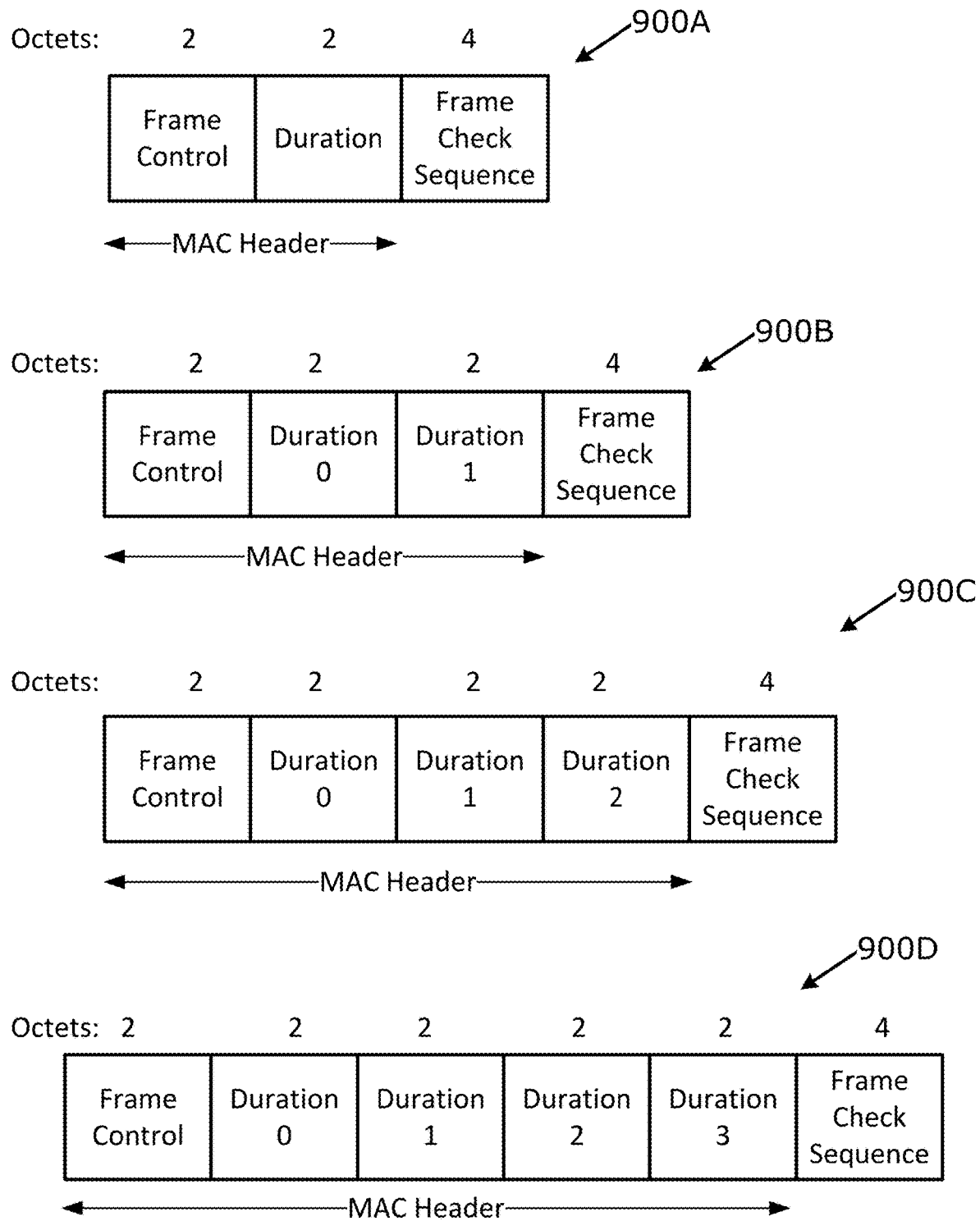
FIG. 9 illustrates example CTS-to-Self frames formats according to various embodiments.

In another embodiment, the RA field could be omitted since the RA field may be irrelevant or nearly irrelevant for the envisioned application of the CTS-to-Self NAV setting signal, for example, in a broadcast mode without real interest or undesired to know the origin of the signal. FIG. 9 shows an example modified frame 900A for this modified CTS-to-Self signal embodiment. In this modified CTS-to-Self signal, the modified frame is outlined in Table 5.

TABLE 5

| Modified CTS-to-Self signal | | |
|---|---|---|
| 2 octets | 2 octets | 4 octets |
| Frame Control | Duration | Frame Check Sequence (FCS) |

The total new CTS frame size is then 8 octets or 64 bits reducing the total number PHY data to 86 bits. The new total duration of the CTS-to-Self signal will in this case be 88 μs or 72 μs for binary phase-shift keying (BPSK) ½, 56 μs for quadrature phase-shift keying (QPSK) ½, and 48 μs 16-state quadrature amplitude modulation (16-QAM) ½ (see e.g., Table 2 and Table 3 supra).

In another embodiment where the RA field is omitted, the Duration field is extended by $N\_d$ more octets, where $N\_d=0, \ldots, 6$. With that modification the NAV setting would allow for longer transmission time of the RAT1 station. By following a similar duration mapping, the maximum NAV duration (e.g., for $N\_d=6$, would become 131, 068 μs).

In another embodiment where the RA field is omitted, 1 to 3 additional durations (or duration fields) are included as is shown by frames 900B, 900C, and 900D in FIG. 9. With these additional NAV durations, the RAT1 stations can configure up to 4 transmission intervals that can be employed in successive transmission times, alternating with the corresponding RAT2 transmission time as defined in the table in the previous page. This would allow to refrain sending the NAV setting signal in those successive RAT1 transmission intervals.

1.4. CTS-to-SELF Signal Transmission Embodiments

Figure 10:
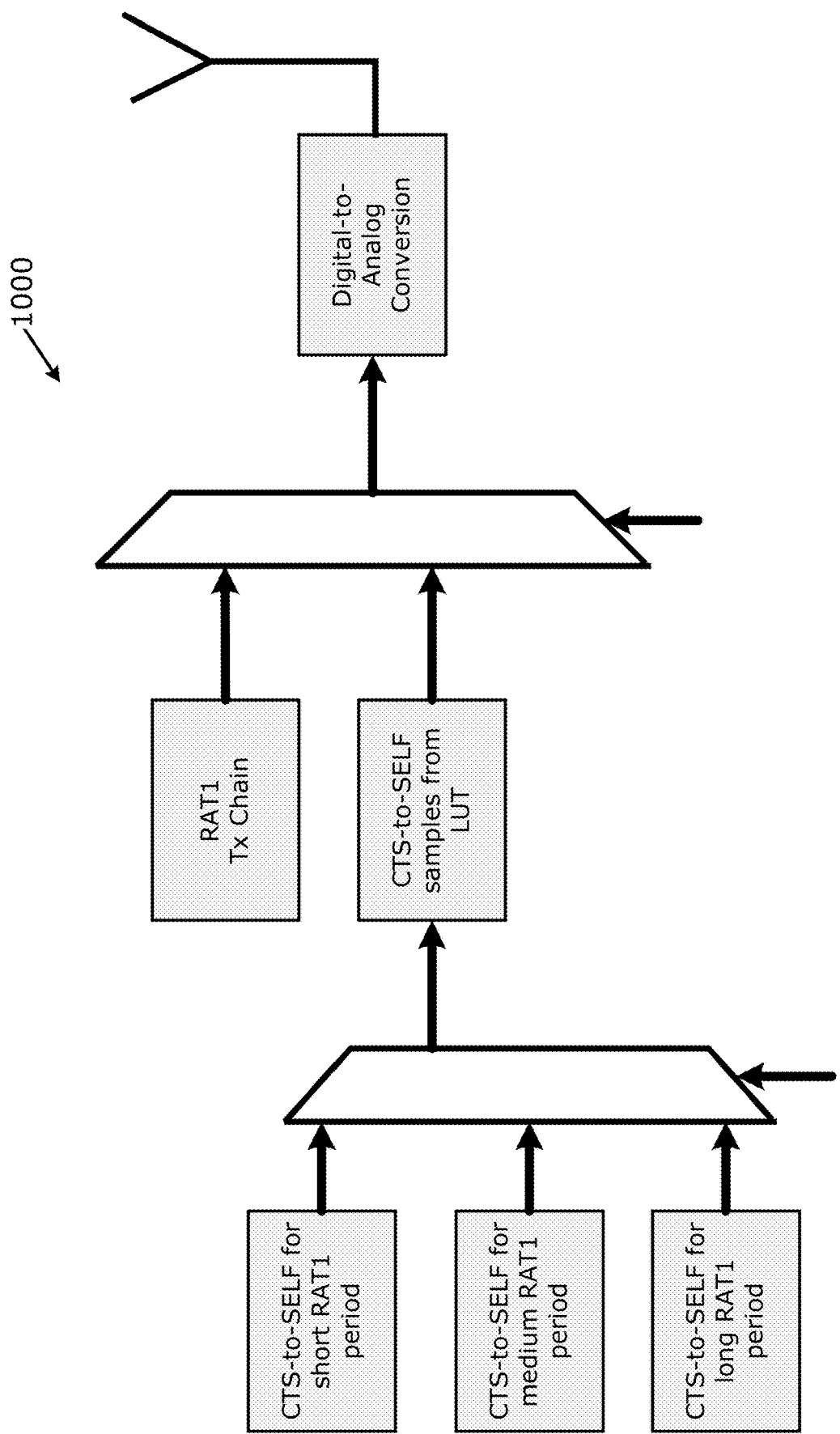
FIG. 10 shows an example implementation architecture according to various embodiments.

FIG. 10 shows an example implementation architecture 1000 according to various embodiments. In various embodiments, the transmission of the CTS-to-SELF signal is implemented by storing precalculated or predefined vectors in a Look-up-Table (LUT) and adapting the MAC Address field as well as the duration of the period to be protected as needed.

In addition to the CTS-to-Self from IEEE 802.11 specification [IEEE80211], the modified CTS-to-Self signals for the NAV setting signal discussed previously can also be stored as an LUT. In some implementations, since the IEEE 802.11 sample rate is not the same as the C-V2X sample rate(s), a special multirate processing may be used to combine the NAV setting signal to the regular C-V2X signal.

In alternative embodiments, where the RAT1 (e.g., C-V2X) station also includes RAT2 (e.g., ITS-G5/DSRC) modem circuitry, the modem/baseband circuitry of the RAT1 station could trigger the RAT2 modem circuitry to send the NAV setting signal.

1.5. Frame Structure Embodiments

Figure 11:
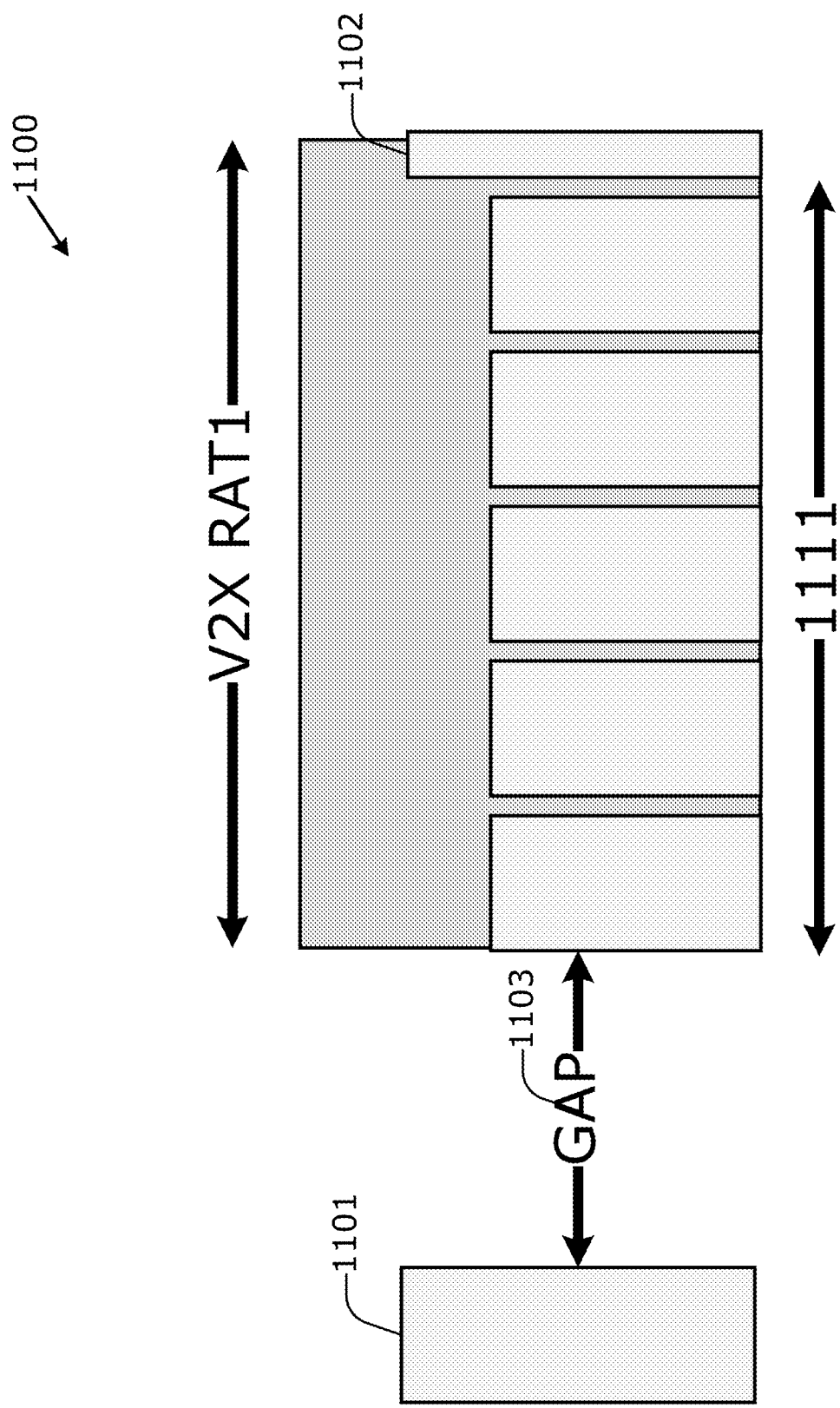
FIG. 11 shows an example guard period for CTS-to-SELF sequences containing NAV according to various embodiments.

In various embodiments, a frame structure includes guard periods between the CTS-to-SELF and the subsequent C-V2X transmission. In some embodiments, a silence period ("GAP") is introduced between the CTS-to-SELF sequence containing the NAV. This GAP allows suitable TX switching between i) CTS-to-SELF transmission and ii) C-V2X transmission. In some embodiments, a same or similar silence period is introduced after the end of the C-V2X interval and the subsequent ITS-G5/DSRC intervals. FIG. 11 shows an example where a guard period (gap 1103) is disposed between a CTS-to-SELF sequence 1101 (e.g., containing NAV) and RAT1 periods. In FIG. 11, after setting the NAV 1101, the RAT1 Tx is protected from RAT2 interference during interval 1111 and until the NAV release 1102.

During the duration of the gap, typically no signal is transmitted. In some embodiments, this gap can be used, either partially or in its entirety, to transmit one or more signals. In these embodiments, the corresponding data can be encoded based on the C-V2X PHY design. The particular signal(s) that may be transmitted during the gap period may include any combination of the following example embodiments. In one embodiment, random data is/are used, which may be used to prevent the IEEE 802.11p LBT based channel access mechanism to access the channel during the gap period. In another embodiment, (predefined) pilot symbols is/are used, which may be used to improve the estimation of the multipath propagation channel characteristics. In another embodiment, one or more reference signals and/or synchronization signals may be transmitted during the guard period. The reference signals may include, for example, cell-specific reference signals (CRS), channel state information reference signals (CSI-RS), demodulation reference signals (DMRS), and/or other reference signals defined by 3GPP/ETSI LTE and/or 5G standards. The synchronization signals (SS) may include primary SS, secondary SS, and/or Physical Broadcast Channel (PBCH) (i.e., an SS block in 5G/NR parlance).

In another embodiment, signaling information and/or user data is/are used. The duration of the gap may be selected from one or more of the following embodiments. In one embodiment, the gap period may be chosen to be a positive integer multiple of the short interframe space (SIFS) duration as defined in [IEEE80211]. In another embodiment, the gap period may be chosen to be a positive integer multiple of a point (coordination function) interframe space (PIFS) duration as defined in [IEEE80211]. In another embodiment, the gap period may be chosen to be a positive integer multiple of the distributed coordination function (DCF) interframe space (DIFS) duration as defined in [IEEE80211]. In another embodiment, the gap period may be chosen to be a positive integer multiple of an Arbitration Inter-Frame Spacing (AIFS) duration as defined in [IEEE80211]. In another embodiment, the gap period may be chosen to be a positive integer multiple of the extended interframe space (EIFS) duration as defined in [IEEE80211]. In another embodiment, a positive integer multiple of a C-V2X symbol duration is used. In another embodiment, any combination of the upper durations (e.g., the gap may be chosen to be SIFS+PIFS+DIFS+EIFS+AIFS, the gap may be chosen to be SIFS+PIFS PCF+DIFS DCF+ . . . , etc.). Any other suitable duration or combination of durations may be used in other embodiments.

1.6. Maximum Transmission Duration Interval Negotiation Embodiments

In various embodiments, the maximum Tx durations for the different RAT intervals may be negotiated. In some embodiments, a "crowd" agreement protocol is implemented for selecting the Tx durations of the respective intervals (e.g., C-V2X vs ITS-G5/DSRC) depending on the locally observed market penetration level.

In some embodiments, the crowd agreement protocol may have an initial (e.g., default) resource/capacity allocation of 50% capacity allocated to C-V2X and 50% resource/capacity allocated to ITS-G5/DSRC. Some other default allocation may be used in other embodiments, such as when a third to-be-defined V2X RAT is implemented, or some other resource allocation split as defined by a network operator or the like.

When a first V2X RAT (e.g., C-V2X or ITS-G5/DSRC) requires additional resources/capacity, a "add capacity request" sequence is transmitted by one or multiple stations that implement the first V2X RAT. Stations implementing a second V2X RATs (e.g., C-V2X in case that the sequence was issued by ITS-G5/DSRC, or vice versa) answer by transmitting ACK/NACK sequences depending on the respective observed congestion. Based on the number of received ACKs and/or NACKs, the resources/capacity allocated to the first V2X RAT is increased by some amount. In some embodiments, the resources/capacity allocated to the second V2X RAT may be reduced by a same or similar amount.

In some embodiments, if a ratio of received ACKs to the total number of received responses (e.g., ACKs and NACKs) is above a threshold then the resource/capacity is increased by a predefined step-size (e.g., 10%) for the first V2X RAT, which originally issued the "add capacity request". This is shown by equation 1, where theta (θ) is the predetermined or configured threshold, $N_{ACK}$ is the number of received ACKs, and $N_{NACK}$ is the number of received NACKs.

$$\theta \geq \frac{N_{ACK}}{N_{ACK} + N_{NACK}} \qquad \text{(equation 1)}$$

2. Example ITS-Station Configurations and Arrangements

Figure 12:
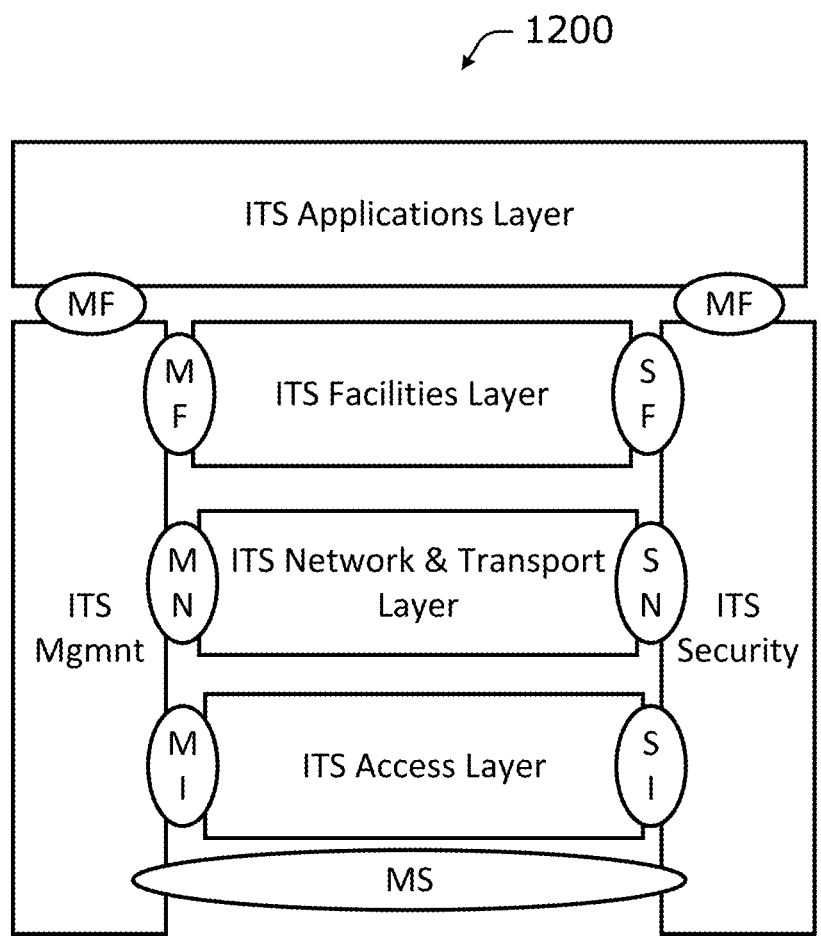
FIG. 12 shows an example ITS-S reference architecture according to various embodiments.

FIG. 12 depicts an example ITS-S reference architecture 1200 according to various embodiments. In ITS-based implementations, some or all of the components depicted by FIG. 12 may follow the ITSC protocol, which is based on the principles of the OSI model for layered communication protocols extended for ITS applications. The ITSC includes, inter alia, an access layer which corresponds with the OSI layers 1 and 2, a networking & transport (N&T) layer which corresponds with OSI layers 3 and 4, the facilities layer which corresponds with OSI layers 5, 6, and at least some functionality of OSI layer 7, and an applications layer which corresponds with some or all of OSI layer 7. Each of these layers are interconnected via respective interfaces, SAPs, APIs, and/or other like connectors or interfaces.

The applications layer provides ITS services, and ITS applications are defined within the application layer. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009-06) (hereinafter "[R00]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S provides ITS applications to vehicle drivers and/or passengers, and may require an interface for accessing in-vehicle data from the in-vehicle network or in-vehicle system. For deployment and performances needs, specific instances of a V-ITS-S may contain groupings of Applications and/or Facilities.

The facilities layer comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VRUBS), Decentralized Environmental Notification (DEN) basic service, maneuver coordination services (MCS), and/or the like. For a vehicle ITS-S, the DDP is connected with the in-vehicle network and provides the vehicle state information. The POTI entity provides the position of the ITS-S and time information. A list of the common facilities is given by ETSI TS 102 894-1 V1.1.1 (2013-08) (hereinafter "[R08]").

Each of the aforementioned interfaces/Service Access Points (SAPs) may provide the full duplex exchange of data with the facilities layer, and may implement suitable APIs to enable communication between the various entities/elements.

For a vehicle ITS-S, the facilities layer is connected to an in-vehicle network via an in-vehicle data gateway as shown and described in [R08]. The facilities and applications of a vehicle ITS-S receive required in-vehicle data from the data gateway in order to construct messages (e.g., CSMs, VAMs, CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity. The encode CAM/DENM entity constructs (encodes) CAMs/DENMs to include various, the object list may include a list of DEs and/or DFs included in an ITS data dictionary.

The ITS station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, etc.). The station type/capabilities facility may store sensor capabilities of various connected/coupled sensors and sensor data obtained from such sensors.

The Position and Time management entity (PoTi) manages the position and time information for use by ITS applications, facility, network, management, and security layers. For this purpose, the PoTi gets information from sub-system entities such as GNSS, sensors and other sub-system of the ITS-S. The PoTi ensures ITS time synchronicity between ITS-Ss in an ITS constellation, maintains the data quality (e.g., by monitoring time deviation), and manages updates of the position (e.g., kinematic and attitude state) and time. A ITS constellation is a group of ITS-S's that are exchanging ITS data among themselves. The PoTi entity may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi may use augmentation services to improve the position and time accuracy. Various augmentation methods may be applied. PoTi may support these augmentation services by providing messages services broadcasting augmentation data. For instance, a roadside ITS-S may broadcast correction information for GNSS to oncoming vehicle ITS-S; ITS-Ss may exchange raw GPS data or may exchange terrestrial radio position and time relevant information. PoTi maintains and provides the position and time reference information according to the application and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi should also maintain information on the confidence of the kinematic and attitude state variables.

The N&T layer provides functionality of the OSI network layer and the OSI transport layer and includes one or more networking protocols, one or more transport protocols, and network and transport layer management. Additionally, aspects of sensor interfaces and communication interfaces may be part of the N&T and access layers. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used in various other embodiments.

Figure 13:
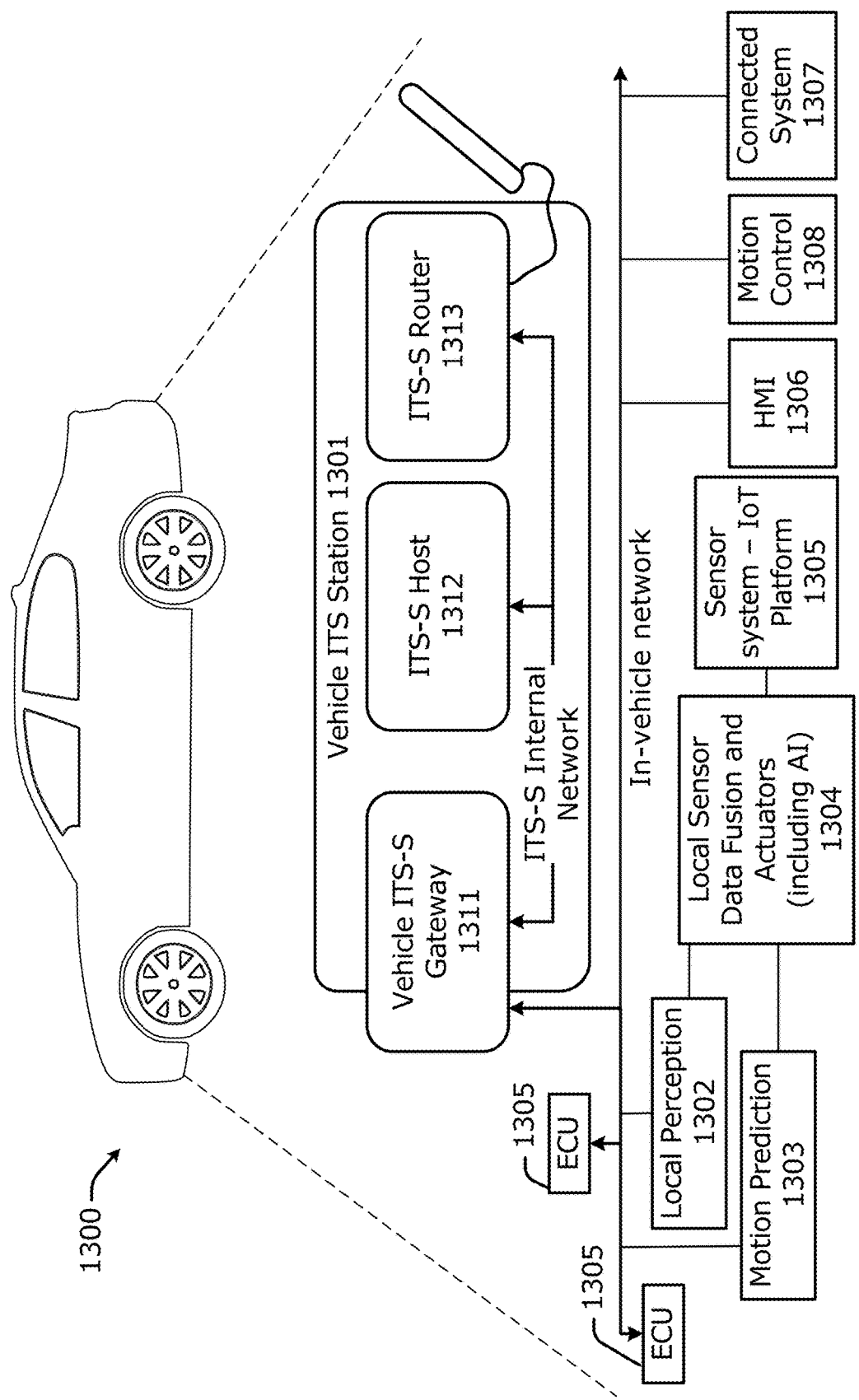
FIG. 13 depicts an example vehicle ITS station (ITS-S) in a vehicle system according to various embodiments.

FIG. 13 depicts an example vehicle computing system 1300 according to various embodiments. In this example, the vehicle computing system 1300 includes a V-ITS-S 1301 and Electronic Control Units (ECUs) 1305. The V-ITS-S 1301 includes a V-ITS-S gateway 1311, an ITS-S host 1312, and an ITS-S router 1313. The vehicle ITS-S gateway 1311 provides functionality to connect the components at the in-vehicle network (e.g., ECUs 1305) to the ITS station-internal network. The interface to the in-vehicle components (e.g., ECUs 1305) may be the same or similar as those discussed herein (see e.g., IX 2156 of FIG. 21) and/or may be a proprietary interface/interconnect. Access to components (e.g., ECUs 1305) may be implementation specific. The ECUs 1305 may be the same or similar to the driving control units (DCUs) 1674 discussed infra with respect to FIG. 16. The ITS station connects to ITS ad hoc networks via the ITS-S router 1313.

Figure 14:
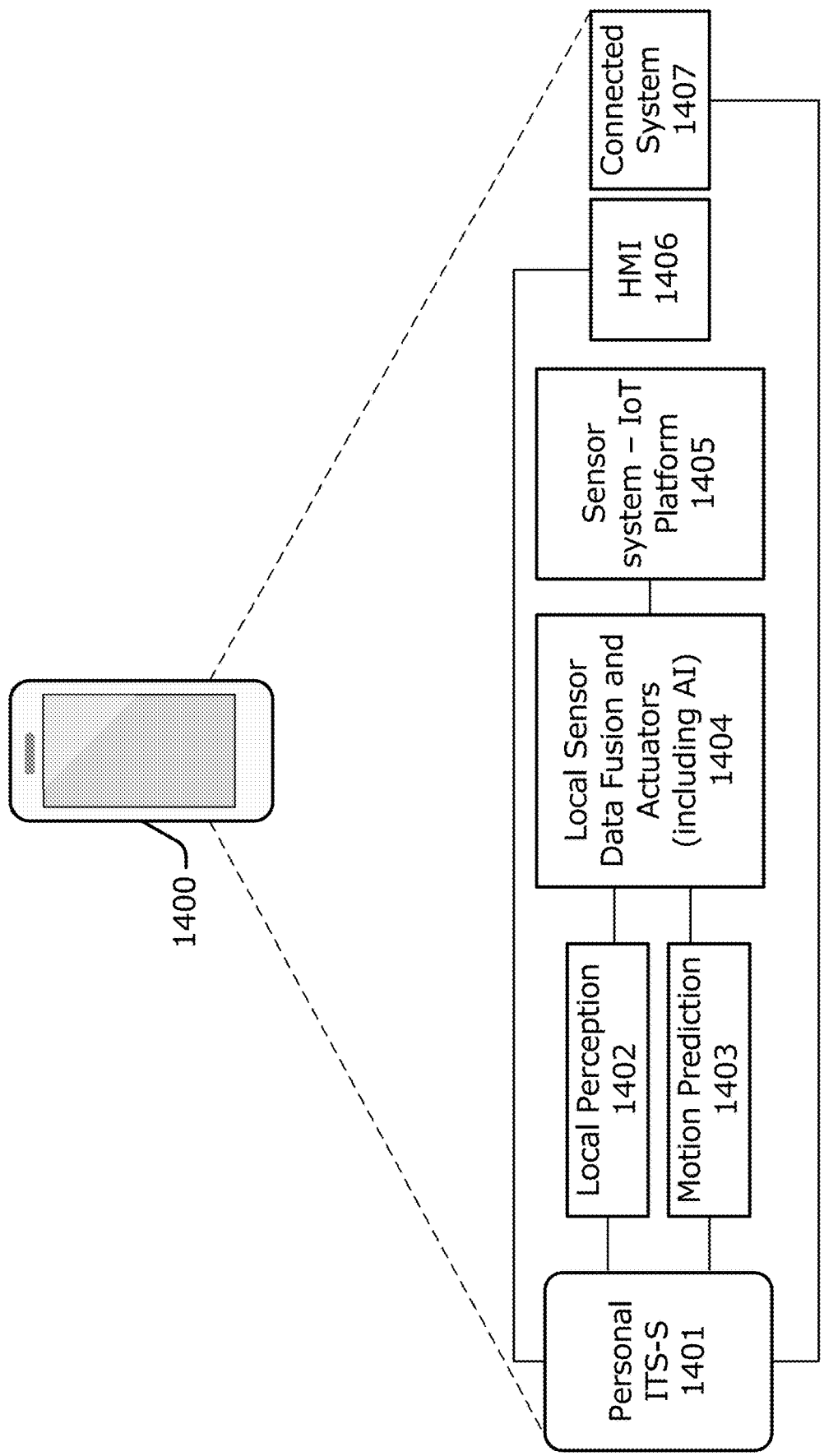
FIG. 14 depicts an example personal ITS station (P-ITS-S) according to various embodiments.
Figure 15:
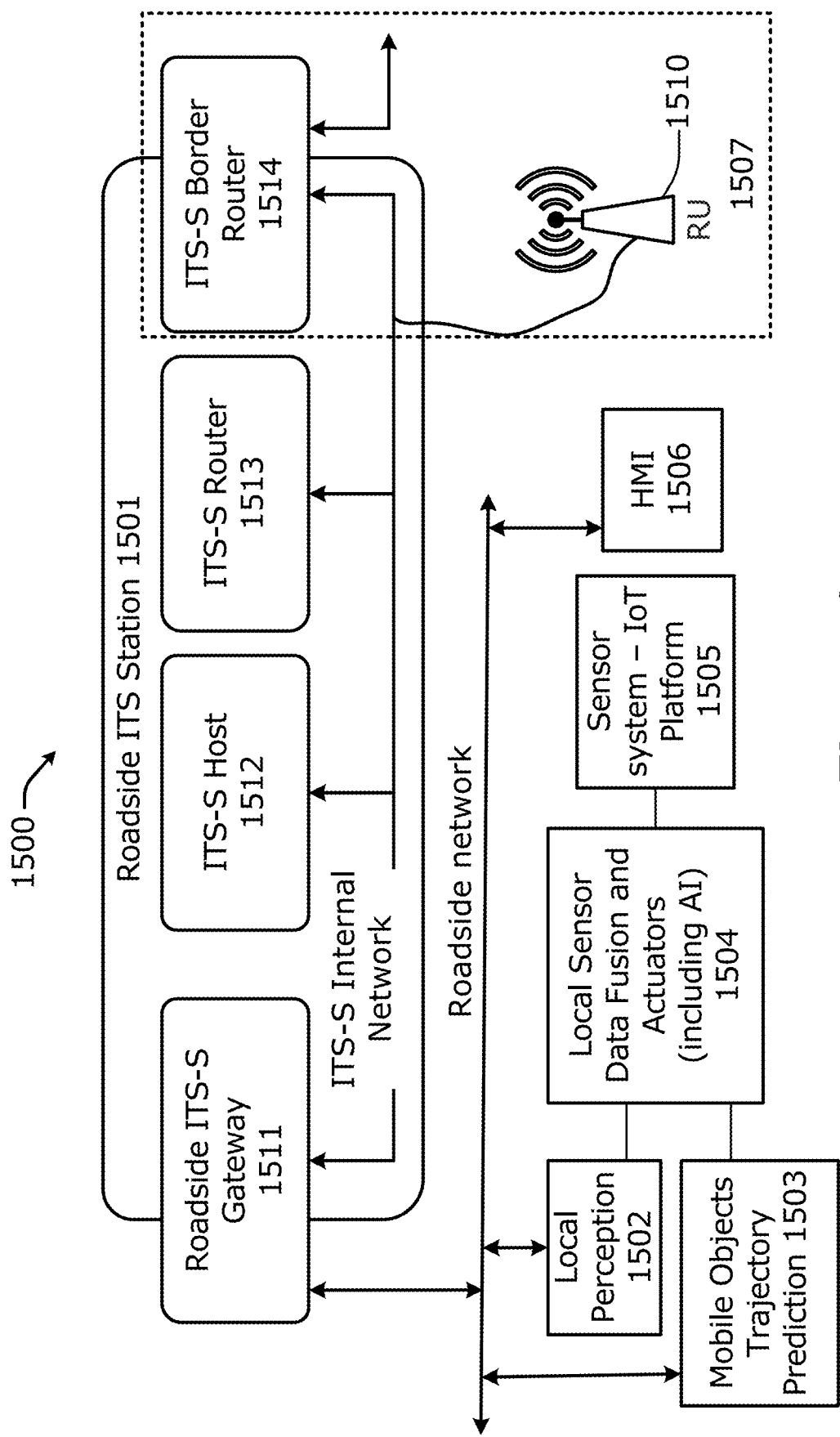
FIG. 15 depicts an example roadside ITS-S in a roadside infrastructure node according to various embodiments.

FIG. 14 depicts an example personal computing system 1400 (also referred to as "ITS sub-system 1400"). The personal ITS sub-system 1400 provides the application and communication functionality of ITSC in mobile devices, such as smartphones, tablet computers, wearable devices, PDAs, portable media players, laptops, and/or other mobile devices including any of those discussed herein. The personal ITS sub-system 1400 contains a personal ITS-S(P-ITS-S) 1401 and various other entities (e.g., local perception 1402, motion prediction 1403, local sensor data fusion and actuators 1404, sensor system 1405, HMI 1406, and connected system 1407). The device used as a personal computing system 1400 may also perform HMI functionality as part of another ITS sub-system (e.g., HMI 1406), connecting to the other ITS sub-system via the ITS station-internal network (not shown). For purposes of the present disclosure, the personal ITS sub-system 1400 may be used as a VRU ITS-S 1617 of FIG. 16. FIG. 15 depicts an example roadside infrastructure system 1500 according to various embodiments. In this example, the roadside infrastructure system 1500 includes an R-ITS-S 1501, output device(s) 1505, sensor(s) 1508, and one or more radio units (RUs) 1510. The R-ITS-S 1501 includes a R-ITS-S gateway 1511, an ITS-S host 1512, an ITS-S router 1513, and an ITS-S border router 1514. The ITS station connects to ITS ad hoc networks and/or ITS access networks via the ITS-S router 1513. The R-ITS-S gateway 1511 provides functionality to connect the components of the roadside system (e.g., output devices 1504, 1506 and sensors 1505) at the roadside network to the ITS station-internal network. The interface to the in-vehicle components (e.g., ECUs 1305) may be the same or similar as those discussed herein (see e.g., IX 2006 of FIG. 20, and IX 2156 of FIG. 21) and/or may be a proprietary interface/interconnect. Access to components (e.g., ECUs 1305) may be implementation specific. The sensor(s) 1508 may be inductive loops and/or the same or similar to the sensors 1672 discussed infra with respect to FIG. 16 and/or sensor circuitry 2172 discussed infra with respect to FIG. 21.

The actuators 1513 are devices that are responsible for moving and controlling a mechanism or system. In various embodiments, the actuators 1513 are used to change the operational state (e.g., on/off, zoom or focus, etc.), position, and/or orientation of the sensors 1508. In some embodiments, the actuators 1513 are used to change the operational state of some other roadside equipment, such as gates, traffic lights, digital signage or variable message signs (VMS), etc. The actuators 1513 are configured to receive control signals from the R-ITS-S 1501 via the roadside network, and convert the signal energy (or some other energy) into an electrical and/or mechanical motion. The control signals may be relatively low energy electric voltage or current. In embodiments, the actuators 1513 comprise electromechanical relays and/or solid state relays, which are configured to switch electronic devices on/off and/or control motors, and/or may be that same or similar or actuators 2174 discussed infra with respect to FIG. 21. Additionally, the actuators 1404 of FIG. 14 may be the same or similar to the actuators 1513.

The ITS-S reference architecture 1200 may be applicable to the elements of FIGS. 13, 14, and 15. The ITS-S gateway 1311, 1511 (see e.g., FIGS. 13 and 15) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 1311, 1511 (see e.g., FIGS. 13 and 15) is capable of converting protocols. This allows an ITS-S to communicate with external elements of the system in which it is implemented. The ITS-S router 1311, 1511 provides the functionality the ITS-S reference architecture 1200 excluding the Applications and Facilities layers. The ITS-S router 1311, 1511 interconnects two different ITS protocol stacks at layer 3. The ITS-S router 1311, 1511 may be capable to convert protocols. One of these protocol stacks typically is connected to the ITS station-internal network. The ITS-S border router 1514 (see e.g., FIG. 15) provides the same functionality as the ITS-S router 1311, 1511, but includes a protocol stack related to an external network that may not follow the management and security principles of ITS (e.g., the ITS Mgmnt and ITS Security layers in FIG. 12).

Additionally, other entities that operate at the same level but are not included in the ITS-S include the relevant users at that level, the relevant HMI 1306, 1406, 1506 (e.g., audio devices, display/touchscreen devices, etc.); when the ITS-S is a vehicle, vehicle motion control for automated vehicles (both HMI and vehicle motion control entities may be triggered by the ITS-S applications); a local device sensor system and IoT Platform that collects and shares IoT data; local device sensor fusion and actuator application(s), which may contain AI and aggregates the data flow issued by the sensor system; local perception and trajectory prediction applications that consume the output of the fusion application and feed the ITS-S applications; and the relevant ITS-S. The sensor system can include one or more cameras, radars, lidars, etc., in a V-ITS-S or RSE. In the central station, the sensor system includes sensors that may be located on the side of the road, but directly report their data to the central station, without the involvement of a V-ITS-S or a R-ITS-S. In some cases, the sensor system may additionally include gyroscope(s), accelerometer(s), and the like (see e.g., sensor circuitry 2172 of FIG. 21).

3. Example Edge Computing System Configurations and Arrangements

Figure 16:
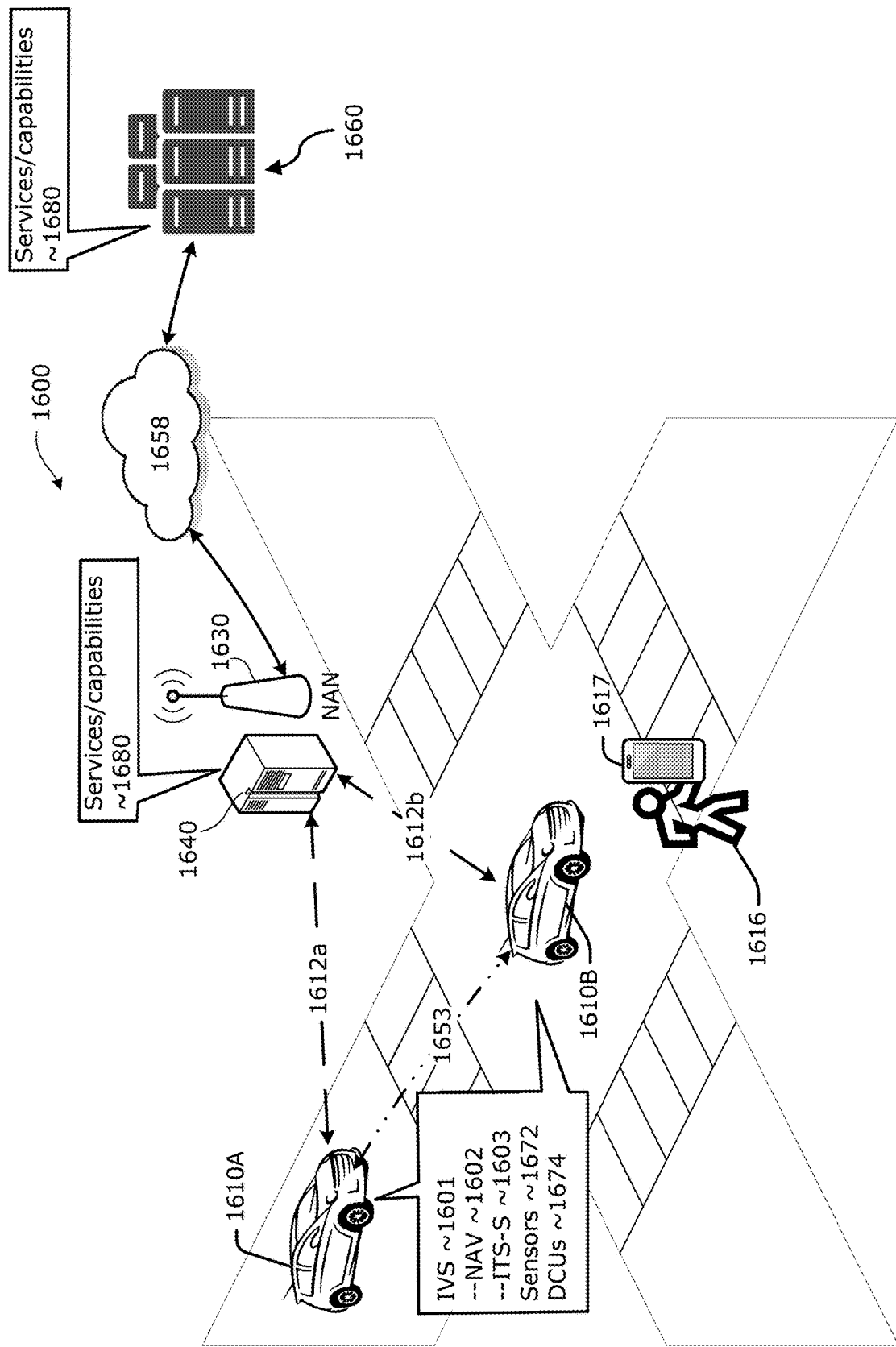
FIG. 16 illustrates an operative arrangement in which various embodiments may be practiced.

FIG. 16 illustrates an overview of an environment 1600 for incorporating and using the embodiments of the present disclosure. As shown, for the illustrated embodiments, the example environment includes vehicles 1610A and 1610B (collectively "vehicle 1610"). Vehicles 1610 includes an engine, transmission, axles, wheels and so forth (not shown). The vehicles 1610 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 1610 shown by FIG. 16 may represent motor vehicles of varying makes, models, trim, etc.

For illustrative purposes, the following description is provided for deployment scenarios including vehicles 1610 in a 2D freeway/highway/roadway environment wherein the vehicles 1610 are automobiles. However, the embodiments described herein are also applicable to other types of vehicles, such as trucks, busses, motorboats, motorcycles, electric personal transporters, and/or any other motorized devices capable of transporting people or goods. Also, embodiments described herein are applicable to social networking between vehicles of different vehicle types. The embodiments described herein may also be applicable to 3D deployment scenarios where some or all of the vehicles 1610 are implemented as flying objects, such as aircraft, drones, UAVs, and/or to any other like motorized devices.

For illustrative purposes, the following description is provided for example embodiments where the vehicles 1610 include in-vehicle systems (IVS) 1601, which are discussed in more detail infra. However, the vehicles 1610 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the various embodiments discussed herein. Vehicles 1610 including a computing system (e.g., IVS 1601) as well as the vehicles referenced throughout the present disclosure, may be referred to as vehicle user equipment (vUE) 1610, vehicle stations 1610, vehicle ITS stations (V-ITS-S) 1610, computer assisted (CA)/autonomous driving (AD) vehicles 1610, and/or the like.

Each vehicle 1610 includes an in-vehicle system (IVS) 1601, one or more sensors 1672, and one or more driving control units (DCUs) 1674. The IVS 100 includes a number of vehicle computing hardware subsystems and/or applications including, for example, various hardware and software elements to implement the ITS architecture of FIG. 12. The vehicles 1610 may employ one or more V2X RATs, which allow the vehicles 1610 to communicate directly with one another and with infrastructure equipment (e.g., network access node (NAN) 1630). The V2X RATs may refer to 3GPP cellular V2X RAT (e.g., LTE, 5G/NR, and beyond), a WLAN V2X (W-V2X) RAT (e.g., DSRC in the USA or ITS-G5 in the EU), and/or some other RAT such as those discussed herein. Some or all of the vehicles 1610 may include positioning circuitry to (coarsely) determine their respective geolocations and communicate their current position with the NAN 1630 in a secure and reliable manner. This allows the vehicles 1610 to synchronize with one another and/or the NAN 1630. Additionally, some or all of the vehicles 1610 may be computer-assisted or autonomous driving (CA/AD) vehicles, which may include artificial intelligence (AI) and/or robotics to assist vehicle operation.

The IVS 1601 includes the ITS-S 1603, which may be the same or similar to the ITS-S 1301 of FIG. 13. The IVS 1601 may be, or may include, Upgradeable Vehicular Compute Systems (UVCS) and/or the like. As discussed herein, the ITS-S 1603 (or the underlying V2X RAT circuitry on which the ITS-S 1603 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

Except for the UVCS technology of the present disclosure, IVS 1601 and CA/AD vehicle 1610 otherwise may be any one of a number of in-vehicle systems and CA/AD vehicles, from computer-assisted to partially or fully autonomous vehicles. Additionally, the IVS 1601 and CA/AD vehicle 1610 may include other components/subsystems not shown by FIG. 16 such as the elements shown and described throughout the present disclosure. These and other aspects of the underlying technology used to implement IVS 1601 are described in more detail with respect to FIGS. 12-15 and 17-21.

In addition to the functionality discussed herein, the ITS-S 1301 (or the underlying V2X RAT circuitry on which the ITS-S 1301 operates) is capable of measuring various signals or determining/identifying various signal/channel characteristics. Signal measurement may be performed for cell selection, handover, network attachment, testing, and/or other purposes. The measurements/characteristics collected by the ITS-S 1301 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1630 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215 v16.1.0 (2020-04),

[IEEE80211], and/or the like. The same or similar measurements may be measured or collected by the NAN 1630.

The subsystems/applications may also include instrument cluster subsystems, front-seat and/or back-seat infotainment subsystems and/or other like media subsystems, a navigation subsystem (NAV) 1602, a vehicle status subsystem/application, a HUD subsystem, an EMA subsystem, and so forth. The NAV 1602 may be configurable or operable to provide navigation guidance or control, depending on whether vehicle 1610 is a computer-assisted vehicle, partially or fully autonomous driving vehicle. NAV 1602 may be configured with computer vision to recognize stationary or moving objects (e.g., a pedestrian, another vehicle, or some other moving object) in an area surrounding vehicle 1610, as it travels enroute to its destination. The NAV 1602 may be configurable or operable to recognize stationary or moving objects in the area surrounding vehicle 1610, and in response, make its decision in guiding or controlling DCUs of vehicle 1610, based at least in part on sensor data collected by sensors 1672.

The DCUs 1674 include hardware elements that control various systems of the vehicles 1610, such as the operation of the engine, the transmission, steering, braking, etc. DCUs 1674 are embedded systems or other like computer devices that control a corresponding system of a vehicle 1610. The DCUs 1674 may each have the same or similar components as devices/systems of FIG. 2174 discussed infra, or may be some other suitable microcontroller or other like processor device, memory device(s), communications interfaces, and the like. Individual DCUs 1674 are capable of communicating with one or more sensors 1672 and actuators (e.g., actuators 2174 of FIG. 21). The sensors 1672 are hardware elements configurable or operable to detect an environment surrounding the vehicles 1610 and/or changes in the environment. The sensors 1672 are configurable or operable to provide various sensor data to the DCUs 1674 and/or one or more AI agents to enable the DCUs 1674 and/or one or more AI agents to control respective control systems of the vehicles 1610. Some or all of the sensors 1672 may be the same or similar as the sensor circuitry 2172 of FIG. 21. Further, each vehicle 1610 is provided with the RSS embodiments of the present disclosure. In particular, the IVS 1601 may include or implement a facilities layer and operate one or more facilities within the facilities layer.

IVS 1601, on its own or in response to user interactions, communicates or interacts with one or more vehicles 1610 via interface 1653, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, etc.). Other technologies could be used, such as Bluetooth/Bluetooth Low Energy (BLE) or the like. In various embodiments, the vehicles 1610 may exchange ITS protocol data units (PDUs) or other messages of the example embodiments with one another over the interface 1653.

IVS 1601, on its own or in response to user interactions, communicates or interacts with one or more remote/cloud servers 1660 via NAN 1630 over interface 1612 and over network 1658. The NAN 1630 is arranged to provide network connectivity to the vehicles 1610 via respective interfaces 1612 between the NAN 1630 and the individual vehicles 1610. The NAN 1630 is, or includes, an ITS-S, and may be a roadside ITS-S(R-ITS-S). The NAN 1630 is a network element that is part of an access network that provides network connectivity to the end-user devices (e.g., V-ITS-Ss 1610 and/or VRU ITS-Ss 1617). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 1630. This virtualized framework allows the freed-up processor cores of the NAN 1630 to perform other virtualized applications, such as virtualized applications for the VRUN-ITS-S embodiments discussed herein.

Environment 1600 also includes VRU 1616, which includes a VRU ITS-S 1617. The VRU 1616 is a non-motorized road users as well as L class of vehicles (e.g., mopeds, motorcycles, Segways, etc.), as defined in Annex I of EU regulation 168/2013 (see e.g., International Organization for Standardization (ISO) D., "Road vehicles—Vehicle dynamics and road-holding ability—Vocabulary", ISO 8855 (2013) (hereinafter "[ISO8855]")). A VRU 1616 is an actor that interacts with a VRU system 1617 in a given use case and behavior scenario. For example, if the VRU 1616 is equipped with a personal device, then the VRU 1616 can directly interact via the personal device with other ITS-Stations and/or other VRUs 1616 having VRU devices 1617. If the VRU 1616 is not equipped with a device, then the VRU 1616 interacts indirectly, as the VRU 1616 is detected by another ITS-Station in the VRU system 1617 via its sensing devices such as sensors and/or other components. However, such VRUs 1616 cannot detect other VRUs 1616 (e.g., a bicycle).

A VRU 1616 can be equipped with a portable device (e.g., device 1617). The term "VRU" may be used to refer to both a VRU 1616 and its VRU device 1617 unless the context dictates otherwise. The VRU device 1617 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 1617) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, etc.) or an IoT device (e.g., traffic control devices) used by a VRU 1616 integrating ITS-S technology, and as such, the VRU ITS-S 1617 may include or refer to a "VRU device," "VRU equipment," and/or "VRU system".

The VRU systems considered in the present document are Cooperative Intelligent Transport Systems (C-ITS) that comprise at least one Vulnerable Road User (VRU) and one ITS-Station with a VRU application. The ITS-S can be a Vehicle ITS-Station or a Road side ITS-Station that is processing the VRU application logic based on the services provided by the lower communication layers (Facilities, Networking & Transport and Access layer (see e.g., ETSI EN 302 665 V1.1.1 (2010-09)), related hardware components, other in-station services and sensor sub-systems. A VRU system may be extended with other VRUs, other ITS-S and other road users involved in a scenario such as vehicles, motorcycles, bikes, and pedestrians. VRUs may be equipped with ITS-S or with different technologies (e.g., IoT) that enable them to send or receive an alert. The VRU system considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 1617 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

In general, there are four types of VRU equipment 1617 including unequipment VRUs (VRU 1616 does not have a device); VRU-Tx (a VRU 1616 equipped with an ITS-S 1617 having only a transmission (Tx) but no reception (Rx) capabilities that broadcasts awareness messages or beacons about the VRU 1616); VRU-Rx (a VRU 1616 equipped with an ITS-S 1617 having only an Rx (but no Tx) capabilities that receives broadcasted awareness messages or beacons about the other VRUs 1616 or other non-VRU ITS-Ss); and VRU-St (a VRU 1616 equipped with an ITS-S 1617 that includes the VRU-Tx and VRU-Rx functionality). The use cases and behavior scenarios consider a wide set of configurations of VRU systems 1617 based on the equipment of the VRU 1616 and the presence or absence of V-ITS-S 1617 and/or R-ITS-S 1630 with a VRU application.

The number of VRUs 1616 operating in a given area can get very high. In some cases, the VRU 1616 can be combined with a VRU vehicle (e.g., rider on a bicycle or the like). In order to reduce the amount of communication and associated resource usage (e.g., spectrum requirements), VRUs 1616 may be grouped together into one or more VRU clusters. A VRU cluster is a set of two or more VRUs 1616 (e.g., pedestrians) such that the VRUs 1616 move in a coherent manner, for example, with coherent velocity or direction and within a VRU bounding box. VRUs 1616 with VRU Profile 3 (e.g., motorcyclists) are usually not involved in the VRU clustering. The use of a bicycle or motorcycle will significantly change the behavior and parameters set of the VRU using this non-VRU object (or VRU vehicle such as a "bicycle"/"motorcycle"). A combination of a VRU 1616 and a non-VRU object is called a "combined VRU." A coherent cluster velocity refers to the velocity range of VRUs 1616 in a cluster such that the differences in speed and heading between any of the VRUs in a cluster are below a predefined threshold. A VRU Bounding box is a rectangular area containing all the VRUs 1616 in a VRU cluster such that all the VRUs in the bounding box make contact with the surface at approximately the same elevation.

VRU clusters can be homogeneous VRU clusters (e.g., a group of pedestrians) or heterogeneous VRU clusters (e.g., groups of pedestrians and bicycles with human operators). These clusters are considered as a single object/entity. The parameters of the VRU cluster are communicated using VRU Awareness Messages (VAMs), where only the cluster head continuously transmits VAMs. The VAMs contain an optional field that indicates whether the VRU 1616 is leading a cluster, which is not present for an individual VRUs (e.g., other VRUs in the cluster should not transmit VAM or should transmit VAM with very long periodicity). The leading VRU also indicates in the VAM whether it is a homogeneous cluster or heterogeneous, the latter one being of any combination of VRUs. The VAM may also indicate whether the VRU cluster is heterogeneous and/or homogeneous, which could provide useful information about trajectory and behaviors prediction when the cluster is disbanded.

The Radio Access Technologies (RATs) employed by the NAN 1630, the V-ITS-Ss 1610, and the VRU ITS-S 1617 may include one or more V2X RATs, which allow the V-ITS-Ss 1610 to communicate directly with one another, with infrastructure equipment (e.g., NAN 1630), and with VRU devices 1617. In the example of FIG. 16, any number of V2X RATs may be used for V2X communication. In an example, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 1612*a* and the WLAN V2X RAT may utilize an air interface 1612*b*. The access layer for the ITS-G5 interface is outlined in [EN302663] and describes the access layer of the ITS-S reference architecture 1200. The ITS-G5 access layer comprises IEEE 802.11-2016 [IEEE80211] and [IEEE8022] protocols. The access layer for 3GPP C-V2X based interface (s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03). In embodiments, the NAN 1630 or an edge compute node 1640 may provide one or more services/capabilities 1680.

In V2X scenarios, a V-ITS-Ss 1610 or a NAN 1630 may be or act as a RSU or roadside ITS-S(R-ITS-S), which refers to any transportation infrastructure entity used for V2X communications (see e.g., FIG. 15). In this example, the RSU 1630 may be a stationary RSU, such as an gNB/eNB-type RSU or other like infrastructure, or relatively stationary UE. In other embodiments, the RSU 1630 may be a mobile RSU or a UE-type RSU, which may be implemented by a vehicle (e.g., V-ITS-Ss 1610), pedestrian, or some other device with such capabilities. In these cases, mobility issues can be managed in order to ensure a proper radio coverage of the translation entities. In an example implementation, RSU 1630 is a computing device coupled with radio frequency circuitry located on a roadside that provides connectivity support to passing V-ITS-Ss 1610. The RSU 1630 may also include internal data storage circuitry to store intersection map geometry, traffic statistics, media, as well as applications/software to sense and control ongoing vehicular and pedestrian traffic. The RSU 1630 provides various services/capabilities 1680 such as, for example, very low latency communications required for high speed events, such as crash avoidance, traffic warnings, and the like. Additionally or alternatively, the RSU 1630 may provide other services/capabilities 1680 such as, for example, cellular/WLAN communications services. In some implementations, the components of the RSU 1630 may be packaged in a weatherproof enclosure suitable for outdoor installation, and may include a network interface controller to provide a wired connection (e.g., Ethernet) to a traffic signal controller and/or a backhaul network. Further, RSU 1630 may include wired or wireless interfaces to communicate with other RSUs 1630 (not shown by FIG. 16)

In another implementation, the NAN 1630 is a RAN or a base station (e.g., eNB, ng-eNB, gNB, or the like) within a RAN. Additionally or alternatively, the NAN 1630 is a gNB-Central Unit (CU) or ng-eNB-CU (see e.g., 3GPP TS 38.401 v16.1.0 (2020-03)). The CU may be implemented as a Base Band Unit (BBU), Radio Equipment Controller (REC), Radio Cloud Center (RCC), centralized RAN (C-RAN), virtualized RAN (vRAN), and/or the like (although these terms may refer to different implementation concepts). In this implementation, the gNB-CU or ng-eNB-CU is communicatively coupled with one or more gNB-Distributed Units (DUs) and/or one or more ng-eNB-DUs, and each DU may be communicatively coupled with one or more Radio Units (RUs) (also referred to as Remote Radio Heads (RRHs), Remote Radio Units (RRUs), or the like). In some implementations, the one or more RUs may be RSUs.

In arrangement 1600, V-ITS-S 1610a may be equipped with a first V2X RAT communication system (e.g., C-V2X) whereas V-ITS-S 1610b may be equipped with a second V2X RAT communication system (e.g., W-V2X which may be DSRC, ITS-G5, or the like). In other embodiments, the V-ITS-S 1610a and/or V-ITS-S 1610b may each be employed with one or more V2X RAT communication systems. In these embodiments, the RSU 1630 may provide V2X RAT translation services among one or more services/capabilities 1680 so that individual V-ITS-Ss 1610 may communicate with one another even when the V-ITS-Ss 1610 implement different V2X RATs. According to various embodiments, the RSU 1630 (or edge compute node 1640) may provide VRU services among the one or more services/capabilities 1680 wherein the RSU 1630 shares CPMs, MCMs, VAMs DENMs, CAMs, etc., with V-ITS-Ss 1610 and/or VRUs for VRU safety purposes including RSS purposes. The V-ITS-Ss 1610 may also share such messages with each other, with RSU 1630, and/or with VRUs. These messages may include the various data elements and/or data fields as discussed herein.

In this example, the NAN 1630 may be a stationary RSU, such as an gNB/eNB-type RSU or other like infrastructure. In other embodiments, the NAN 1630 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 1630 that enables the connections 1612 may be referred to as a "RAN node" or the like. The RAN node 1630 may comprise ground stations (e.g., terrestrial access points) or satellite stations providing coverage within a geographic area (e.g., a cell). The RAN node 1630 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1630 is embodied as a NodeB, evolved NodeB (eNB), or a next generation NodeB (gNB), one or more relay nodes, distributed units, or Road Side Unites (RSUs). Any other type of NANs can be used. Additionally, the RAN node 1630 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc.

The network 1658 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 1658 and/or access technologies may include cellular technology such as LTE, MuLTEfire, and/or NR/5G (e.g., as provided by Radio Access Network (RAN) node 1630), WLAN (e.g., WiFi®) technologies (e.g., as provided by an access point (AP) 1630), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The remote/cloud servers 1660 may represent one or more application servers, a cloud computing architecture/platform that provides cloud computing services, and/or some other remote infrastructure. The remote/cloud servers 1660 may include any one of a number of services and capabilities 1680 such as, for example, ITS-related applications and services, driving assistance (e.g., mapping/navigation), content provision (e.g., multi-media infotainment streaming), and/or the like. In an example implementation, the services and capabilities 1680 is/are provided by one or more cloud compute nodes of the cloud servers 1660. In one example, respective ones of the services and capabilities 1680 may run within one or more virtual machine(s) (VMs) and/or software/application container(s) that are provided by the cloud's virtualization infrastructure. In this implementation, the cloud 1660 may operate or include the aforementioned CU, or may provide the services and capabilities 1680 as separate services than the CU. Additionally or alternatively, the cloud 1660 may operate a virtualized network switch (e.g., Open vSwitch or the like), to provide the services and capabilities 1680.

In another example implementation, the services and capabilities 1680 are provided by one or more network functions (NFs) in a cellular core network such as a 5G core network (5GC), an Evolved Packet Core (EPC), and/or the like (not shown by FIG. 16). In this implementation, one or more existing NFs may provide the services and capabilities 1680, or a new NF may be defined to provide the services and capabilities 1680. Additionally or alternatively, the services and capabilities 1680 are provided by an individual or new NF in a cellular core network, in a data network, and/or the like. In these implementations (or any other implementation discussed herein), the services and capabilities 1680 may be provided via multiple RSUs, multiple base stations, and/or the like where one or more service areas associated with the services and capabilities 1680 encompass some or all of the cells or service areas of each of the multiple RSUs and/or base stations.

Additionally, the NAN 1630 is co-located with an edge compute node 1640 (or a collection of edge compute nodes 1640), which may provide any number of services/capabilities 1680 to vehicles 1610 such as ITS services/applications, driving assistance, and/or content provision services 1680. The edge compute node 1640 may include or be part of an edge network or "edge cloud." The edge compute node 1640 may also be referred to as an "edge host 1640," "edge server 1640," or "compute platforms 1640." The edge compute nodes 1640 may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated userspace instances such as containers, partitions, virtual environments (VEs), virtual machines (VMs), Servlets, servers, and/or other like computation abstractions. The edge compute node 1640 may be implemented in a data center or cloud installation; a designated edge node server, an enterprise server, a roadside server, a telecom central office; or a local or peer at-the-edge device being served consuming edge services. The edge compute node 1640 may provide any number of driving assistance and/or content provision services 1680 to vehicles 1610. The edge compute node 1640 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 1640 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein. In an example implementation, the edge compute node 1640 is co-located with one or more NANs 1630 (including the aforementioned CUs, DUs, and RUs). In this implementation, the edge compute node may operate or include the aforementioned CU, or may provide the services and capabilities 1680 separate from the CU.

Figure 17:
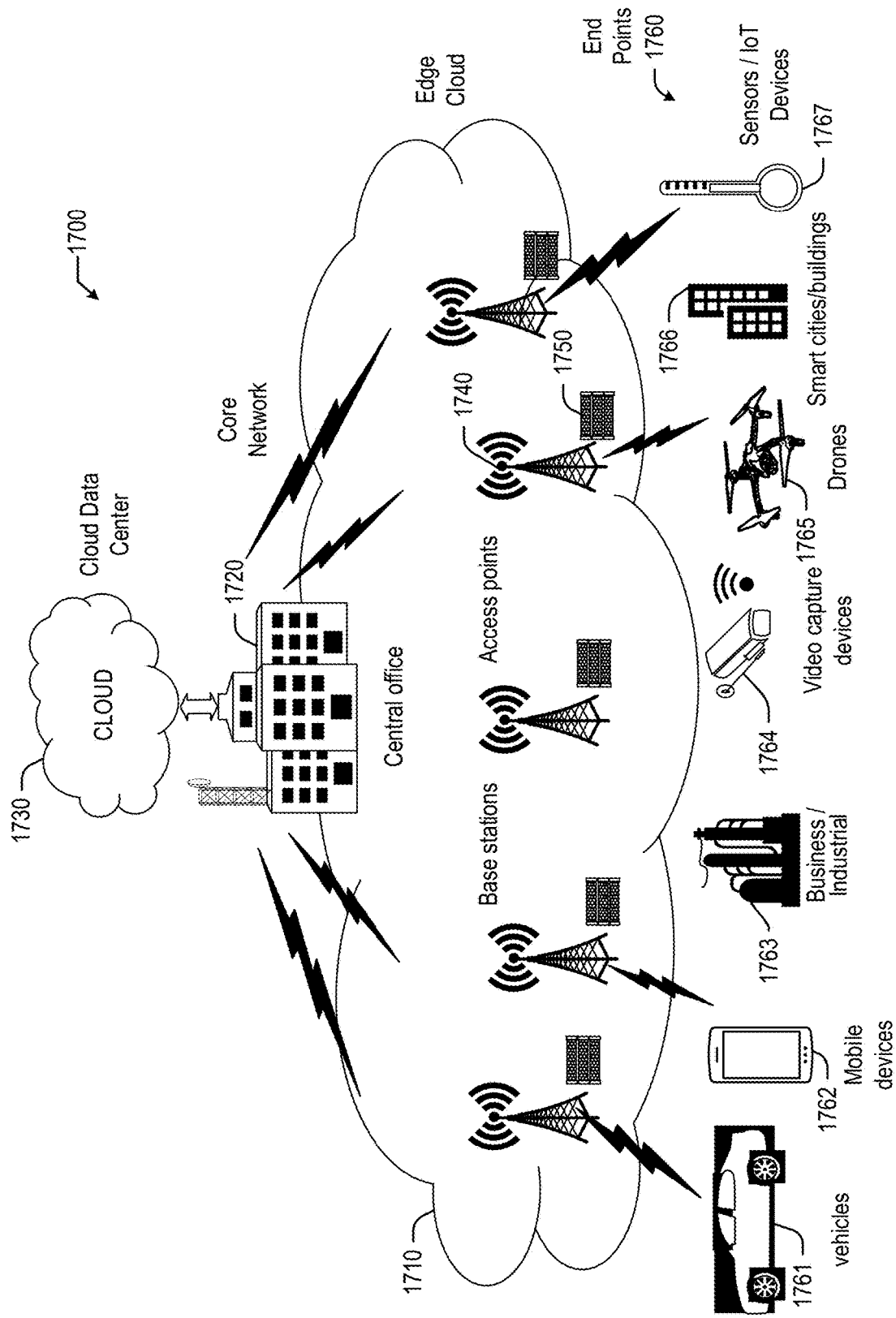
FIG. 17 illustrates an overview of an edge cloud configuration for edge computing.

FIG. 17 is a block diagram 1700 showing an overview of a configuration for edge computing, which includes a layer of processing referred to in many of the following examples as an "edge cloud". An "Edge Cloud" may refer to an interchangeable cloud ecosystem encompassing storage and compute assets located at a network's edge and interconnected by a scalable, application-aware network that can sense and adapt to changing needs, in real-time, and in a secure manner. An Edge Cloud architecture is used to decentralize computing resources and power to the edges of one or more networks (e.g., end point devices and/or intermediate nodes such as client devices/UEs). Traditionally, the computing power of servers is used to perform tasks and create distributed systems. Within the cloud model, such intelligent tasks are performed by servers (e.g., in a data center) so they can be transferred to other devices with less or almost no computing power. In the edge cloud 1710, some or all of these processing tasks are shifted to endpoint nodes and intermediate nodes such as client devices, IoT devices, network devices/appliances, and/or the like. It should be noted that an endpoint node may be the end of a communication path in some contexts, while in other contexts an endpoint node may be an intermediate node; similarly, an intermediate node may be the end of a communication path in some contexts, while in other contexts an intermediate node may be an endpoint node.

As shown, the edge cloud 1710 is co-located at an edge location, such as an access point or base station 1740, a local processing hub 1750, or a central office 1720, and thus may include multiple entities, devices, and equipment instances. The edge cloud 1710 is located much closer to the endpoint (consumer and producer) data sources 1760 (e.g., autonomous vehicles 1761, user equipment 1762, business and industrial equipment 1763, video capture devices 1764, drones 1765, smart cities and building devices 1766, sensors and IoT devices 1767, etc.) than the cloud data center 1730. Compute, memory, and storage resources which are offered at the edges in the edge cloud 1710 are critical to providing ultra-low latency response times for services and functions used by the endpoint data sources 1760 as well as reduce network backhaul traffic from the edge cloud 1710 toward cloud data center 1730 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 18:
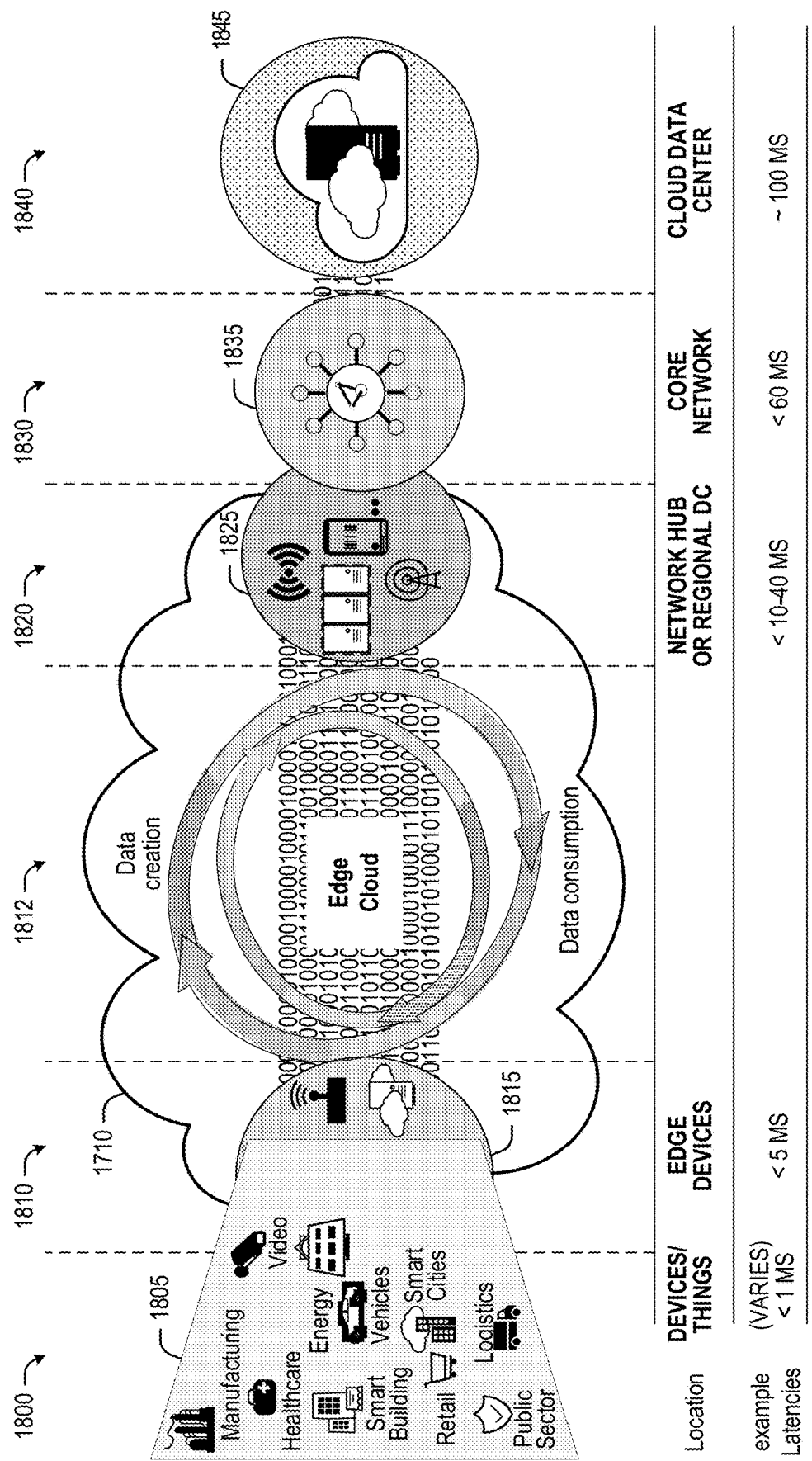
FIG. 18 illustrates operational layers among endpoints, an edge cloud, and cloud computing environments.

FIG. 18 illustrates operational layers among endpoints, an edge cloud, and cloud computing environments. Specifically, FIG. 18 depicts examples of computational use cases 1805, utilizing the edge cloud 1710 among multiple illustrative layers of network computing. The layers begin at an endpoint (devices and things) layer 1800, which accesses the edge cloud 1710 to conduct data creation, analysis, and data consumption activities. The edge cloud 1710 may span multiple network layers, such as an edge devices layer 1810 having gateways, on-premise servers, or network equipment (e.g., nodes 1815) located in physically proximate edge systems; a network access layer 1820, encompassing base stations, radio processing units, network hubs, regional data centers (DC), or local network equipment 1825; and any equipment, devices, or nodes located therebetween (e.g., in layer 1812, not illustrated in detail). The network communications within the edge cloud 1710 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1800, under 5 ms at the edge devices layer 1810, to even between 10 to 40 ms when communicating with nodes at the network access layer 1820. Beyond the edge cloud 1710 are core network 1830 and cloud data center 1840 layers, each with increasing latency (e.g., between 50-60 ms at the core network layer 1830, to 100 or more ms at the cloud data center layer). As a result, operations at a core network data center 1835 or a cloud data center 1845, with latencies of at least 50 to 100 ms or more, will not be able to accomplish many time-critical functions of the use cases 1805. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1835 or a cloud data center 1845, a central office or content data network may be considered as being located within a "near edge" layer ("near" to the cloud, having high latency values when communicating with the devices and endpoints of the use cases 1805), whereas an access point, base station, on-premise server, or network gateway may be considered as located within a "far edge" layer ("far" from the cloud, having low latency values when communicating with the devices and endpoints of the use cases 1805). It will be understood that other categorizations of a particular network layer as constituting a "close", "local", "near", "middle", or "far" edge may be based on latency, distance, number of network hops, or other measurable characteristics, as measured from a source in any of the network layers 1800-1840.

The various use cases 1805 may access resources under usage pressure from incoming streams, due to multiple services utilizing the edge cloud. To achieve results with low latency, the services executed within the edge cloud 1710 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1710 may provide the ability to serve and respond to multiple applications of the use cases 1805 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1710 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1710 (network layers 1800-1840), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1710.

As such, the edge cloud 1710 is formed from network components and functional features operated by and within edge gateway nodes, edge aggregation nodes, or other edge compute nodes among network layers 1810-1830. The edge cloud 1710 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1710 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1710 may be servers, multi-tenant servers, appliance computing devices, and/or any other type of computing devices. For example, the edge cloud 1710 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 20-22. The edge cloud 1710 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 19:
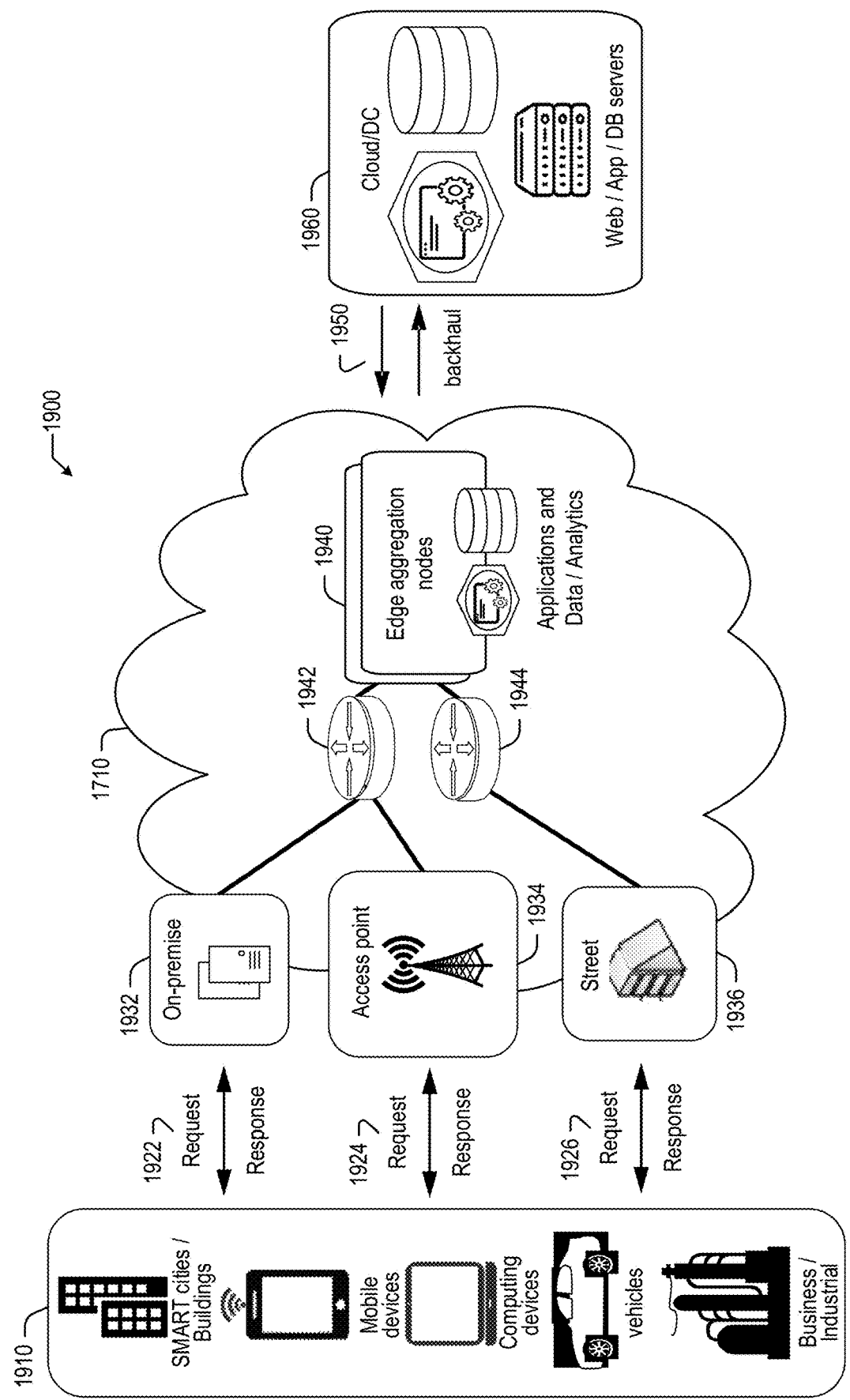
FIG. 19 illustrates an example approach for networking and services in an edge computing system.

In FIG. 19, various client endpoints 1910 (in the form of mobile devices, computers, autonomous vehicles, business computing equipment, industrial processing equipment) exchange requests and responses that are specific to the type of endpoint network aggregation. For instance, client endpoints 1910 may obtain network access via a wired broadband network, by exchanging requests and responses 1922 through an on-premise network system 1932. Some client endpoints 1910, such as mobile computing devices, may obtain network access via a wireless broadband network, by exchanging requests and responses 1924 through an access point (e.g., cellular network tower) 1934. Some client endpoints 1910, such as autonomous vehicles may obtain network access for requests and responses 1926 via a wireless vehicular network through a street-located network system 1936. However, regardless of the type of network access, the TSP may deploy aggregation points 1942, 1944 within the edge cloud 1710 to aggregate traffic and requests. Thus, within the edge cloud 1710, the TSP may deploy various compute and storage resources, such as at edge aggregation nodes 1940, to provide requested content. The edge aggregation nodes 1940 and other systems of the edge cloud 1710 are connected to a cloud or data center 1960, which uses a backhaul network 1950 to fulfill higher-latency requests from a cloud/data center for websites, applications, database servers, etc. Additional or consolidated instances of the edge aggregation nodes 1940 and the aggregation points 1942, 1944, including those deployed on a single server framework, may also be present within the edge cloud 1710 or other areas of the TSP infrastructure.

4. Computing System and Hardware Configurations

Figure 20:
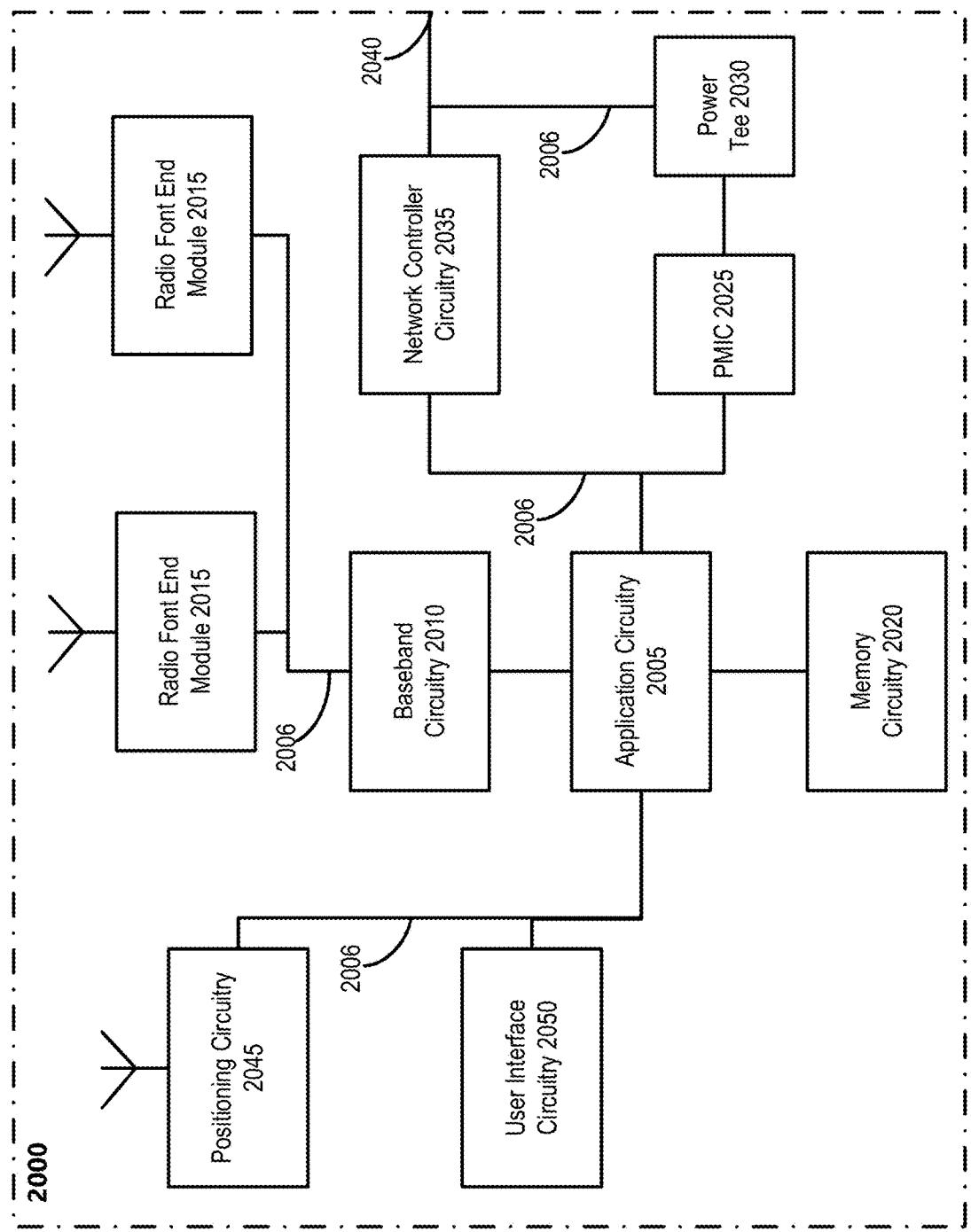
FIGS. 20 and 21 depict example components of various compute nodes, which may be used in edge computing system(s).
Figure 21:
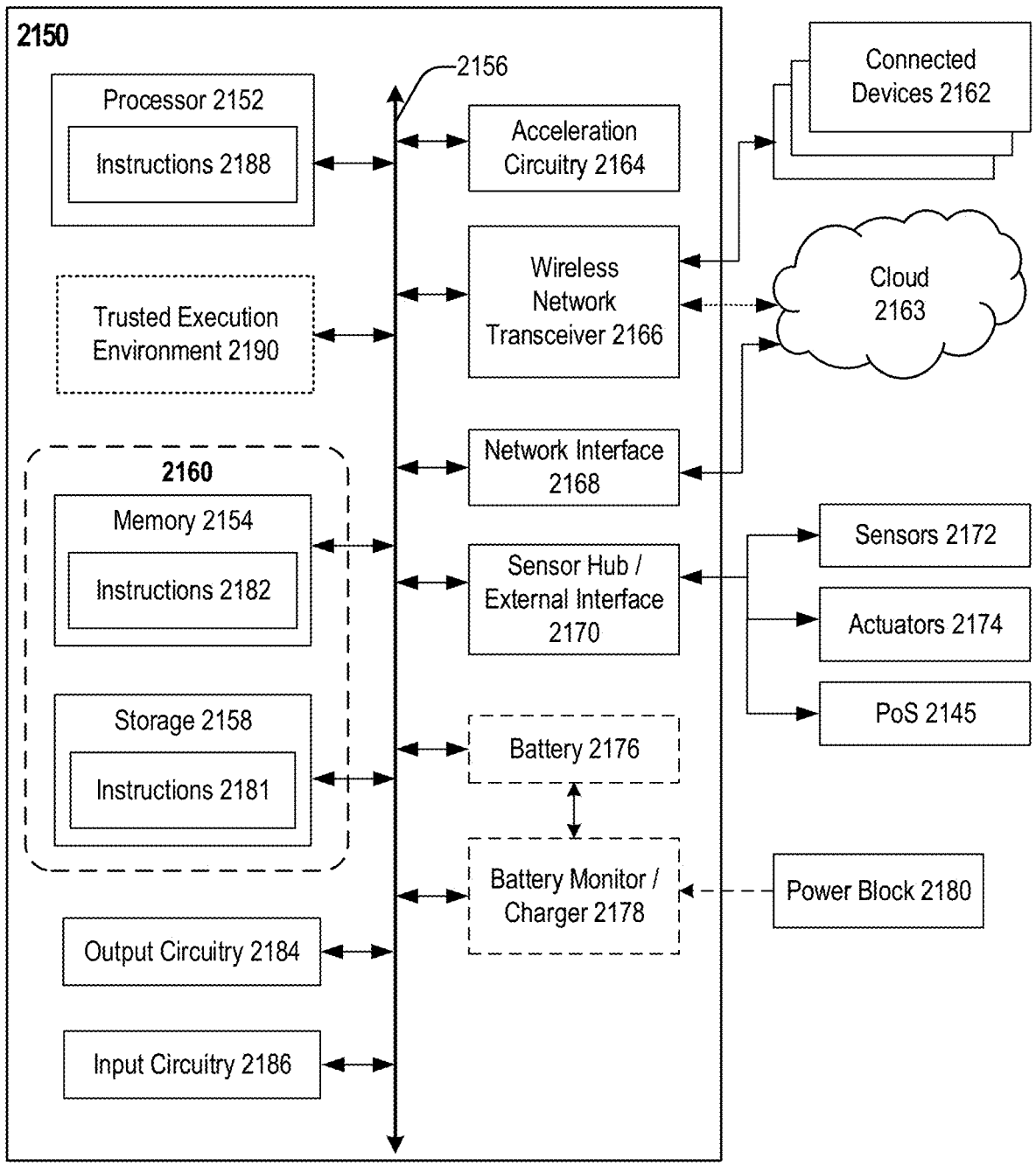

FIGS. 20 and 21 depict examples of computing systems that may fulfill any of the compute nodes or devices discussed herein. In some examples, the computing systems of FIGS. 20 and 21 may be employed as edge compute nodes in an edge computing system/framework, and/or may be employed as any other device/system discussed herein. The depicted compute nodes may be embodied as a type of device, appliance, computer, or other "thing" capable of communicating with other edge, networking, and/or endpoint components. For example, an edge compute device may be embodied as a smartphone, a mobile compute device, a smart appliance, an in-vehicle compute system (e.g., a navigation system), or other device or system capable of performing the described functions.

FIG. 20 illustrates an example of infrastructure equipment 2000 in accordance with various embodiments. The infrastructure equipment 2000 (or "system 2000") may be implemented as a base station, road side unit (RSU), roadside ITS-S(R-ITS-S), radio head, relay station, server, gateway, and/or any other element/device discussed herein.

The system 2000 includes application circuitry 2005, baseband circuitry 2010, one or more radio front end modules (RFEMs) 2015, memory circuitry 2020, power management integrated circuitry (PMIC) 2025, power tee circuitry 2030, network controller circuitry 2035, network interface connector 2040, positioning circuitry 2045, and user interface 2050. In some embodiments, the device 2000 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 2005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose JO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2005 may be coupled with or may include memory/storage elements and may be configured to execute instructions stored in the memory/storage to enable various applications or operating systems to run on the system 2000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 2005 may comprise, or may be, a special-purpose processor/controller to operate according to the various embodiments herein. As examples, the processor(s) of application circuitry 2005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2000 may not utilize application circuitry 2005, and instead may include a special-purpose processor/controller to process IP data received from an EPC or 5GC, for example.

In some implementations, the application circuitry 2005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 2005 may comprise logic blocks or logic fabric, and other interconnected resources that may be programmed to perform various functions, such as the procedures, methods, functions, etc. of the various embodiments discussed herein. In such embodiments, the circuitry of application circuitry 2005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the compute node 2000 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 2005 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 2010 may be implemented, for example, as a solder-down substrate including one or more integrated circuits, a single packaged integrated circuit soldered to a main circuit board or a multi-chip module containing two or more integrated circuits. The baseband circuitry 2010 includes one or more processing devices (e.g., baseband processors) to carry out various protocol and radio control functions. Baseband circuitry 2010 may interface with application circuitry of system 2000 for generation and processing of baseband signals and for controlling operations of the RFEMs 2015. The baseband circuitry 2010 may handle various radio control functions that enable communication with one or more radio networks via the RFEMs 2015. The baseband circuitry 2010 may include circuitry such as, but not limited to, one or more single-core or multi-core processors (e.g., one or more baseband processors) or control logic to process baseband signals received from a receive signal path of the RFEMs 2015, and to generate baseband signals to be provided to the RFEMs 2015 via a transmit signal path. In various embodiments, the baseband circuitry 2010 may implement a real-time OS (RTOS) to manage resources of the baseband circuitry 2010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 20, in one embodiment, the baseband circuitry 2010 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 2015 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 2015 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 2010 and/or RFEMs 2015. The baseband circuitry 2010 may also support radio communications for more than one wireless protocol.

Continuing with the aforementioned embodiment, the baseband circuitry 2010 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 2050 may include one or more user interfaces designed to enable user interaction with the system 2000 or peripheral component interfaces designed to enable peripheral component interaction with the system 2000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 2015, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 2010 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 2020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2020 may be implemented as one or more of solder down packaged integrated circuits, socketed memory modules, plug-in memory cards, and/or any other suitable memory device/circuitry.

The memory circuitry 2020 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 2000, an operating system of infrastructure equipment 2000, one or more applications, and/or for carrying out the embodiments discussed herein. The computational logic may be stored or loaded into memory circuitry 2020 as instructions for execution by the processors of the application circuitry 2005 to provide or perform the functions described herein. The various elements may be implemented by assembler instructions supported by processors of the application circuitry 2005 or high-level languages that may be compiled into such instructions. The permanent copy of the programming instructions may be placed into persistent storage devices of memory circuitry 2020 in the factory during manufacture, or in the field through, for example, a distribution medium (not shown), through a communication interface (e.g., from a distribution server), and/or over-the-air (OTA).

As discussed in more detail infra, infrastructure equipment 2000 may be configured to support a particular V2X RAT based on the number of vUEs 121 that support (or are capable to communicate) the particular V2X RAT. In embodiments, the memory circuitry 2020 may store a RAT configuration control module to control the (re)configuration of the infrastructure equipment 2000 to support a particular RAT and/or V2X RAT. The configuration control module provides an interface for triggering (re)configuration actions. In some embodiments, the memory circuitry 2020 may also store a RAT software (SW) management module to implement SW loading or provisioning procedures, and (de)activation SW in the infrastructure equipment 2000. In either of these embodiments, the memory circuitry 2020 may store a plurality of V2X RAT software components, each of which include program code, instructions, modules, assemblies, packages, protocol stacks, software engine(s), etc., for operating the infrastructure equipment 2000 or components thereof (e.g., RFEMs 2015) according to a corresponding V2X RAT. When a V2X RAT component is configured or executed by the application circuitry 2005 and/or the baseband circuitry 2010, the infrastructure equipment 2000 operates according to the that V2X RAT component.

In a first example, a first V2X RAT component may be an C-V2X component, which includes LTE and/or C-V2X protocol stacks that allow the infrastructure equipment 2000 to support C-V2X and/or provide radio time/frequency resources according to LTE and/or C-V2X standards. Such protocol stacks may include a control plane protocol stack including a Non-Access Stratum (NAS), Radio Resource Control (RRC), Packet Data Convergence Protocol (PDCP), Radio Link Control (RLC), Media Access Control (MAC), and Physical (PHY) layer entities; and a user plane protocol stack including General Packet Radio Service (GPRS) Tunneling Protocol for the user plane layer (GTP-U), User Datagram Protocol (UDP), Internet Protocol (IP), PDCP, RLC, MAC, and PHY layer entities. These control plane and user plane protocol entities are discussed in more detail in 3GPP TS 36.300 and/or 3GPP TS 38.300, as well as other 3GPP specifications. In some embodiments, the IP layer entity may be replaced with an Allocation and Retention Priority (ARP) layer entity or some other non-IP protocol layer entity. Some or all of the aforementioned protocol layer entities may be "relay" versions depending on whether the infrastructure equipment 2000 is acting as a relay. In some embodiments, the user plane protocol stack may be the PC5 user plane (PC5-U) protocol stack discussed in 3GPP TS 23.303 v15.1.0 (2018-06).

In a second example, a second V2X RAT component may be a ITS-G5 component, which includes ITS-G5 (IEEE 802.11p) and/or Wireless Access in Vehicular Environments (WAVE) (IEEE 1609.4) protocol stacks, among others, that allow the infrastructure equipment to support ITS-G5 communications and/or provide radio time-frequency resources according to ITS-G5 and/or other WiFi standards. The ITS-G5 and WAVE protocol stacks include, inter alia, a DSRC/WAVE PHY and MAC layer entities that are based on the IEEE 802.11p protocol. The DSRC/WAVE PHY layer is responsible for obtaining data for transmitting over ITS-G5 channels from higher layers, as well as receiving raw data over the ITS-G5 channels and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The ITS-G5 component may also include a logical link control (LLC) layer entity to perform layer 3 (L3) multiplexing and demultiplexing operations. The LLC layer (see e.g., [IEEE8022]) allows multiple network L3 protocols to communicate over the same physical link by allowing the L3 protocols to be specified in LLC fields.

In addition to the V2X RAT components, the memory circuitry 2020 may also store a RAT translation component, which is a software engine, API, library, object(s), engine(s), or other functional unit for providing translation services to vUEs 121 that are equipped with different V2X capabilities. For example, the RAT translation component, when configured or executed, may cause the infrastructure equipment 2000 to convert or translate a first message obtained according to the first V2X RAT (e.g., C-V2X) into a second message for transmission using a second V2X RAT (e.g., ITS-G5). In one example, the RAT translation component may perform the translation or conversion by extracting data from one or more fields of the first message and inserting the extracted data into corresponding fields of the second message. Other translation/conversion methods may also be used in other embodiments. In some embodiments, the RAT translation component may employ a suitable translator for translating one or more source messages in a source format into one or more target messages in a target format, and may utilize any suitable compilation strategies for the translation. The translator may also have different implementations depending on the type of V2X RATs that are supported by the infrastructure equipment 2000 (e.g., memory map, instruction set, programming model, etc.).

The PMIC 2025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2030 may provide for electrical power drawn from a network cable to provide both power supply and data connectivity to the infrastructure equipment 2000 using a single cable.

The network controller circuitry 2035 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 2000 via network interface connector 2040 using a physical connection, which may be electrical (commonly referred to as a "copper interconnect"), optical, or wireless. The network controller circuitry 2035 may include one or more dedicated processors and/or FPGAs to communicate using one or more of the aforementioned protocols. In some implementations, the network controller circuitry 2035 may include multiple controllers to provide connectivity to other networks using the same or different protocols. In various embodiments, the network controller circuitry 2035 enables communication with associated equipment and/or with a backend system (e.g., server(s), core network, cloud service, etc.), which may take place via a suitable gateway device.

The positioning circuitry 2045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2045 may include a Micro-Technology for Positioning, Navigation, and Timing (Micro-PNT) IC that uses a master timing clock to perform position tracking/estimation without GNSS assistance. The positioning circuitry 2045 may also be part of, or interact with, the baseband circuitry 2010 and/or RFEMs 2015 to communicate with the nodes and components of the positioning network. The positioning circuitry 2045 may also provide position data and/or time data to the application circuitry 2005, which may use the data to synchronize operations with various other infrastructure equipment, or the like.

The components shown by FIG. 20 may communicate with one another using interface circuitry 2006 or interconnect (IX) 2006, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

FIG. 21 illustrates an example of components that may be present in a compute node 2150 for implementing the techniques (e.g., operations, processes, methods, and methodologies) described herein. This compute node 2150 provides a closer view of the respective components of node 2150 when implemented as or as part of a computing device (e.g., as a mobile device, a base station, server, gateway, etc.). The compute node 2150 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 2150, or as components otherwise incorporated within a chassis of a larger system.

The compute node 2150 includes processing circuitry in the form of one or more processors 2152. The processor circuitry 2152 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2152 may include one or more hardware accelerators (e.g., same or similar to acceleration circuitry 2164), which may be microprocessors, programmable processing devices (e.g., FPGA, ASIC, etc.), or the like. The one or more accelerators may include, for example, computer vision and/or deep learning accelerators. In some implementations, the processor circuitry 2152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 2152 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 2152 may be coupled with or may include memory/storage and may be configured to execute instructions stored in the memory/storage to enable various applications or operating systems to run on the node 2150. The processors (or cores) 2152 is configured to operate application software to provide a specific service to a user of the node 2150. In some embodiments, the processor(s) 2152 may be a special-purpose processor(s)/controller(s) configured (or configurable) to operate according to the various embodiments herein.

As examples, the processor(s) 2152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another processor available from Intel® Corporation, Santa Clara, Calif. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2152 may be a part of a system on a chip (SoC), System-in-Package (SiP), a multi-chip package (MCP), and/or the like, in which the processor(s) 2152 and other components are formed into a single integrated circuit, or a single package, such as the Edison™ or Galileo™ SoC boards from Intel® Corporation. Other examples of the processor(s) 2152 are mentioned elsewhere in the present disclosure.

The processor(s) 2152 may communicate with system memory 2154 over an interconnect (IX) 2156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2158 may also couple to the processor 2152 via the IX 2156. In an example, the storage 2158 may be implemented via a solid-state disk drive (SSDD) and/or high-speed electrically erasable memory (commonly referred to as "flash memory"). Other devices that may be used for the storage 2158 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 2154 and/or storage circuitry 2158 may also incorporate three-dimensional (3D) cross-point (XPOINT) memories from Intel® and Micron®.

In low power implementations, the storage 2158 may be on-die memory or registers associated with the processor 2152. However, in some examples, the storage 2158 may be implemented using a micro hard disk drive (HDD). Further, any number of new technologies may be used for the storage 2158 in addition to, or instead of, the technologies described, such resistance change memories, phase change memories, holographic memories, or chemical memories, among others.

The storage circuitry 2158 store computational logic 2181 (or "modules 2181") in the form of software, firmware, or hardware commands to implement the techniques described herein. The computational logic 2181 may be employed to store working copies and/or permanent copies of computer programs, or data to create the computer programs, for the operation of various components of node 2150 (e.g., drivers, etc.), an OS of node 2150 and/or one or more applications for carrying out the embodiments discussed herein. The computational logic 2181 may be stored or loaded into memory circuitry 2154 as instructions 2181, or data to create the instructions 2188, 2182, for execution by the processor circuitry 2152 to provide the functions described herein. The various elements may be implemented by assembler instructions supported by processor circuitry 2152 or high-level languages that may be compiled into such instructions (e.g., instructions 2188, 2182, or data to create the instructions 2188, 2182). The permanent copy of the programming instructions may be placed into persistent storage devices of storage circuitry 2158 in the factory or in the field through, for example, a distribution medium (not shown), through a communication interface (e.g., from a distribution server (not shown)), or over-the-air (OTA).

In an example, the instructions 2188, 2182 provided via the memory circuitry 2154 and/or the storage circuitry 2158 of FIG. 21 are embodied as one or more non-transitory computer readable storage media (NTCRSM) 2160 including program code, a computer program product or data to create the computer program, with the computer program or data, to direct the processor circuitry 2158 of node 2150 to perform electronic operations in the node 2150, and/or to perform a specific sequence or flow of actions, for example, as described with respect to the flowchart(s) and block diagram(s) of operations and functionality depicted previously. The processor circuitry 2152 accesses the one or more non-transitory computer readable storage media over the interconnect 2156.

In alternate embodiments, programming instructions (or data to create the instructions) may be disposed on multiple NTCRSM 2160. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 2160 may be embodied by devices described for the storage circuitry 2158 and/or memory circuitry 2154. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 2188, instructions 2182, instructions 2181 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages and/or development tools, or any other languages tools. The computer program code for carrying out operations of the present disclosure may also be written in any combination of the programming languages discussed herein. The program code may execute entirely on the system 2150, partly on the system 2150, as a stand-alone software package, partly on the system 2150 and partly on a remote computer or entirely on the remote computer or server. In the latter scenario, the remote computer may be connected to the system 2150 through any type of network, including a LAN or WAN, or the connection may be made to an external computer (e.g., through the Internet using an Internet Service Provider).

In an example, the instructions 2188 on the processor circuitry 2152 (separately, or in combination with the instructions 2182, 2181 and/or logic/modules 2188 stored in computer-readable storage media) may configure execution or operation of a trusted execution environment (TEE) 2190. The TEE 2190 operates as a protected area accessible to the processor circuitry 2152 to enable secure access to data and secure execution of instructions. In some embodiments, the TEE 2190 may be a physical hardware device that is separate from other components of the system 2150 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 2190 may be implemented as secure enclaves, which are isolated regions of code and/or data within the processor and/or memory/storage circuitry of the system 2150. Only code executed within a secure enclave may access data within the same secure enclave, and the secure enclave may only be accessible using the secure application (which may be implemented by an application processor or a tamper-resistant microcontroller). Various implementations of the TEE 2190, and an accompanying secure area in the processor circuitry 2152 or the memory circuitry 2154 and/or storage circuitry 2158 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 2150 through the TEE 2190 and the processor circuitry 2152.

In some embodiments, the memory circuitry 2154 and/or storage circuitry 2158 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 2154 and/or storage circuitry 2158 may be divided into one or more trusted memory regions for storing applications or software modules of the TEE 2190.

Although the instructions 2182 are shown as code blocks included in the memory circuitry 2154 and the computational logic 2181 is shown as code blocks in the storage circuitry 2158, it should be understood that any of the code blocks may be replaced with hardwired circuits, for example, built into an FPGA, ASIC, or some other suitable circuitry. For example, where processor circuitry 2152 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 2154 and/or storage circuitry 2158 may store program code of an operating system (OS), which may be a general purpose OS or an OS specifically written for and tailored to the computing node 2150. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the node 2150, attached to the node 2150, or otherwise communicatively coupled with the node 2150. The drivers may include individual drivers allowing other components of the node 2150 to interact or control various I/O devices that may be present within, or connected to, the node 2150. For example, the drivers may include a display driver to control and allow access to a display device, a touchscreen driver to control and allow access to a touchscreen interface of the node 2150, sensor drivers to obtain sensor readings of sensor circuitry 2172 and control and allow access to sensor circuitry 2172, actuator drivers to obtain actuator positions of the actuators 2174 and/or control and allow access to the actuators 2174, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the node 2150 (not shown).

The components of edge computing device 2150 may communicate over the IX 2156. The IX 2156 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 2156 may be a proprietary bus, for example, used in a SoC based system.

The IX 2156 couples the processor 2152 to communication circuitry 2166 for communications with other devices, such as a remote server (not shown) and/or the connected devices 2162 (also referred to as "connected edge devices 2162", "edge devices 2162" and/or the like). The communication circuitry 2166 is a hardware element, or collection of hardware elements, used to communicate over one or more networks (e.g., cloud 2163, edge cloud 1710, and/or the like) and/or with other devices (e.g., connected devices 2162).

The transceiver 2166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 2162. For example, a wireless local area network (WLAN) unit may be used to implement WiFi® communications in accordance with the Institute of Electrical and Electronics Engineers (IEEE) 802.11 standard (see e.g., [IEEE80211]). In addition, wireless wide area communications, e.g., according to a cellular or other wireless wide area protocol, may occur via a wireless wide area network (WWAN) unit.

The wireless network transceiver 2166 (or multiple transceivers) may communicate using multiple standards or radios for communications at a different range. For example, the compute node 2150 may communicate with close devices, e.g., within about 10 meters, using a local transceiver based on BLE, or another low power radio, to save power. More distant connected devices 2162 (e.g., within about 50 meters, may be reached over ZigBee® or other intermediate power radios). Both communications techniques may take place over a single radio at different power levels or may take place over separate transceivers, for example, a local transceiver using BLE and a separate mesh transceiver using ZigBee®.

A wireless network transceiver 2166 (e.g., a radio transceiver) may be included to communicate with devices or services in the edge cloud 2163 via local or wide area network protocols. The wireless network transceiver 2166 may be an LPWA transceiver that follows the IEEE 802.15.4, or IEEE 802.15.4g standards, among others. The compute node 2150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2166, as described herein. For example, the transceiver 2166 may include a cellular transceiver that uses spread spectrum (SPA/SAS) communications for implementing high-speed communications. Further, any number of other protocols may be used, such as WiFi® networks for medium speed communications and provision of network communications. The transceiver 2166 may include radios that are compatible with any number of 3GPP specifications, such as LTE and 5G/NR communication systems, discussed in further detail at the end of the present disclosure. A network interface controller (NIC) 2168 may be included to provide a wired communication to nodes of the cloud/network 2163 or to other devices, such as the connected devices 2162 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 2168 may be included to enable connecting to a second network, for example, a first NIC 2168 providing communications to the cloud over Ethernet, and a second NIC 2168 providing communications to other devices over another type of network.

Given the variety of types of applicable communications from the device to another component or network, applicable communications circuitry used by the device may include or be embodied by any one or more of components 2164, 2166, 2168, and/or 2170. Accordingly, in various examples, applicable means for communicating (e.g., receiving, transmitting, etc.) may be embodied by such communications circuitry.

The compute node 2150 may include or be coupled to acceleration circuitry 2164, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 2164 may comprise logic blocks or logic fabric and other interconnected resources that may be programmed (configured) to perform various functions, such as the procedures, methods, functions, etc. of the various embodiments discussed herein. In such implementations, the acceleration circuitry 2164 may also include memory cells (e.g., EPROM, EEPROM, flash memory, static memory (e.g., SRAM, anti-fuses, etc.) used to store logic blocks, logic fabric, data, etc. in LUTs and the like.

The IX 2156 also couples the processor 2152 to a sensor hub or external interface 2170 that is used to connect additional devices or subsystems. The additional/external devices may include sensors 2172, actuators 2174, and positioning circuitry 2145.

The sensor circuitry 2172 includes devices, modules, or subsystems whose purpose is to detect events or changes in its environment and send the information (sensor data) about the detected events to some other a device, module, subsystem, etc. Examples of such sensors 2172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 2174, allow node 2150 to change its state, position, and/or orientation, or move or control a mechanism or system. The actuators 2174 comprise electrical and/or mechanical devices for moving or controlling a mechanism or system, and converts energy (e.g., electric current or moving air and/or liquid) into some kind of motion. The actuators 2174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2174 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The node 2150 may be configured to operate one or more actuators 2174 based on one or more captured events and/or instructions or control signals received from a service provider and/or various client systems The positioning circuitry 2145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2145 may include a Micro-Technology for Positioning, Navigation, and Timing (Micro-PNT) IC that uses a master timing clock to perform position tracking/estimation without GNSS assistance. The positioning circuitry 2145 may also be part of, or interact with, the communication circuitry 2166 to communicate with the nodes and components of the positioning network. The positioning circuitry 2145 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2145 is, or includes an INS, which is a system or device that uses sensor circuitry 2172 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 2150 without the need for external references.

In some optional examples, various input/output (I/O) devices may be present within or connected to, the compute node 2150, which are referred to as input circuitry 2286 and output circuitry 2284 in FIG. 21. The input circuitry 2186 and output circuitry 2284 include one or more user interfaces designed to enable user interaction with the node 2150 and/or peripheral component interfaces designed to enable peripheral component interaction with the node 2150. Input circuitry 2286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2284 may be included to show information or otherwise convey information, such as sensor readings, actuator position(s), or other like information. Data and/or graphics may be displayed on one or more user interface components of the output circuitry 2284. Output circuitry 2284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the node 2150. The output circuitry 2284 may also include speakers or other audio emitting devices, printer(s), and/or the like. In some embodiments, the sensor circuitry 2172 may be used as the input circuitry 2284 (e.g., an image capture device, motion capture device, or the like) and one or more actuators 2174 may be used as the output device circuitry 2284 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2176 may power the compute node 2150, although, in examples in which the edge computing node 2150 is mounted in a fixed location, it may have a power supply coupled to an electrical grid, or the battery may be used as a backup or for temporary capabilities. The battery 2176 may be a lithium ion battery, or a metal-air battery, such as a zinc-air battery, an aluminum-air battery, a lithium-air battery, and the like.

A battery monitor/charger 2178 may be included in the edge computing node 2150 to track the state of charge (SoCh) of the battery 2176, if included. The battery monitor/charger 2178 may be used to monitor other parameters of the battery 2176 to provide failure predictions, such as the state of health (SoH) and the state of function (SoF) of the battery 2176. The battery monitor/charger 2178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 2178 may communicate the information on the battery 2176 to the processor 2152 over the IX 2156. The battery monitor/charger 2178 may also include an analog-to-digital (ADC) converter that enables the processor 2152 to directly monitor the voltage of the battery 2176 or the current flow from the battery 2176. The battery parameters may be used to determine actions that the edge computing node 2150 may perform, such as transmission frequency, mesh network operation, sensing frequency, and the like.

A power block 2280, or other power supply coupled to a grid, may be coupled with the battery monitor/charger 2178 to charge the battery 2176. In some examples, the power block 2280 may be replaced with a wireless power receiver to obtain the power wirelessly, for example, through a loop antenna in the edge computing node 2150. A wireless battery charging circuit, such as an LTC4020 chip from Linear Technologies of Milpitas, Calif., among others, may be included in the battery monitor/charger 2178. The specific charging circuits may be selected based on the size of the battery 2176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2158 may include instructions 2182 in the form of software, firmware, or hardware commands to implement the techniques described herein. Although such instructions 2182 are shown as code blocks included in the memory 2154 and the storage 2158, it may be understood that any of the code blocks may be replaced with hardwired circuits, for example, built into an application specific integrated circuit (ASIC).

In an example, the instructions 2182 provided via the memory 2154, the storage 2158, or the processor 2152 may be embodied as a non-transitory, machine-readable medium 2160 including code to direct the processor 2152 to perform electronic operations in the edge computing node 2150. The processor 2152 may access the non-transitory, machine-readable medium 2160 over the IX 2156. For instance, the non-transitory, machine-readable medium 2160 may be embodied by devices described for the storage 2158 or may include specific storage units such as optical disks, flash drives, or any number of other hardware devices. The non-transitory, machine-readable medium 2160 may include instructions to direct the processor 2152 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium 2160 may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 22:
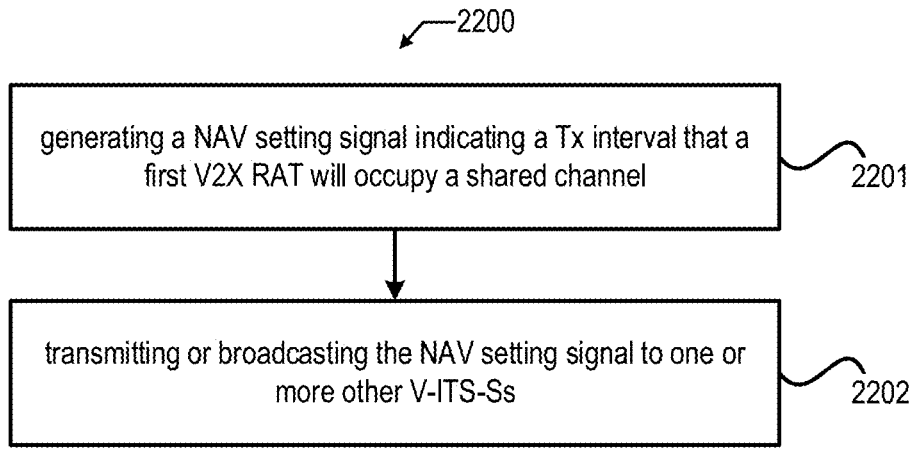
FIGS. 22 and 23 depict example procedure for practicing the various embodiments herein.
Figure 23:
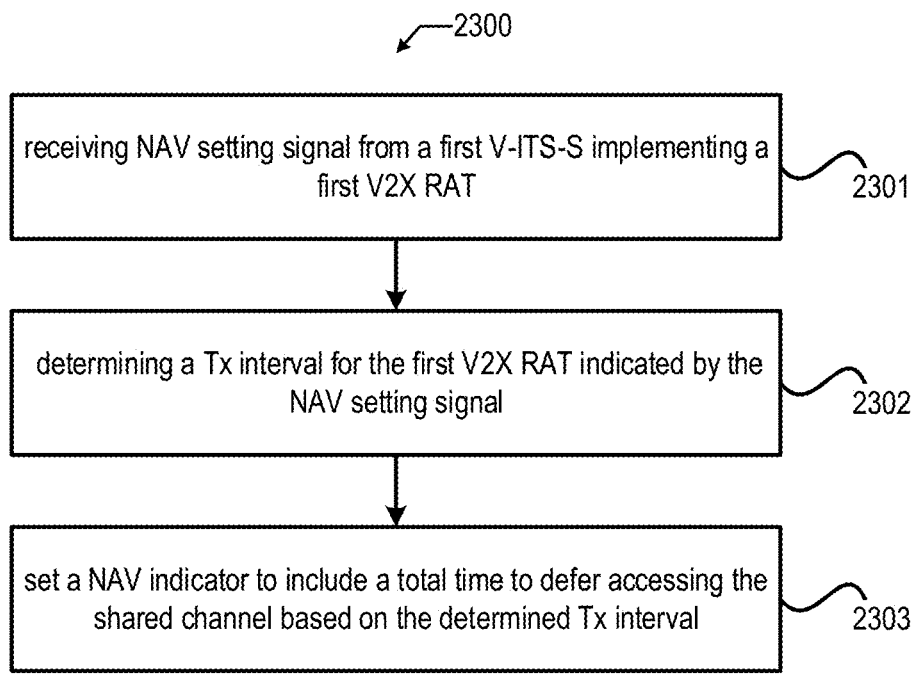

The illustrations of FIGS. 20 and 22 are intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The respective compute platforms of FIGS. 20 and 22 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations 5. Example Implementations FIGS. 22-23 depicts an example processes 2200-2300 for practicing the various embodiments discussed herein. For illustrative purposes, the various operations of processes 2200-2300 are described as being performed by V-ITS-S, which may correspond to the V-ITS-Ss 1610 of FIG. 16, the vehicular computing system 1300 of FIG. 13, and/or any other system/device discussed herein, or elements thereof. While particular examples and orders of operations are illustrated FIGS. 22-23, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 2200 begins at operation 2201 where a first V-ITS-S implementing a first V2X RAT of a plurality of V2X RATs sharing resources within a shared channel generates a NAV setting signal. The NAV setting signal indicates a Tx interval that the first V2X RAT will occupy the shared channel. At operation 2202, the first V-ITS-S transmits or broadcasts the NAV setting signal to one or more other V-ITS-Ss. The one or more other V-ITS-Ss include at least one second V-ITS-S that implements a second V2X RAT of the plurality of RATs different than the first V2X RAT. The NAV setting signal is to cause the at least one second V-ITS-S to refrain from transmitting second V2X RAT signals during the Tx interval.

Process 2300 begins at operation 2301 where a second V-ITS-S implementing a second V2X RAT of a plurality of V2X RATs sharing resources within a shared channel receives a NAV setting signal from a first V-ITS-S implementing a first V2X RAT of the plurality of V2X RATs different than the second V2X RAT. At operation 2302, the second V-ITS-S determines, based on the NAV setting signal, a Tx interval during which the shared channel will be occupied by first V2X RAT transmissions. At operation 2303, the second V-ITS-S sets its NAV indicator to include a total time to defer accessing the shared channel based on the determined Tx interval.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example A01 includes a method of operating a first vehicular Intelligent Transport System (ITS) Station (V-ITS-S), the V-ITS-S implementing a first vehicle-to-everything (V2X) radio access technology (RAT) of a plurality of V2X RATs sharing resources within a shared channel, the method comprising: generating a Network Allocation Vector (NAV) setting signal, the NAV setting signal indicating a transmission (Tx) interval that the first V2X RAT will occupy the shared channel; and transmitting or broadcasting the NAV setting signal to one or more other V-ITS-Ss, the one or more other V-ITS-Ss including at least one second V-ITS-S implementing a second V2X RAT of the plurality of V2X RATs different than the first V2X RAT, and the NAV setting signal is to cause the at least one second V-ITS-S to refrain from transmitting signals during the Tx interval.

Example A02 includes the method of example 1 and/or some other example(s) herein, wherein generating the NAV setting signal comprises: setting a duration field in a Medium Access Control (MAC) layer frame to include a time period of the Tx interval, wherein the time period includes a duration of the Tx interval and at least one guard period between the Tx interval and another Tx interval for the second V2X RAT.

Example A03 includes the method of example A02 and/or some other example(s) herein, wherein the duration of the Tx interval is a positive integer multiple value selected from: a short interframe space (SIFS) duration; a point coordination function interframe space (PIFS) duration; a distributed coordination function interframe space (DIFS) duration; an arbitration inter-frame spacing (AIFS) duration; an extended interframe space (EIFS) duration; a combination of any of the SIFS, the PIFS, the DIFS, the EIFS, and the AIFS; or a Third Generation Partnership Project (3GPP) Long Term Evolution (LTE) or Fifth Generation (5G) symbol duration.

Example A04 includes the method of examples A02-A03 and/or some other example(s) herein, wherein one or more signals are to be transmitted during the at least one guard period, wherein the one or more signals include one or more of random data signals, one or more pilot symbols, one or more reference signals, and user data signals.

Example A05 includes the method of examples A02-A04 and/or some other example(s) herein, further comprising: determining a value for the duration field based on a percentage of V-ITS-Ss employing the first V2X RAT in a geographic area.

Example A06 includes the method of example A05 and/or some other example(s) herein, wherein the value for the duration field is one of: 1 millisecond (ms) when the percentage of V-ITS-Ss employing the first V2X RAT in the geographic area is less than 15%; 2 ms when the percentage of V-ITS-Ss employing the first V2X RAT in the geographic area is between 15% and 25%; 3 ms when the percentage of V-ITS-Ss employing the first V2X RAT in the geographic area is between 25% and 35%; 4 ms when the percentage of V-ITS-Ss employing the first V2X RAT in the geographic area is between 35% and 45%; 5 ms when the percentage of V-ITS-Ss employing the first V2X RAT in the geographic area is between 45% and 55%; 6 ms when the percentage of V-ITS-Ss employing the first V2X RAT in the geographic area is between 55% and 65%; 7 ms when the percentage of V-ITS-Ss employing the first V2X RAT in the geographic area is between 65% and 75%; 8 ms when the percentage of V-ITS-Ss employing the first V2X RAT in the geographic area is between 75% and 85%; 9 ms when the percentage of V-ITS-Ss employing the first V2X RAT in the geographic area is greater than 85%; 10 ms when the percentage of V-ITS-Ss employing the first V2X RAT in the geographic area is about 100%.

Example A08 includes the method of examples A01-A07 and/or some other example(s) herein, wherein the MAC layer frame is a Clear-to-Send (CTS)-to-self frame.

Example A09 includes the method of example A08 and/or some other example(s) herein, wherein generating the NAV setting signal comprises: generating the CTS-to-Self frame to not include a Receive Address field.

Example A10 includes the method of examples A08-A09 and/or some other example(s) herein, wherein generating the NAV setting signal comprises: generating the CTS-to-Self frame to only include a frame control field, one or more duration fields, and a frame check sequence field.

Example A11 includes the method of examples A08-A10 and/or some other example(s) herein, wherein the CTS-to-Self frame is 64 bits.

Example A12 includes the method of examples A08-A11 and/or some other example(s) herein, wherein the CTS-to-Self frame has a total duration of 88 microseconds (µs) for a binary phase-shift keying (BPSK) modulation and coding scheme (MCS), 56 µs for a quadrature phase-shift keying (QPSK) MCS, and 48 µs for a 16-state quadrature amplitude modulation (16-QAM) MCS.

Example A13 includes the method of examples A01-A12 and/or some other example(s) herein, further comprising: determining to generate the NAV setting signal based on a sub-channel resource allocation selected by the first V-ITS-S in a previous Tx interval of the first V2X RAT.

Example A14 includes the method of example A13 and/or some other example(s) herein, wherein a predefined or configured NAV setting signal rule indicates that a station occupying the sub-channel resource allocation in the previous Tx interval is selected to transmit the NAV setting signal at a beginning of a next Tx interval, and the sub-channel resource allocation indicated by the rule is one of: a highest occupied frequency and earliest occupied time of all occupied sub-channels, a lowest occupied frequency and earliest occupied time of all occupied sub-channels, or a lowest occupied frequency and latest occupied time of all occupied sub-channels.

Example A15 includes the method of examples A01-A14 and/or some other examples herein, further comprising: determining a need for additional capacity for the first V2X RAT; and transmitting an add-capacity request sequence using the first V2X RAT.

Example A16 includes the method of example A15 and/or some other examples herein, further comprising: receiving one or more acknowledgement (ACK) and/or one or more negative ACK (NACK) messages from one or more V-ITS-Ss implementing the second V2X RAT based on observed congestion levels; and increasing a resource capacity for first V2X RAT based on a number of the received ACK messages and a number of the received NACK messages.

Example A17 includes the method of examples A15-A16 and/or some other examples herein, wherein an initial capacity allocation for the first V2X RAT is 50%. and the second V2X RAT is 50%.

Example A18 includes the method of examples A15-A17 and/or some other examples herein, wherein the resource capacity for the first V2X RAT is increased or decreased by a predefined amount and a resource capacity for the second V2X RAT is increased or decreased by the predefined amount in proportion to the increase or decrease of the first V2X RAT.

Example A19 includes the method of examples A16-A18 and/or some other examples herein, further comprising: determining to increase the resource capacity for first V2X RAT when a ratio of received ACKs to a total number of received ACKs and NACKs meets or exceeds a predetermined or configured threshold, according to:

$$\theta \geq \frac{N_{ACK}}{N_{ACK} + N_{NACK}}$$

wherein $\theta$ is a predetermined or configured threshold, $N_{ACK}$ is the number of received ACKs, and $N_{NACK}$ is the number of received NACKs.

Example A20 includes the method of examples A01-A19, wherein the first V2X RAT is 3GPP LTE or 5G cellular V2X (C-V2X), and the second V2X RAT is Intelligent Transport Systems in the 5 GHz range (ITS-G5) or Dedicated Short Range Communication (DSRC).

Example B01 includes a method of operating a second vehicular Intelligent Transport System (ITS) Station (V-ITS-S), the V-ITS-S implementing a second vehicle-to-everything (V2X) radio access technology (RAT) of a plurality of V2X RATs sharing resources within a shared channel, the method comprising: receiving a Network Allocation Vector (NAV) setting signal from a first V-ITS-S implementing a first V2X RAT of the plurality of V2X RATs different than the second V2X RAT; determining, based on the NAV setting signal, a Tx interval during which the shared channel will be occupied by first V2X RAT transmissions; and setting a NAV indicator to include a total time to defer accessing the shared channel based on the determined Tx interval.

Example B02 includes the method of example B01 and/or some other example(s) herein, wherein determining the Tx interval comprises: identifying a value in a duration field in a Medium Access Control (MAC) layer frame of the NAV setting signal, wherein the value in the duration field includes a duration of the Tx interval and at least one guard period between the Tx interval and another Tx interval during which second V2X RAT transmissions can take place.

Example B03 includes the method of example B02 and/or some other example(s) herein, wherein setting the NAV indicator comprises: determining the total time to defer accessing the shared channel based on the determined duration and a configured Arbitration Inter-Frame Spacing (AIFS) time.

Example B04 includes the method of examples B01-B03 and/or some other example(s) herein, further comprising: performing a medium sensing operation to determine whether a subchannel in the shared channel is occupied when the NAV indicator expires; and transmitting one or more data frames over the sub-channel when the sub-channel is not occupied based on the medium sensing operation.

Example B05 includes the method of examples B01-B03 and/or some other example(s) herein, further comprising: delaying performance of a medium sensing operation in the shared channel until receipt of the NAV setting signal or when the NAV setting signal has not been received after a predetermined number of Tx intervals.

Example B06 includes the method of examples B01-B05 and/or some other example(s) herein, wherein the first V2X RAT is 3GPP LTE or 5G cellular V2X (C-V2X), and the second V2X RAT is Intelligent Transport Systems in the 5 GHz range (ITS-G5) or Dedicated Short Range Communication (DSRC).

Example C01 includes one or more computer readable media comprising instructions, wherein execution of the instructions by processor circuitry is to cause the processor circuitry to perform the method of examples A01-A20 and/or B01-806. Example C02 includes a computer program comprising the instructions of example C0l. Example C03 includes an Application Programming Interface defining functions, methods, variables, data structures, and/or protocols for the computer program of example C02. Example C04 includes an apparatus comprising circuitry loaded with the instructions of example C0l. Example C05 includes an apparatus comprising circuitry operable to run the instructions of example C0l. Example C06 includes an integrated circuit comprising one or more of the processor circuitry of example C01 and the one or more computer readable media of example C0l. Example C07 includes a computing system comprising the one or more computer readable media and the processor circuitry of example C01. Example C08 includes an apparatus comprising means for executing the instructions of example C01. Example C09 includes a signal generated as a result of executing the instructions of example C01. Example C10 includes a data unit generated as a result of executing the instructions of example C01. Example C11 includes the data unit of example C10, wherein the data unit is a datagram, network packet, data frame, data segment, a protocol data unit (PDU), a service data unit (SDU), a message, or a database object. Example C12 includes a signal encoded with the data unit of examples C10-C11. Example C13 includes an electromagnetic signal carrying the instructions of example C01. Example C14 includes an apparatus comprising means for performing the method of examples A01-A20 and/or B01-B06.

Example Z01 includes an apparatus comprising means to perform one or more elements of a method described in or related to any of examples A01-A20, B01-B06, or any other method or process described herein. Example Z02 includes one or more non-transitory computer-readable media comprising instructions to cause an electronic device, upon execution of the instructions by one or more processors of the electronic device, to perform one or more elements of a method described in or related to any of examples A01-A20, B01-B06, or any other method or process described herein. Example Z03 includes an apparatus comprising logic, modules, or circuitry to perform one or more elements of a method described in or related to any of examples A01-A20, B01-B06, or any other method or process described herein. Example Z04 includes a method, technique, or process as described in or related to any of examples A01-A20, B01-B06, or portions or parts thereof. Example Z05 includes an apparatus comprising: one or more processors and one or more computer-readable media comprising instructions that, when executed by the one or more processors, cause the one or more processors to perform the method, techniques, or process as described in or related to any of examples A01-A20, B01-B06, or portions thereof. Example Z06 includes a signal as described in or related to any of examples A01-A20, B01-B06, or portions or parts thereof. Example Z07 includes a datagram, packet, frame, segment, protocol data unit (PDU), or message as described in or related to any of examples A01-A20, B01-B06, or portions or parts thereof, or otherwise described in the present disclosure.

Example Z08 includes a signal encoded with data as described in or related to any of examples A01-A20, B01-B06, or portions or parts thereof, or otherwise described in the present disclosure. Example Z09 includes a signal encoded with a datagram, packet, frame, segment, protocol data unit (PDU), or message as described in or related to any of examples A01-A20, B01-B06, or portions or parts thereof, or otherwise described in the present disclosure. Example Z10 includes an electromagnetic signal carrying computer-readable instructions, wherein execution of the computer-readable instructions by one or more processors is to cause the one or more processors to perform the method, techniques, or process as described in or related to any of examples A01-A20, B01-B06, or portions thereof. Example Z11 includes a computer program comprising instructions, wherein execution of the program by a processing element is to cause the processing element to carry out the method, techniques, or process as described in or related to any of examples A01-A20, B01-B06, or portions thereof. Example Z12 includes a signal in a wireless network as shown and described herein. Example Z13 includes a method of communicating in a wireless network as shown and described herein. Example Z14 includes a system for providing wireless communication as shown and described herein. Example Z15 includes a device for providing wireless communication as shown and described herein. Any of the above-described examples may be combined with any other example (or combination of examples), unless explicitly stated otherwise.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

6. Terminology

The terminology used herein is for the purpose of describing particular embodiments only and is not intended to be limiting of the disclosure. The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a stand-alone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element (s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "ego ITS-S" refers to an ITS-S that is under consideration, the term "ego vehicle" refers to a vehicle embedding an ITS-S being considered, and the term "neighbors" refers to other ITS-Ss different than the ego ITS-S and ego vehicle.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to be employed in a first vehicular Intelligent Transport System (ITS) Station (V-ITS-S) implementing a first vehicle-to-everything (V2X) radio access technology (RAT) of a plurality of V2X RATs sharing radio resources within a shared channel, the apparatus comprising:
processor circuitry arranged to generate a Network Allocation Vector (NAV) setting signal, wherein the NAV setting signal indicates a transmission (Tx) interval that the first V2X RAT will occupy the shared channel, and wherein, to generate the NAV setting signal, the processor circuitry is arranged to:
determine a time period of the Tx interval based on a percentage of V-ITS-Ss employing the first V2X RAT in a geographic area, wherein the time period of the Tx interval includes a duration of the Tx interval and at least one guard period between the Tx interval and another Tx interval for a second V2X RAT of the plurality of V2X RATs different than the first V2X RAT, and
set a duration field in a Medium Access Control (MAC) layer frame to include the determined time period of the Tx interval; and
first V2X RAT circuitry communicatively coupled with the processor circuitry, the first V2X RAT circuitry arranged to transmit or broadcast the NAV setting signal to one or more other V-ITS-Ss, the one or more other V-ITS-Ss including at least one second V-ITS-S implementing the second V2X RAT, and the NAV setting signal is to cause the at least one second V-ITS-S to refrain from transmitting signals during the Tx interval.

2. The apparatus of claim 1, wherein the duration of the Tx interval is a positive integer multiple value selected from:
a short interframe space (SIFS) duration;
a point coordination function interframe space (PIFS) duration;
a distributed coordination function interframe space (DIFS) duration;
an arbitration inter-frame spacing (AIFS) duration;
an extended interframe space (EIFS) duration;
a combination of any of the SIFS, the PIFS, the DIFS, the EIFS, and the AIFS; or
a Third Generation Partnership Project (3GPP) Long Term Evolution (LTE) or Fifth Generation (5G) symbol duration.

3. The apparatus of claim 1, wherein one or more signals are to be transmitted during the at least one guard period, wherein the one or more signals include one or more of random data signals, one or more pilot symbols, one or more reference signals, and user data signals.

4. The apparatus of claim 1, wherein a value for the duration field is one of:

1 millisecond (ms) when the percentage of V-ITS-Ss employing the first V2X RAT in the geographic area is less than 15%;
2 ms when the percentage of V-ITS-Ss employing the first V2X RAT in the geographic area is between 15% and 25%;
3 ms when the percentage of V-ITS-Ss employing the first V2X RAT in the geographic area is between 25% and 35%;
4 ms when the percentage of V-ITS-Ss employing the first V2X RAT in the geographic area is between 35% and 45%;
5 ms when the percentage of V-ITS-Ss employing the first V2X RAT in the geographic area is between 45% and 55%;
6 ms when the percentage of V-ITS-Ss employing the first V2X RAT in the geographic area is between 55% and 65%;
7 ms when the percentage of V-ITS-Ss employing the first V2X RAT in the geographic area is between 65% and 75%;
8 ms when the percentage of V-ITS-Ss employing the first V2X RAT in the geographic area is between 75% and 85%;
9 ms when the percentage of V-ITS-Ss employing the first V2X RAT in the geographic area is greater than 85%; and
10 ms when the percentage of V-ITS-Ss employing the first V2X RAT in the geographic area is about 100%.

5. The apparatus of claim 1 wherein the MAC layer frame is a Clear-to-Send (CTS)-to-Self frame.

6. The apparatus of claim 5, wherein, to generate the NAV setting signal, the processor circuitry is arranged to:
generate the CTS-to-Self frame to not include a Receive Address field.

7. The apparatus of claim 5, wherein, to generate the NAV setting signal, the processor circuitry is arranged to:
generate the CTS-to-Self frame to only include a frame control field, one or more duration fields, and a frame check sequence field.

8. The apparatus of claim 5, wherein the CTS-to-Self frame is 64 bits.

9. The apparatus of claim 5, wherein a transmission duration of the CTS-to-Self frame is 88 microseconds ($\mu s$) for a binary phase-shift keying (BPSK) modulation and coding scheme (MCS), 56 $\mu s$ for a quadrature phase-shift keying (QPSK) MCS, and 48 $\mu s$ for a 16-state quadrature amplitude modulation (16-QAM) MCS.

10. The apparatus of claim 1, wherein the processor circuitry is further arranged to:
determine to generate the NAV setting signal based on a sub-channel resource allocation selected by the first V-ITS-S in a previous Tx interval of the first V2X RAT.

11. The apparatus of claim 10, wherein a predefined or configured NAV setting signal rule indicates that a station occupying the sub-channel resource allocation in the previous Tx interval is selected to transmit the NAV setting signal at a beginning of a next Tx interval, and the sub-channel resource allocation indicated by the rule is one of:
a highest occupied frequency and earliest occupied time of all occupied sub-channels,
a lowest occupied frequency and earliest occupied time of all occupied sub-channels, or
a lowest occupied frequency and latest occupied time of all occupied sub-channels.

12. One or more non-transitory computer readable media (NTCRM) comprising instructions, wherein execution of the instructions by one or more processors of a second vehicular Intelligent Transport System (ITS) Station (V-ITS-S) implementing a second vehicle-to-everything (V2X) radio access technology (RAT) of a plurality of V2X RATs sharing resources within a shared channel is to cause the second V-ITS-S to:
- obtain a Clear-to-Send (CTS)-to-Self frame including a Network Allocation Vector (NAV) setting signal from a first V-ITS-S implementing a first V2X RAT of the plurality of V2X RATs different than the second V2X RAT;
- determine, based on a value in a duration field of the CTS-to-Self frame, a Tx interval during which the shared channel will be occupied by first V2X RAT transmissions, wherein the value in the duration field includes a duration of the Tx interval and at least one guard period between the Tx interval and another Tx interval during which second V2X RAT transmissions can take place; and
- set a NAV indicator to include a total time to defer accessing the shared channel based on the determined Tx interval.

13. The one or more NTCRM of claim 12, wherein, to set the NAV indicator, execution of the instructions is to cause the second V-ITS-S to:
- determine the total time to defer accessing the shared channel based on the determined duration and a configured Arbitration Inter-Frame Spacing (AIFS) time.

14. The one or more NTCRM of claim 12, wherein execution of the instructions is to cause the second V-ITS-S to:
- perform a medium sensing operation to determine whether a sub-channel in the shared channel is occupied when the NAV indicator expires; and
- transmit one or more data frames over the sub-channel when the sub-channel is not occupied based on the medium sensing operation.

15. The one or more NTCRM of claim 12, wherein execution of the instructions is to cause the second V-ITS-S to: delay performance of a medium sensing operation in the shared channel until receipt of the NAV setting signal or when the NAV setting signal has not been received after a predetermined number of Tx intervals.

16. The one or more NTCRM of claim 12, wherein a duration of the Tx interval is a positive integer multiple selected from: a short interframe space (SIFS) duration; a point coordination function interframe space (PIFS) duration; a distributed coordination function interframe space (DIFS) duration; an arbitration inter-frame spacing (AIFS) duration; an extended interframe space (EIFS) duration; a combination of any of the SIFS, the PIFS, the DIFS, the EIFS, and the AIFS; or a Third Generation Partnership Project (3GPP) Long Term Evolution (LTE) or Fifth Generation (5G) symbol duration.

17. One or more non-transitory computer readable media (NTCRM) comprising instructions, wherein execution of the instructions by one or more processors of a first vehicular Intelligent Transport System (ITS) Station (V-ITS-S) implementing a cellular vehicle-to-everything (C-V2X) radio access technology (RAT) is to cause the first V-ITS-S to:
- generate a Clear-to-Send (CTS)-to-Self frame including at least one duration field;
- set the at least one duration field to include a transmission (Tx) interval during which C-V2X RAT transmissions will occupy a shared channel; and
- transmit or broadcast the CTS-to-Self frame to one or more other V-ITS-Ss, the one or more other V-ITS-Ss including at least one second V-ITS-S implementing an Intelligent Transport Systems in a 5 GHz range (ITS-G5) RAT, and the CTS-to-Self frame is to cause the at least one second V-ITS-S to refrain from transmitting second ITS-G5 signals during the Tx interval included in the at least one duration field.

18. The one or more NTCRM of claim 17, wherein a duration of the Tx interval is a positive integer multiple selected from: a short interframe space (SIFS) duration; a point coordination function interframe space (PIFS) duration; a distributed coordination function interframe space (DIFS) duration; an arbitration inter-frame spacing (AIFS) duration; an extended interframe space (EIFS) duration; a combination of any of the SIFS, the PIFS, the DIFS, the EIFS, and the AIFS; or a Third Generation Partnership Project (3GPP) Long Term Evolution (LTE) or Fifth Generation (5G) symbol duration.

19. The one or more NTCRM of claim 18, wherein execution of the instructions is to cause the first V-ITS-S to: determine a value for the at least one duration field based on a percentage of V-ITS-Ss employing C-V2X RAT in a geographic area.

20. The one or more NTCRM of claim 17, wherein, to transmit or broadcast the CTS-to-Self frame, execution of the instructions is to cause the first V-ITS-S to: transmit or broadcast the CTS-to-Self frame with a total duration of 88 microseconds (µs) for a binary phase-shift keying (BPSK) modulation and coding scheme (MCS), 56 µs for a quadrature phase-shift keying (QPSK) MCS, and 48 µs for a 16-state quadrature amplitude modulation (16-QAM) MCS.

* * * * *

UNITED STATES PATENT AND TRADEMARK OFFICE
CERTIFICATE OF CORRECTION

| | | |
|---|---|---|
| PATENT NO. | : 11,792,616 B2 | Page 1 of 1 |
| APPLICATION NO. | : 17/033432 | |
| DATED | : October 17, 2023 | |
| INVENTOR(S) | : Markus Dominik Mueck et al. | |

It is certified that error appears in the above-identified patent and that said Letters Patent is hereby corrected as shown below:

In the Claims

Column 76
Line 30, "The apparatus of claim 5" should read "The apparatus of claim 1,"

Signed and Sealed this
Twenty-eighth Day of November, 2023

Katherine Kelly Vidal
*Director of the United States Patent and Trademark Office*